April 8, 1952 H. L. LAMBERT 2,592,436
TRUE NEGATIVE TOTAL PRINTING MECHANISM
Filed April 3, 1945 12 Sheets-Sheet 1

Inventor
HARRY L. LAMBERT
BY Earl Benst
HIS Attorney

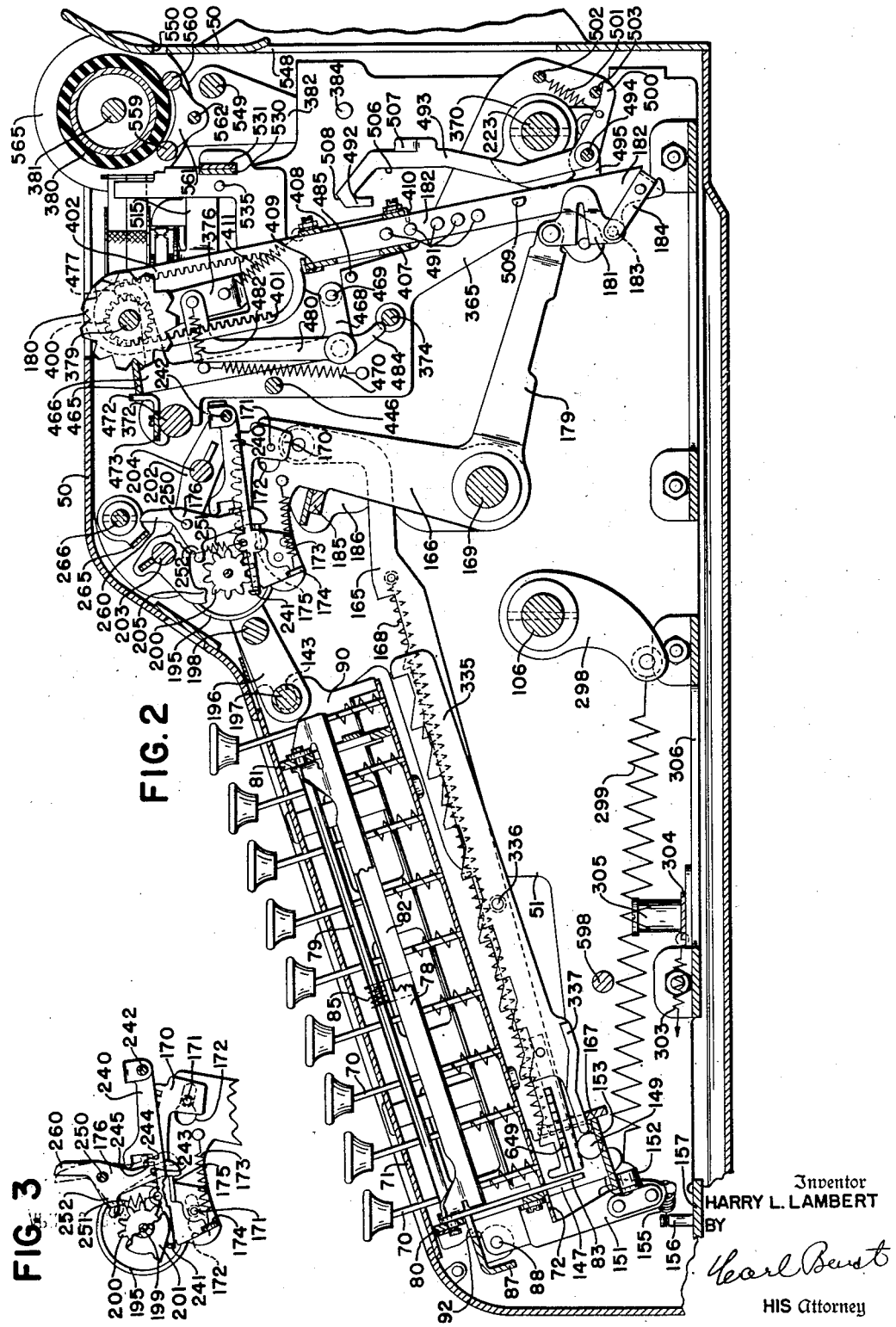

April 8, 1952     H. L. LAMBERT     2,592,436
TRUE NEGATIVE TOTAL PRINTING MECHANISM
Filed April 3, 1945     12 Sheets-Sheet 3

Inventor
HARRY L. LAMBERT
BY *Earl Beust*
HIS Attorney

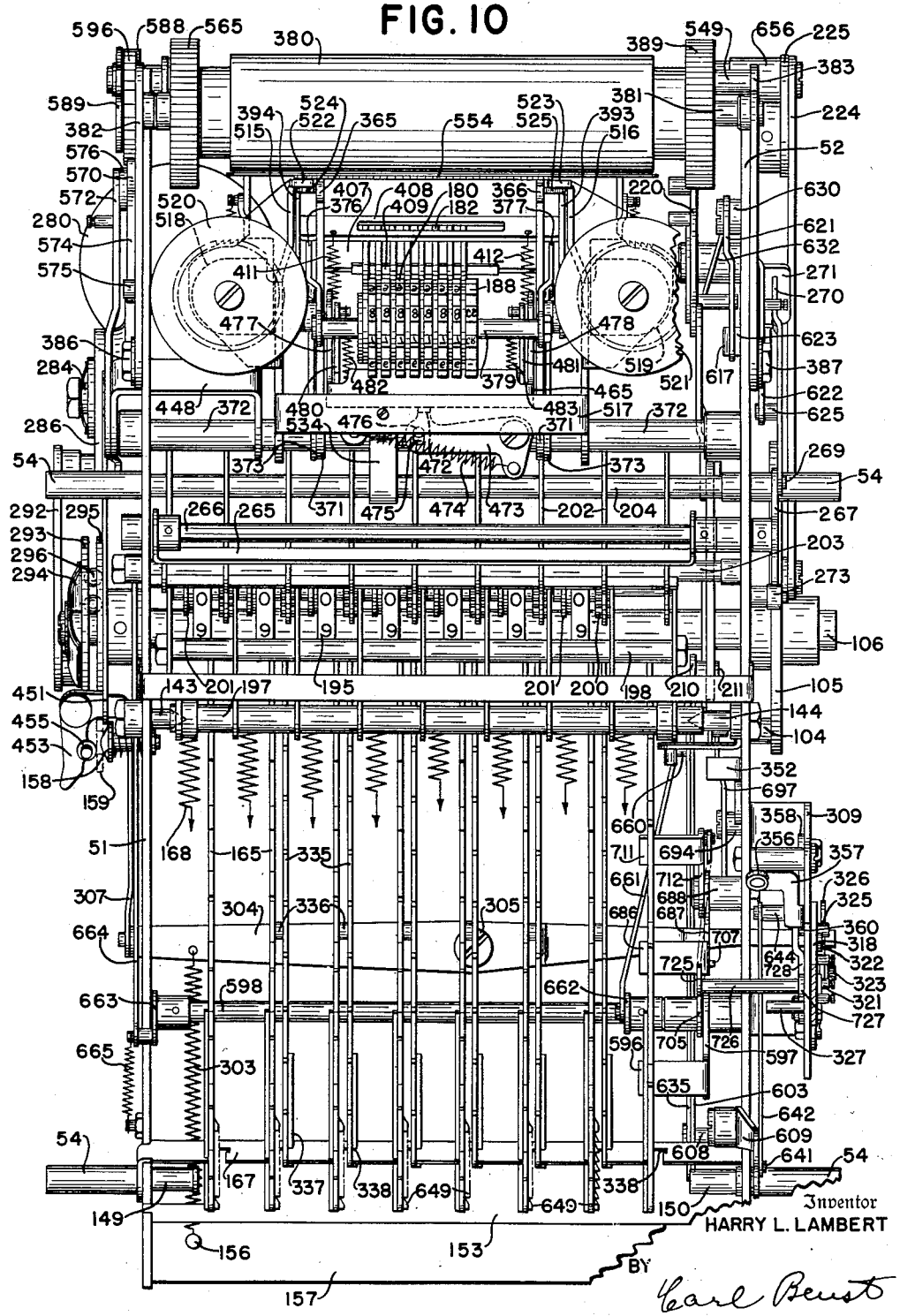

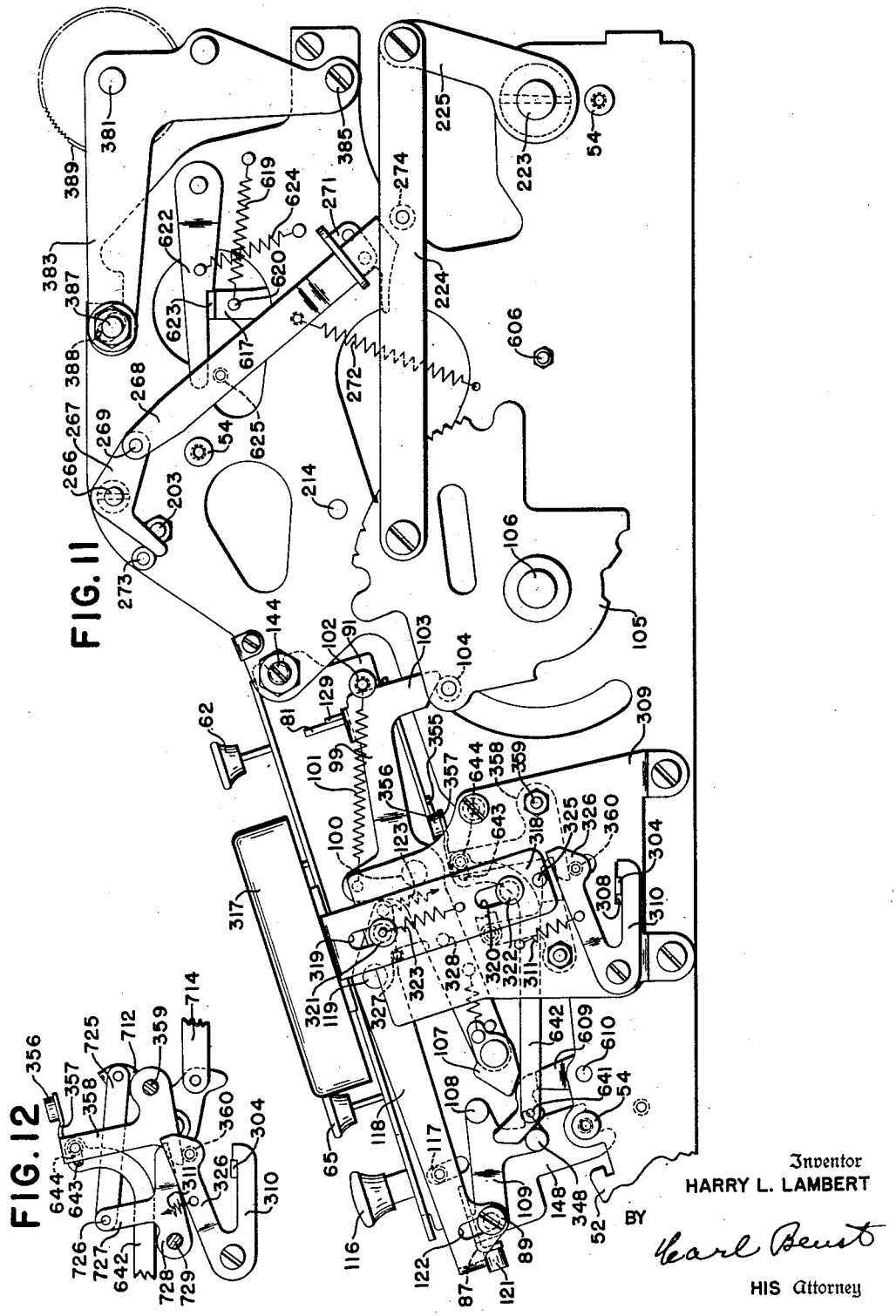

April 8, 1952 H. L. LAMBERT 2,592,436
TRUE NEGATIVE TOTAL PRINTING MECHANISM
Filed April 3, 1945 12 Sheets-Sheet 6
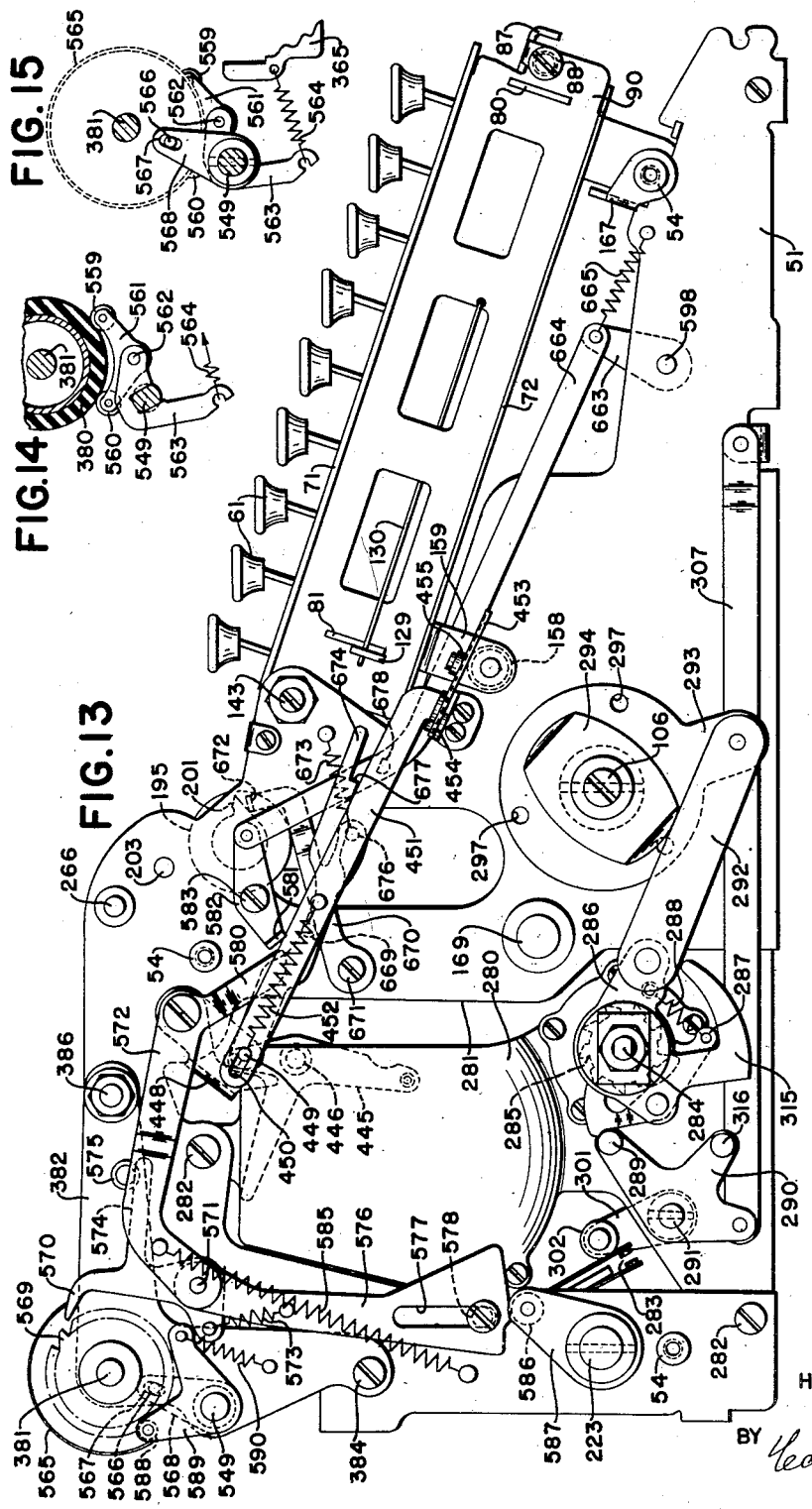
Inventor
HARRY L. LAMBERT
BY *Earl Benst*
HIS Attorney

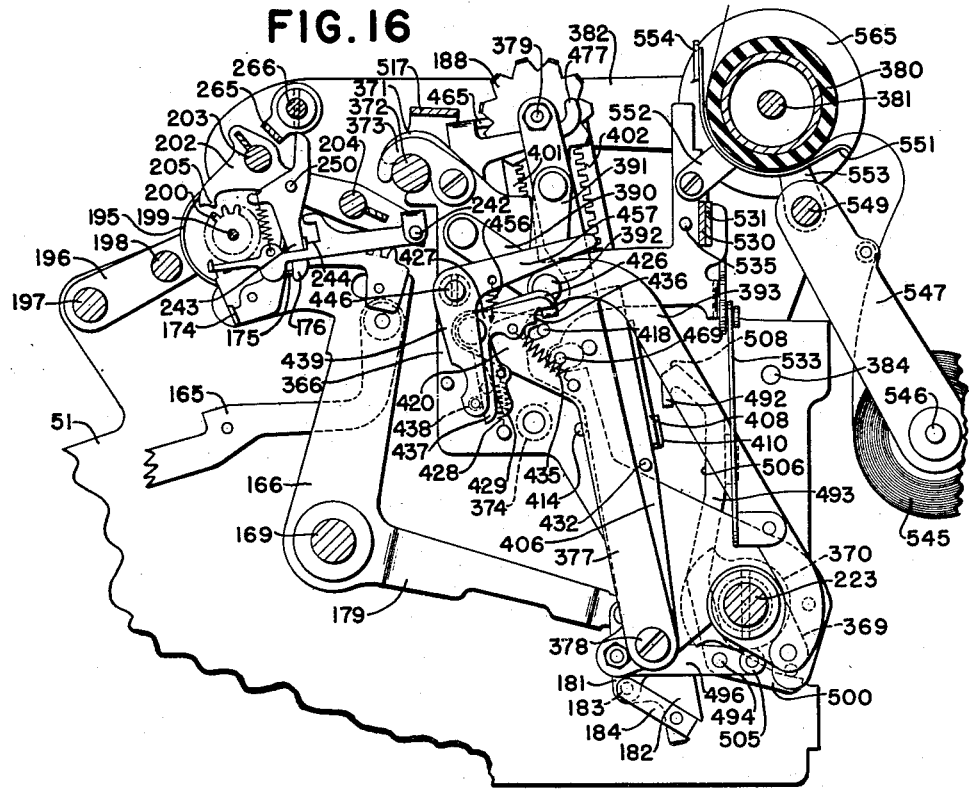
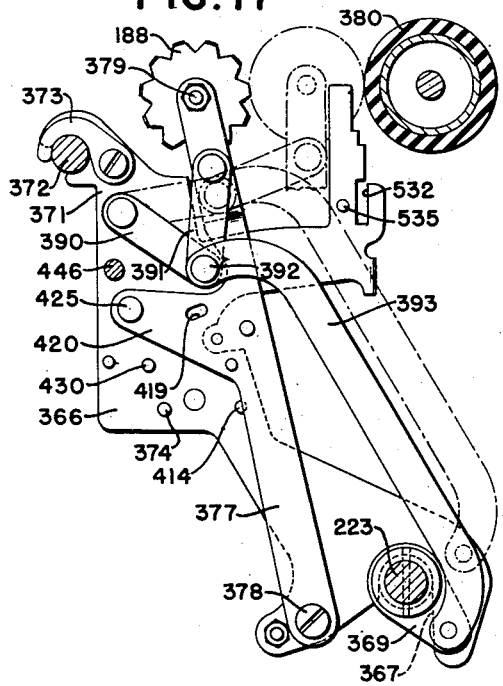
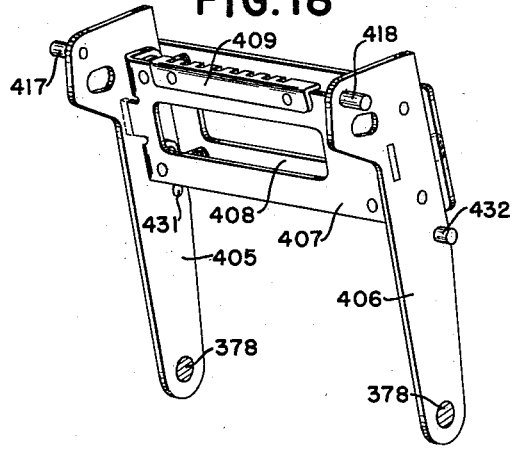

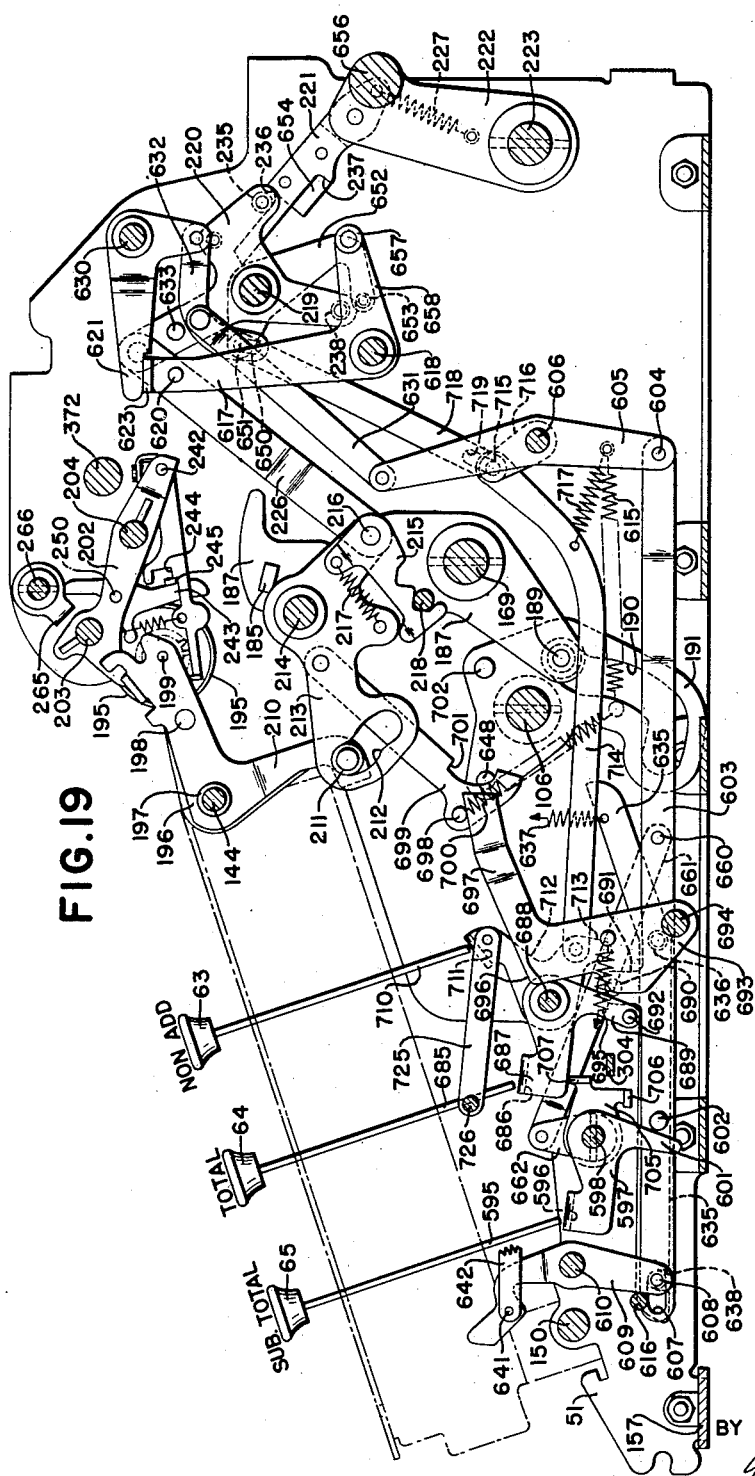

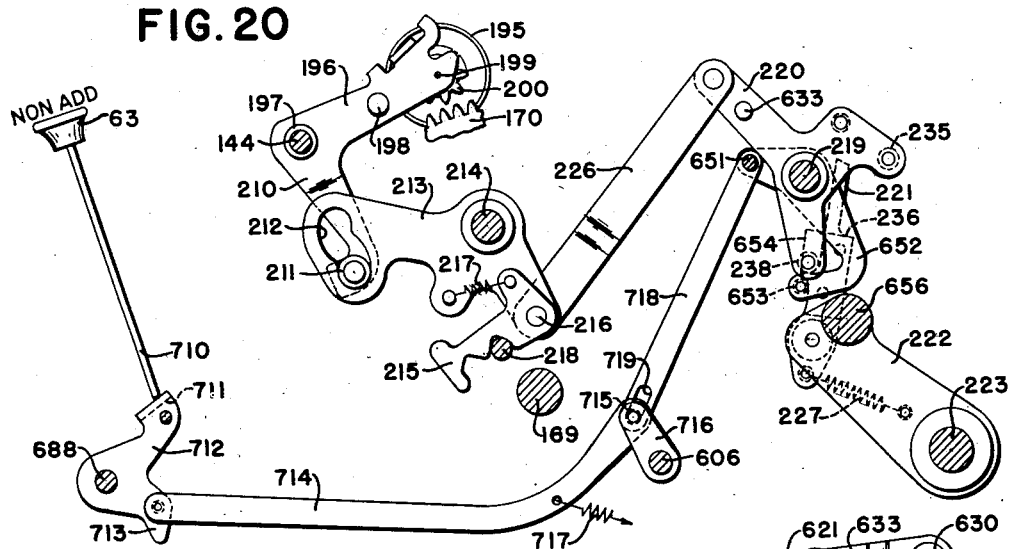
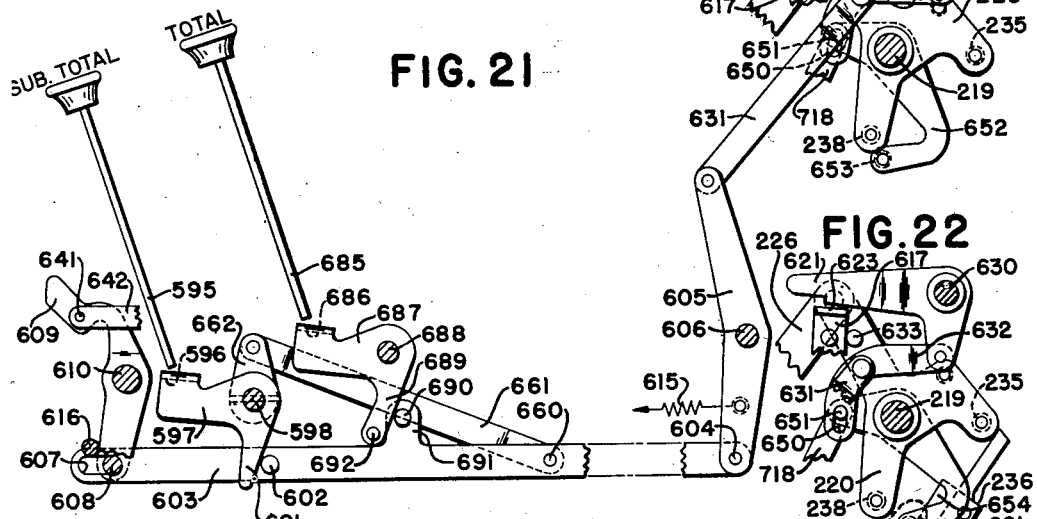

April 8, 1952     H. L. LAMBERT     2,592,436
TRUE NEGATIVE TOTAL PRINTING MECHANISM
Filed April 3, 1945     12 Sheets-Sheet 10
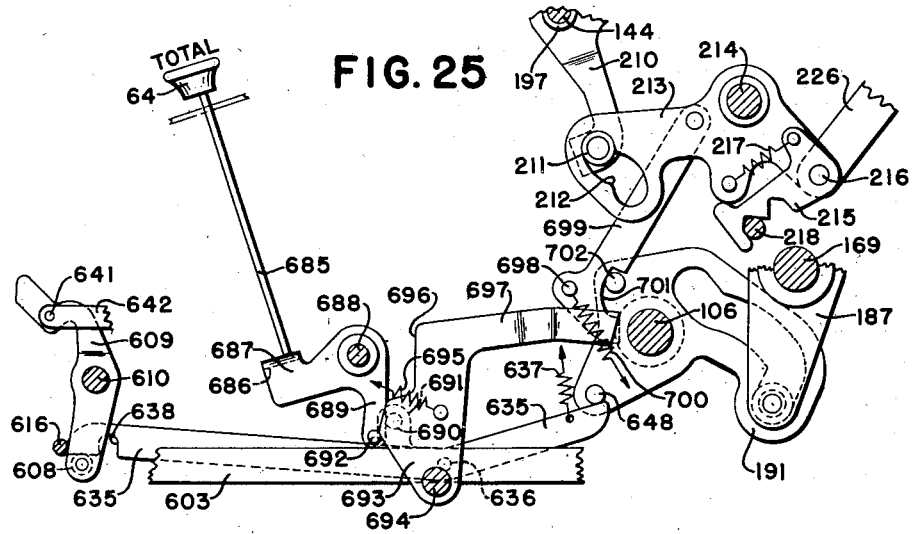
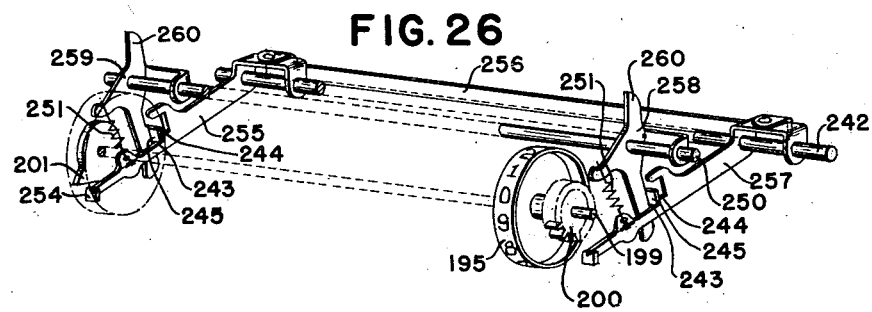
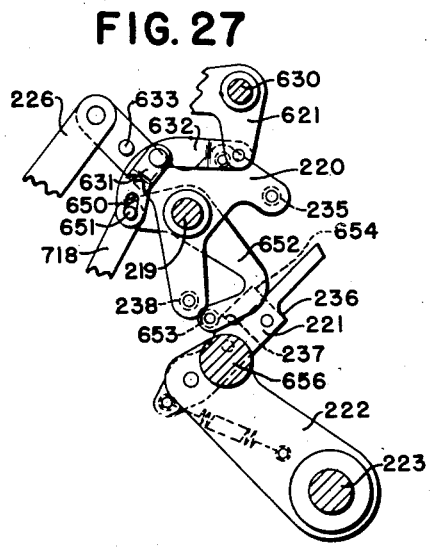
Inventor
HARRY L. LAMBERT
BY
*Earl Benst*
HIS Attorney April 8, 1952        H. L. LAMBERT        2,592,436
TRUE NEGATIVE TOTAL PRINTING MECHANISM
Filed April 3, 1945        12 Sheets-Sheet 11
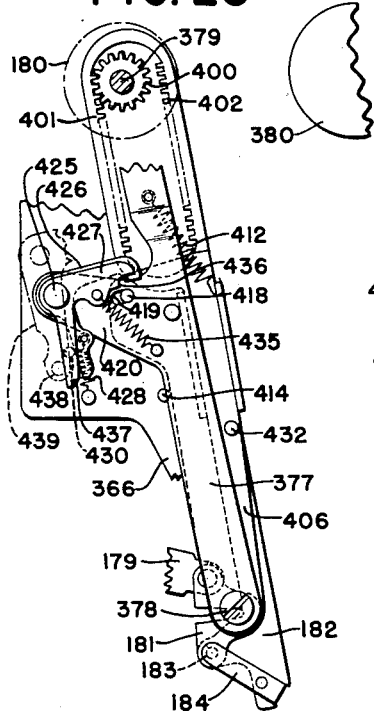
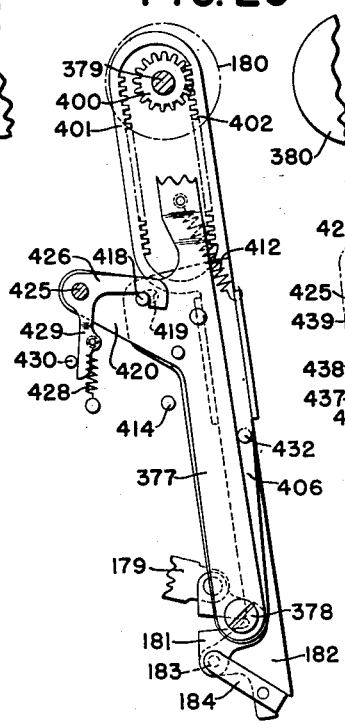
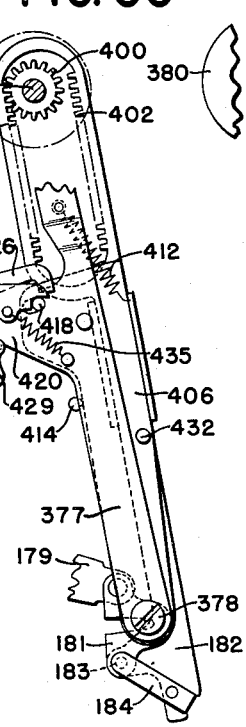
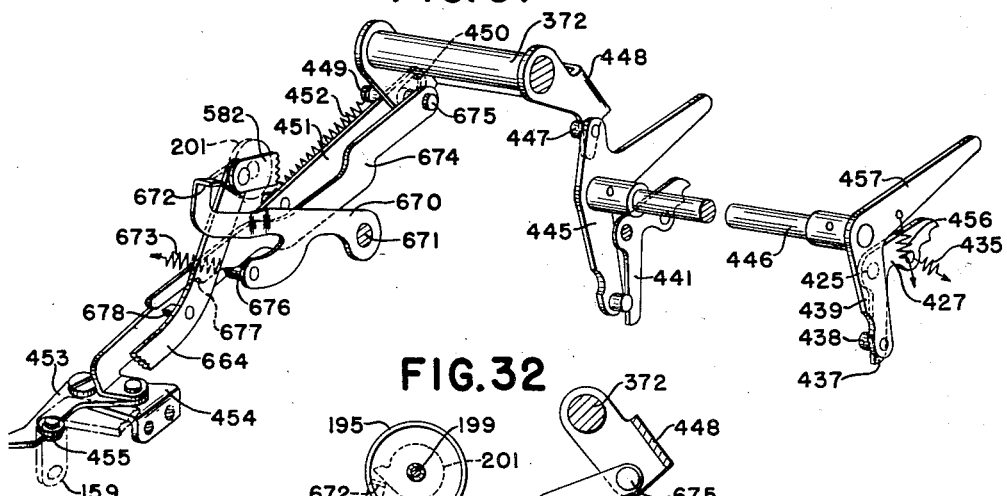
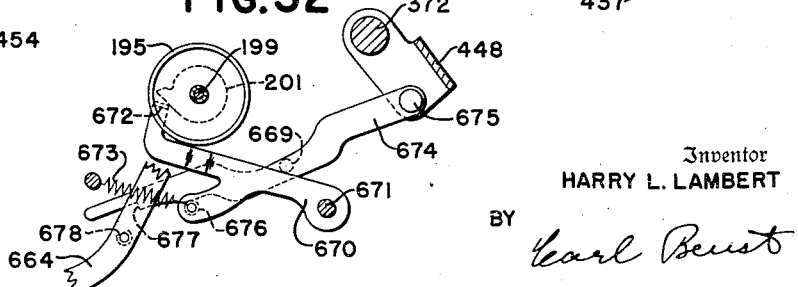
Inventor
HARRY L. LAMBERT
BY
HIS Attorney April 8, 1952 H. L. LAMBERT 2,592,436
TRUE NEGATIVE TOTAL PRINTING MECHANISM
Filed April 3, 1945 12 Sheets-Sheet 12

Inventor
HARRY L. LAMBERT
BY
*Carl Benst*
HIS Attorney

Patented Apr. 8, 1952

2,592,436

UNITED STATES PATENT OFFICE 2,592,436

TRUE NEGATIVE TOTAL PRINTING MECHANISM

Harry L. Lambert, East Rochester, N. Y., assignor, by mesne assignments, to The National Cash Register Company, Dayton, Ohio, a corporation of Maryland Application April 3, 1945, Serial No. 586,360

25 Claims. (Cl. 235—60.2)

This invention relates to a calculating machine which can be operated to perform operations of addition and subtraction and the taking of positive and negative totals and sub-totals.

It is an object of the invention to provide an improved calculating machine capable of performing addition and subtraction and the taking of positive and negative totals and subtotals, in which machine various components making up the machine have been simplified and improved to improve their operation and to reduce the cost of manufacturing the machine.

Another object of the invention is to provide a novel calculating machine having a printing mechanism which can be easily controlled and can operate in a facile manner to print the true values of entries in adding and subtracting operations and the true values of positive and negative totals and sub-totals in total-taking and sub-total-taking operations.

Another object of the invention is to provide a calculating machine in which a blank or extra operation of the machine is not required before a total-taking or sub-total-taking operation can take place following an amount-entering operation.

Another object of the invention is to provide simplified means for conditioning the machine to perform the various kinds of operations.

Another object of the invention is to provide means whereby the shifting of the keyboard to subtracting position automatically initiates an operation of the driving mechanism of the machine.

Another object of the invention is to provide improved means whereby a negative total or sub-total can be taken and the true value of the negative total or sub-total recorded in an operation which is substantially the same as that in which a positive total or sub-total is taken and recorded.

Another object of the invention is to provide a calculating machine which includes a single total key for controlling the taking of both positive and negative totals, and which also includes means controlled by the totalizer, according to whether the total in the totalizer is positive or negative, and operable in a total-taking operation to control the printing means to convert the complement of a negative total to the true value of the negative total when the negative total is printed.

Another object of the invention is to provide a calculating machine which includes a single sub-total key for controlling the taking of positive and negative sub-totals, and which also includes means controlled by the totalizer, according to whether the total in the totalizer is positive or negative, and operable in a sub-total-taking operation to control the printing means to convert the complement of a negative total to its true value when a negative sub-total is printed.

Another object of the invention is to provide a novel printing mechanism which is selectively operable to print values or the complements of the values and which is provided with zero printing control mechanism operable in either type of operation.

Another object of the invention is to provide novel "anti-slam" means for preventing the improper operation of the differential means in total-taking and sub-total-taking operations.

Another object of the invention is to provide novel totalizer engaging means and controls therefor.

Another object of the invention is to provide an improved transfer mechanism which can be completely restored from operated condition early in a succeeding operation of the machine.

Another object of the invention is to provide means whereby the highest denominational order wheel of the totalizer can control the entry of an amount in the lowest denominational order wheel of the totalizer.

Another object of the invention is to provide novel controls for the line-spacing mechanism to enable a long feeding of the paper to occur after a total or a sub-total has been printed.

Another object of the invention is to provide a novel record material guiding means in connection with the platen, said guiding means being effective to guide record material from the rear of the machine to printing position and being also effective to allow "front-feed" insertion of record material into printing position.

Another object of the invention is to provide a novel yieldable connection between the driving motor and the main drive shaft of the machine to prevent damage if some part of the machine should become blocked against normal operation.

With these and incidental objects in view, the invention consists of certain novel features of construction and combinations of parts, the essential elements of which are set forth in appended claims and a preferred form or embodiment of which is hereinafter described with reference to the drawings which accompany and form a part of this specification.

In said drawings,

Fig. 2 is a vertical section through the machine, showing the mechanism associated with, and controlled by, one denominational row of keys on the keyboard.

Fig. 3 is a view showing the relation between various elements of the tens transfer mechanism.

Fig. 10 is a plan view of the machine with the keyboard and certain other parts removed to show the differential mechanism and certain of the machine controls more clearly.

Fig. 11 is a side elevation view of the right side of the machine.

Fig. 12 is a detail view showing a portion of the means for releasing the driving mechanism for operation.

Fig. 13 is a side elevation view of the left side of the machine.

Figs. 14 and 15 are detail views of the pressure rollers which cooperate with the platen, and of the means for releasing them from engagement with the platen.

Fig. 16 is a side elevation showing the totalizer, the printing mechanism, and a portion of the differential mechanism.

Fig. 17 is a detail view of the means for shifting the type wheels to effect printing.

Fig. 18 is a perspective view of the basket which supports the double-rack members in the printing mechanism.

Fig. 19 is a side elevation, taken inside the right side frame of the machine, showing the means by which the control keys can exert their control in non-add operations and in total-taking and sub-total-taking operations.

Fig. 20 is a detail view of certain parts of the mechanism shown in Fig. 19, showing in particular the controls which are effective in a non-add operation.

Fig. 21 is a detail view of certain of the mechanism shown in Fig. 19, showing in particular the controls which are effective in total-taking and sub-total-taking operations.

Fig. 22 is a detail of a portion of the means shown in Fig. 19, showing the totalizer-engaging mechanism and the controls therefor, and the positions which they assume in total-taking and sub-total-taking operations.

Fig. 23 is a detail view of a type wheel and a portion of the double-rack member, showing the normal relation between these parts.

Fig. 24 is a rear view of a portion of the zero elimination mechanism.

Fig. 25 is a detail view of certain of the parts shown in Fig. 19, showing the parts in operated positions, and showing in particular the means for disengaging the totalizer from the differential mechanism at the beginning of the second half of a machine cycle in total-taking operations.

Fig. 26 is a perspective view of the means controlled by the highest denomination of the totalizer for controlling the entry of a value of "one" in the lowest denominational order of the totalizer.

Fig. 27 is a detail of a portion of the mechanism shown in Fig. 20, showing the totalizer-engaging mechanism and the controls therefor in the positions which they assume during a non-add operation.

Fig. 28 shows the printing mechanism in home position and shows the means for controlling the engagement of the type wheels with the racks of the double-rack member.

Fig. 29 shows the printing mechanism in partially moved position, with the type wheels shifted into engagement with the racks which set them in adding operations, and shows the control by which the shifting of the wheels is obtained in adding and positive total-taking and sub-total-taking operations.

Fig. 30 is similar to Fig. 28, showing the printing mechanism in home position, but with the machine set for subtraction or negative total-taking or sub-total-taking operations.

Fig. 31 is a perspective view showing the train of mechanism for controlling the engagement of the type wheels with either of the racks of the double-rack members in adding and subtracting operations, and according to whether the total is positive or negative in total-taking and sub-total-taking operations.

Fig. 32 is a detail of a portion of the mechanism of Fig. 31, showing in particular the means controlled by the totalizer for controlling the operation of the printing mechanism in total-taking and sub-total-taking operations, according to whether the total in the totalizer is positive or negative.

GENERAL DESCRIPTION

Figure 1:
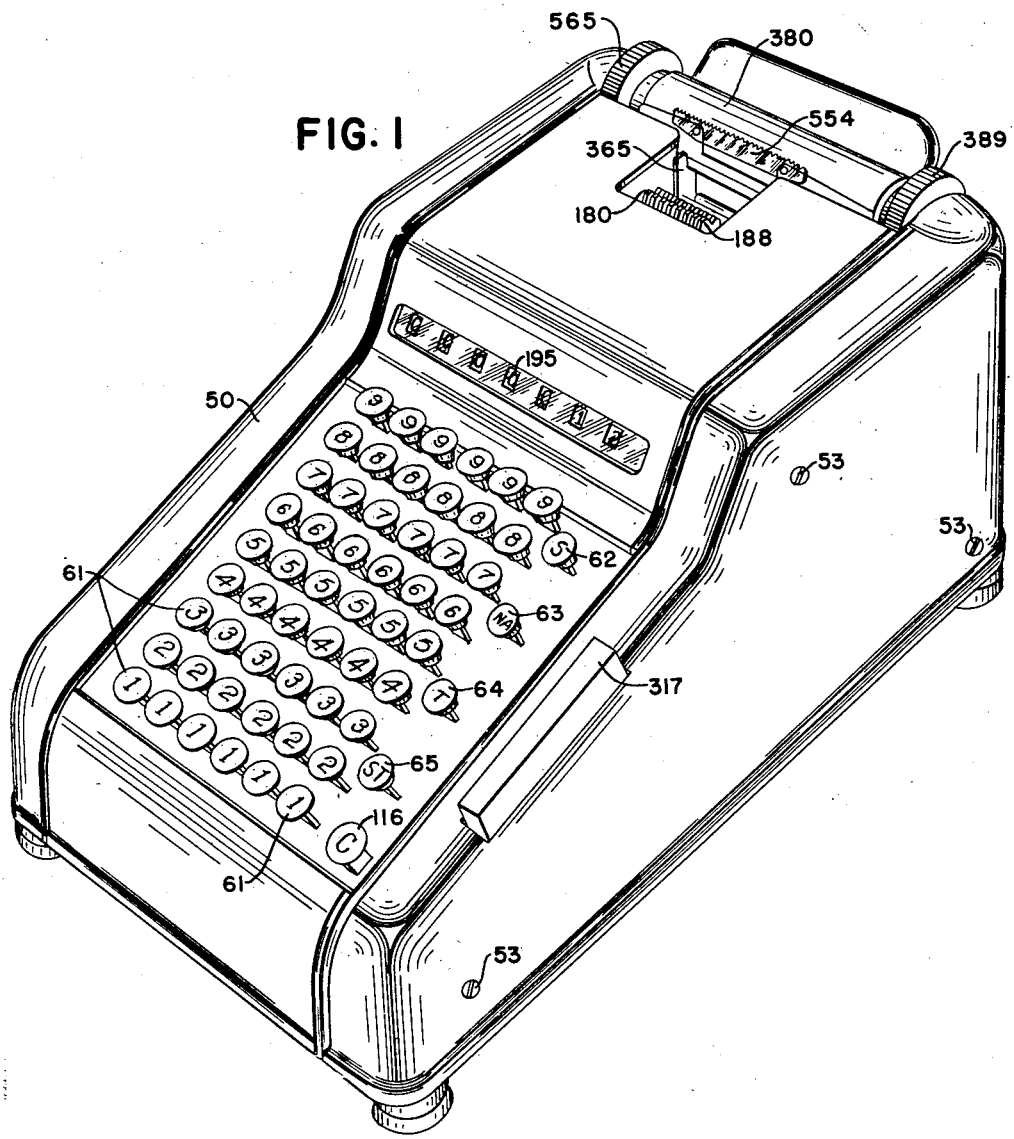
Fig. 1 is a perspective view of the novel machine.

The novel machine, which is shown in perspective in Fig. 1, is capable of performing adding, subtracting, and non-add operations and the taking of positive and negative totals and sub-totals.

The particular machine which is used to illustrate and explain the invention is a power-driven machine in which the operation of the driving means is initiated by the depression of any of a plurality of control keys located at the right of the machine, each of which control keys also causes the machine to perform a desired type of operation such as addition, subtraction, non-add, and the taking of totals and sub-totals.

As shown in Fig. 1, the machine is provided with a keyboard containing six denominational rows of amount keys and a row containing certain ones of the control keys.

The keyboard, which is mounted for limited lateral bodily movement in the machine, is normally located in its leftmost position to control the operation of the differential mechanism in adding operations, in which position the amount keys can control the movement of the differential mechanism extents corresponding to the amount set up on the keys to cause this amount to be entered additively into the totalizer.

Subtraction is effected in the novel machine by the method of complementary addition. In order to obtain the complements in the subtracting operation, the keyboard is shifted to the right a slight distance from its normal position. In the shifted position of the keyboard, the amount keys can control the movement of the differential mechanism extents corresponding to the nines complement of the amount set up on the keys to cause this complement to be entered additively into the totalizer.

As shown in Fig. 1, the totalizer provided in the novel machine contains seven totalizer wheels, one for each of the rows of keys on the keyboard, and an overflow wheel, which is located to the left of the totalizer wheel corresponding to the highest denominational row of keys on the keyboard.

In adding and subtracting operations, the totalizer is disengaged from the differential mechanism during the first half of a machine cycle while the differential mechanism is being set different extents under control of the keys, and is engaged with the differential mechanism during the second half of a machine cycle in these operations to enable the entries to be made into the totalizer as the differential mechanism is restored from its set positions. Due to the fact that, in the instant machine, subtraction is effected by complementary addition, the totalizer wheels will be rotated in the same direction for subtraction as for addition.

The highest denominational order wheel of the totalizer, or the overflow wheel, is effective to cause an entry of a value of "one" to be made automatically in the lowest denominational order wheel of the totalizer each time the highest order wheel passes from its "nine" position to or through its "zero" position. In the normal operation of the machine within its capacity, this automatic entry of the value of "one" will occur in all subtracting operations except the one in which a positive total in the totalizer becomes negative, and will occur in the adding operation in which a negative total becomes positive.

The operation of the machine in performing addition and subtraction may be understood more clearly from the following numerical example involving several additions and subtractions.

| (1) From 275    | 0000275 |
| (2) Subtract 125 | 9999874 |
|                 | 0000149 |
|                 | 1       |
|                 | 0000150 |
| (3) Subtract 175 | 9999824 |
|                 | 9999974 |
| (4) Subtract 129 | 9999870 |
|                 | 9999844 |
|                 | 1       |
|                 | 9999845 |
| (5) Add 88      | 0000088 |
|                 | 9999933 |
| (6) Add 75      | 0000075 |
|                 | 0000008 |
|                 | 1       |
|                 | 0000009 |

In the operation (1) above, the amount 275 is set up on the keyboard and is entered additively into the totalizer.

In the operation (2) above, the amount 125 is set up on the keyboard, and, in a subtracting operation, the nines complement of this amount is entered additively into the totalizer and added to the amount therein to obtain the amount 0000149. During the entry of the complement of 125 in the totalizer, the highest denominational order wheel of the totalizer will pass from its "nine" position to its "zero" position and will cause a value of "one" to be entered automatically into the lowest denominational order of the totalizer to cause the amount in the totalizer to be changed from 149 to 150, which is the correct amount resulting from the subtraction.

In the operation (3) above, the amount 175 is set up on the keyboard, and, in another subtracting operation, the nines complement of this amount is entered additively into the totalizer and added to the amount therein to obtain the amount 9999974. In this operation, the amount subtracted was larger than the amount in the totalizer and caused the total in the totalizer to become negative, the value 9999974 being the nines complement of the negative total of 25. It should be noted that in this operation the highest denominational order wheel did not pass from its "nine" position to its "zero" position, and there was no automatic entry of "one" into the units denominational order wheel of the totalizer, which totalizer remains set at the end of the operation to represent the nines complement of the negative total of 25, which is the correct amount resulting from this subtraction.

In the operation (4) above, the amount 129 is set up on the keyboard, and, in a further subtracting operation, the nines complement of this amount is entered additively into the totalizer and added to the nines complement of the negative total therein to produce a setting of 9999844. In this operation, the highest denominational order wheel of the totalizer passed from its "nine" position through its "zero" position and caused the automatic entry of "one" in the lowest denominational order of the totalizer to change the value in the totalizer from 9999844 to 9999845, which is the nines complement of the true negative total of 154 which resulted from the subtraction of 129 from the negative total of 25.

In the operation (5) above, the value 88 is set up on the keyboard, in an adding operation, and is entered additively into the totalizer and added to the amount therein to change the setting thereof from 9999845 to 9999933. During this operation, the highest denominational order wheel of the totalizer did not pass from its "nine" position to or through its "zero" position, and the value of "one" was not automatically entered into the lowest denominational order wheel of the totalizer. Since the amount added was less than the amount of the negative total previously in the totalizer, the totalizer, at the end of the operation, will be set to 9999933, which is the nines complement of the new negative total of 66, which is the correct amount resulting from the algebraic addition of 88 to the negative total of 154.

In the operation (6) above, the amount 75 is set up on the keyboard, and, in another adding operation, this amount is added to the nines complement of the negative total of 66, previously in the totalizer, to produce a setting in the totalizer of 0000008. The highest denominational order wheel of the totalizer will pass from its "nine" position to its "zero" position during this operation and will cause a value of "one" to be entered automatically in the lowest denominational order wheel of the totalizer to change the value 0000008 to 0000009, which is the correct result to be obtained by the algebraic addition of 75 to the negative total of 66.

From the above example it is seen that the totalizer is always set to the true value of any positive total and to the nines complement of any negative total. It is seen further that, in order to obtain these conditions, there will be an automatic entry of a value of "one" in the lowest denominational order of the totalizer in all subtracting operations except the one in which a positive total becomes negative, and such also will occur in an adding operation in which a negative total becomes positive.

In the novel machine, the means which are set under control of the totalizer to control whether or not a tens transfer will occur between adjacent orders of the totalizer is so constituted that it can be completely restored from its operated position early in a succeeding operation of the machine, before the differential mechanism begins its operation. This eliminates the requirement that a blank or extra operation of the machine be made before a total-taking or sub-total-taking operation can take place.

A single total key is provided for causing the machine to go through the necessary operations in the taking of positive and negative totals. In the total-taking operation, regardless of whether the total is positive or negative, the totalizer is engaged with the differential mechanism at the beginning of the operation, and, during the first half of the machine cycle of the operation, the differential mechanism rotates the totalizer wheels in the reverse direction from that in addition and subtraction, until the wheels are stopped in their "zero" positions. When the wheels have been stopped in their "zero" positions, the differential mechanism will have been displaced extents corresponding to the value which was on the totalizer at the beginning of the operation; that is, the true value of the total if the total was positive or the nines complement of the total if the total was negative. The totalizer is disengaged from the differential mechanism during the second half of the machine cycle and remains in its zeroized or cleared condition.

A single sub-total key is provided for causing the machine to go through the necessary operations in the taking of positive and negative sub-totals. The sub-total-taking operation is similar to the total-taking operation in that the totalizer is engaged with the differential mechanism during the first half of the machine cycle of the operation and controls the setting of the differential mechanism according to the amount of the total if the total is positive and according to the nines complement of the total if the total is negative. In the sub-total-taking operation, however, the totalizer remains engaged with the differential mechanism during the second half of the machine cycle, and the amount standing on the totalizer at the beginning of the operation is returned to the totalizer as the differential mechanism is restored to its home position.

The novel machine contains a printing mechanism which includes a series of type wheels. These type wheels are driven forward and backward selectively from an initial position by means of double-rack members which are operated different extents by the differential operation of the differential mechanism. In adding operations, gears secured to the type wheels mesh with one of the racks on the double-rack members, and, when the differential mechanism is moved extents corresponding to the values on the keys, the type wheels are moved corresponding extents in one direction to positions to print these values. In subtracting operations, the gears on the type wheels mesh with the other racks on the double-rack members, and, when the differential mechanism is moved extents corresponding to the nines complement of the value on the keys, the type wheels will be reversely rotated to positions to place the type representing the nines complement of the nines complement, or the true value set up on the keys, in printing position.

The printing section of the machine is provided with mechanism for controlling the printing of zeros, which mechanism is effective, when the type wheels move in either direction, to enable zeros to be printed to the right of the highest denomination in which a significant digit is to be printed and to prevent the printing of zeros to the left of this particular denomination.

With this novel form of printing mechanism, therefore, the true value of amounts set up on the keyboard in adding and subtracting operations are printed, even though, in subtracting operations, the differential mechanism is operated according to the nines complement of the amount set up on the keyboard.

In a similar manner, the printing mechanism is effective to print the true amount of the total or sub-total whether the total in the totalizer be positive or negative. When the total is positive, the gears on the type wheels are meshed with the same racks on the double-rack members as in adding operations, and the type wheels are set to positions to print values corresponding to the different extents of movement which the differential mechanism is given during the total- or sub-total-taking operation, so that the true value of the positive total is printed. When the total in the totalizer is negative, the gears on the type wheels are meshed with the other racks on the double-rack members, as in subtracting operations. It will be recalled that negative totals are registered on the totalizer wheels in complementary form and consequently as the differential is set under control of the totalizer, when it has a negative total registered therein, the differential moves according to said complementary amount and the type wheels, turning reversely such amount, are set to bring the type representing the true negative total to printing position. Accordingly, the printing of the true value of positive or negative totals and sub-totals is obtained simply by controlling with which racks of the double-rack members the gears on the type wheels will be in mesh.

The meshing of the gears on the type wheels with one or the other of the racks on the double-rack members is controlled by the lateral position of the keyboard in adding and subtracting operations and by the position of the highest denominational order wheel of the totalizer in total- and sub-total-taking operations.

Non-add operations of the novel machine are substantially the same as adding operations except that the totalizer is kept disengaged from the differential mechanism in the second half of the machine cycle as well as in the first half, and no entry is made in the totalizer.

The details of the various mechanisms by which the above operations and controls are obtained will now be explained.

DETAILED DESCRIPTION

The novel machine is provided with a suitable outer casing 50 (Figs. 1 and 2), which is secured to the side frames 51 and 52 (Figs. 2, 4, 5, 6, 7, 8, 10, 11, 13, 19, and 33) of the machine by screws as 53 (Fig. 1), which extend into spacing lugs as 54 (Figs. 7, 10, 11, and 13), which project from the side frames. This method of securing the outer casing to the machine frame enables the casing to be readily removed when it is desired to service the machine.

The side frames 51 and 52 are retained in proper spaced relation by various cross bars and rods and serve to support the various mechanisms of the machine, as will be explained hereinafter when the various mechanisms are considered.

Keyboard

The keyboard of the instant machine (Figs. 1 and 7) is provided with six denominational rows of amount keys 61, which are used to set up the amounts to be entered in adding and subtracting operations, each row of keys containing a key for each of the digits 1 to 9. Also provided in the keyboard, to the right of the amount keys 61, is a row of control keys containing a Subtract key 62, a Non-Add key 63, a Total key 64, and a Sub-Total key 65, which keys, when depressed, are effective to cause the machine to operate to perform subtracting and non-add operations and the taking of positive and negative totals and sub-totals.

The amount keys 61 of the various rows are mounted in the keyboard in a manner similar to that in which the amount keys are mounted in the keyboard of the machines disclosed in United States Patent No. 1,386,021, issued to Heber C. Peters on August 2, 1921, and in United States Patent No. 2,062,731, issued to Charles Schroder on December 1, 1936.

Figure 9:
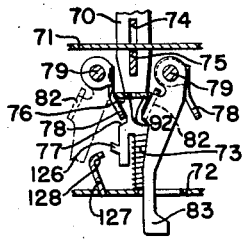
Fig. 9 is a section through a portion of the keyboard, showing an amount key and its relation to the key retaining plate and the zero stop operating bail.

Referring to Figs. 2 and 9, it will be seen that each of the keys is provided with a stem 70, which is guided in the top and bottom plates 71 and 72 of the keyboard. Each key is urged yieldingly and resiliently in an upward direction by a coil spring 73, which surrounds the lower end of the key stem 70 and acts between a shoulder of the key stem and the bottom plate 72 of the keyboard. Each key stem is also provided with a slot 74 at approximately the section which passes through the top plate 71 of the keyboard. A bar or rod 75 passes through the slots 74 of the keys of each row and, by engagement with the ends of the slots, limits the extent of endwise movement of each key.

One side of the key stem of each key of a row is provided with an upper latching notch 76 and a lower clearance notch 77, which cooperate with a spring-urged latching plate 78 to enable any key in the row to be latched in depressed position. The latching plates 78 (Figs. 2 and 9) are pivoted upon rods 79, which extend from the front to the rear of the keyboard at one side of each row of keys and are supported by front and rear plates 80 and 81 of the keyboard. When the keys of a row are in their uppermost positions, the latching plate 78 will enter into the lower or clearance notches 77; however, when any key is pushed downwardly, the latching plate 78 for that row will be cammed out of the lower notch 77 and will enter into the upper notch 76 in the stem of that key to latch the key in its depressed position. Since all the keys in a row are engaged by the same latching plate 78, the camming of the plate 78 by the depression of any key in the row will move the plate 78 from engagement with the latching notch 76 in the stem of any previously depressed key and will cause the previously depressed key to be released.

The opposite edges of the key stems are also provided with cam surfaces for operating a zero stop operating bail 82, which is pivoted on the rod 79 that carries the latching plate for the next row of keys to the right. The zero stop operating bail 82 carries at its front edge a zero stop 83, which extends downwardly through the bottom plate 72.

The latching plate 78 and the zero stop operating bail 82, which are mounted on the same rod 79, are urged into engagement with their related keys by a spring 85 (Fig. 2) carried by the rod 79, one end of the spring engaging the zero stop operating bail and the other end of the spring engaging the latching plate mounted on the same rod.

In an adding operation, when none of the keys in the row is depressed, the lower end of the zero stop 83 will be in position to block the operation of the differentially operable means associated with that row of keys, but, whenever a key in the row is depressed, the cam surface on that key stem will cam the related zero stop operating bail 82 to one side, to remove the lower end of the zero stop 83 from blocking relation with the differentially operable means to allow this means to be set differentially under control of the keys.

The control keys (Fig. 4) also have key stems which are formed with latching notches, clearance notches, and cam surfaces, for cooperation with a latching plate 78 and a zero stop operating bail 82 in the same manner as the amount keys 61. The control keys, when depressed, are effective to control the operation of a differentially operable means associated therewith and, in addition, are provided with depending extensions, as, for example, the extension 84 of the Subtract key 62 (Fig. 4), by which they can exert the necessary control over the operation of the machine to perform the different types of operations.

The usual key release bail 87 (Figs. 2, 5, 6, 7, and 11) extends across the front of the keyboard and is pivoted on studs 88 and 89, which extend from the front part of the side frames 90 and 91 of the keyboard. The key release bail 87 is provided with rearwardly extending fingers 92 (Figs. 2 and 9) opposite the various rows of amount keys. When the key release bail 87 is rocked clockwise (Fig. 2) upon the studs 88 and 89, the fingers 92 will rock the latching plate 78 and the zero stop operating bails 82 out of engagement with the amount keys to release any depressed amount keys and to move the zero stops from blocking relation with their related differentially operable means. The key release bail 87 is also provided with a finger 93, which is associated with the bank of control keys, but this finger is ineffective to rock the latching plate 78 or the zero stop operating bail 82 associated with these keys when the key release bail is rocked about the studs 88 and 89.

In adding and subtracting operations, the bail 87 is rocked automatically at the end of a machine cycle operation to release the keys which have been set to control the entry in that operation. This automatic rocking of the key release bail 87 is effected by the usual automatic key release lever 99 (Fig. 11), which is pivoted on a stud 100 on the right side plate 91 of the keyboard. The key release lever 99 is urged clockwise by a spring 101 connected to an upward extension of the lever and to a stud 102 on the side plate 91, but in the normal condition of the machine the release lever is maintained in the position shown in Fig. 11, by the engagement of a depending arm 103 at the rear end of the lever 99 with a stud 104 on a plate 105 secured to a main shaft 106, which is journaled in the side frames 51 and 52. When the machine begins to operate, the plate 105 is rocked counter-clockwise, causing the stud 104 to move away from the depending arm 103 of the lever 99 and allow the spring 101 to rock the lever clockwise about the stud 100. The forward end of the key release lever 99 is provided with a by-pass pawl 107, which, in the clockwise movement of the lever 99, idly passes a roller 108 on an arm 109 extending rearwardly from the key release bail 87. Upon the return of the plate 105 to its home position, the stud 104, engaging the arm 103 of the key release lever 99, will rock the lever counterclockwise to the position shown in Fig. 11, and, during the counter-clockwise movement of the key release lever 99, the by-pass pawl 107 will engage the roller 108 and rock the key release bail 87 clockwise (Figs. 2 and 11) to release the amount keys.

In addition to its being capable of pivotal movement about the studs 88 and 89, the key release bail 87 is also capable of limited movement crosswise of the keyboard. As shown in Fig. 7, the key release bail 87 is urged toward the right of the keyboard by a spring 115, compressed between the bail 87 and an enlarged head on the stud 88. The key release bail 87 is shifted to the left by a Correction key 116 (Figs. 5, 6, 7, and 11) located at the front of the keyboard to the right of the bank of control keys. The Correction key 116 is connected to a lever 118 by a pin 117, which extends through a suitable opening in the side plate 91 of the keyboard, the lever 118 being pivoted on a stud 119 on the side plate 91. The lever 118 is urged clockwise about the stud by a spring 123 connected to the rear end of the lever, and, at its forward end, the lever has a bent-over portion which is provided with a cam surface 120 (Fig. 6) cooperable with a roller 121 on the key release bail 87. When the Correction key 116 is depressed, it will depress the front end of the lever 118, causing the cam surface 120 to engage the roller 121 to shift the key release bail 87 to the left and enable the fingers 92 and 93 to shift the latching plates 78 associated with the amount keys and the control keys, and will shift these latching plates out of engaging relation with the keys, thereby to release any key which may have been depressed. The forward end of the lever 118 is provided with a slot 122, which embraces the stud 89 and, in conjunction with an enlarged head on the stud, is effective to support the end of the lever 118 when it is camming the key release bail 87 to the left.

The amount keys and the control keys of the keyboard are provided with a further locking means similar to the one shown in the above-mentioned Schroder patent. The notched side of each of the key stems 70 is provided with a lug 126 located below the lower or clearance notch 77. Cooperating with these lugs 126 is a locking strip 127, which extends along the row of keys and is rockably supported on the bottom plate 72 of the keyboard by means of lugs which extend into suitable openings in the bottom plate.

The locking strip 127 is provided with a flange 128 so located relatively to the lugs 126 that, when the locking strip is rocked, the flange can pass under the lugs 126 of the keys which are undepressed to prevent these keys from being depressed and can pass over the lug 126 of a depressed key to prevent the key from being restored completely from depressed position during a machine cycle of operation.

Figure 4:
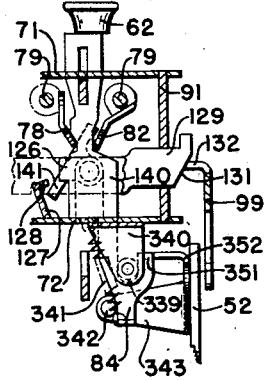
Fig. 4 is a sectional view of a portion of the keyboard taken along line 4—4 (Fig. 8), showing the Subtract key and the means associated therewith.
Figure 5:
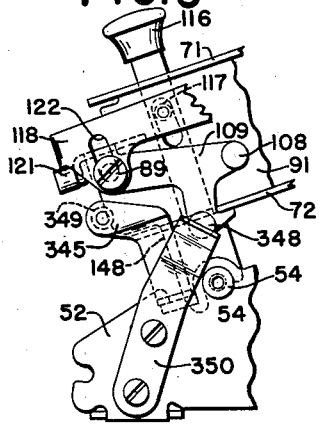
Fig. 5 is a side elevation of a portion of the keyboard showing in particular the Correction key and the means associated therewith.

The rocking of the locking strip 127 is caused by a bar 129 (Fig. 4), which extends across the keyboard at a point adjacent the rear plate 81 and is notched along its lower edge to receive the upper edge of the locking strip. The bar 129 is urged to the right of the keyboard by a spring 130 (Fig. 13), connected to the side plate 90 of the keyboard and extending through the bar 129, until a cam surface 131 on the right end of the bar engages a bent-over extension 132 (Figs. 4 and 11) of the key release lever 99. In the normal unoperated condition of the machine, the rear end of the lever 99 is maintained in its upward position by the stud 104, and, as shown in Fig. 4, the lateral extension 132 on the lever, cooperating with the cam surface 131, is effective to maintain the bar 129 in its leftmost position, which positions the locking strip 127 with the flange 128 out of engaging relation with the lugs 126 on the key stems. When the machine is operated and the spring 101 is allowed to rock the key release lever 99 clockwise, the lateral extension 132 moves downwardly (Fig. 4), releasing the bar 129 for movement to the right by the spring 130. This movement of the bar 129 to the right causes the locking strips 127 to rock and place their flanges 128 in cooperative relation with the lugs 126 on the key stems to maintain the keys in their depressed or undepressed positions during the operation of the machine. As the plate 105 returns to its home position near the end of the machine cycle of operation, the stud 104 will rock the lever 99 counterclockwise (Fig. 11), and the extension 132 will move into engagement with the camming surface 131 to shift the bar 129 to the left and rock the locking strips 127, thus removing the flanges 128 from engaging relation with the lugs 126, and freeing the keys.

As explained earlier herein, the key release bail 87 is ineffective to release the control keys when the bail is rocked about studs 88 and 89. Accordingly, other means must be provided to release the control keys automatically near the end of each machine operation. These means are shown particularly in Fig. 4, in which is shown a lug 140 secured to the bottom plate 72 of the keyboard at a point adjacent the row of control keys, and pivoted to this lug is a lever 141 having one arm in the path of movement of the locking strip 127 associated with the row of control keys and having another arm associated with the latching plate 78 associated with this row of keys. As the locking strip 127 is rocked by the bar 129 early in the operation of the machine, the flange 128 will engage the arm of the lever 141 and rock the lever counterclockwise about the pivot, causing the other arm of the lever 141 to engage the latching plate 78 to move it from engagement with the notches in the keys and release the keys from the control of the latching plate 78. However, while the keys are released from the control of the latching plate at this time, any depressed key will still be held in its depressed position by the flange 128 engaging the lug 128 on that key. Near the end of the operation of the machine, when the bar 129 is restored to the left, the flange will be removed from above the lug on the depressed key, and that key can then be restored to its undepressed position.

The entire keyboard is mounted for bodily movement laterally of the machine. As seen in Figs. 2 and 11, the rear edges of the side plates 90 and 91 of the keyboard are notched to enable the plates to straddle and slide laterally on trunnions 143 and 144 (see also Fig. 10) secured to the side frames 51 and 52 of the machine. The side plates 90 and 91 are also provided adjacent their front ends with downwardly extending portions 147 and 148 (Figs. 7 and 11), which are notched to fit over and slide laterally on studs 149 and 150 (Fig. 10) extending inwardly from the side frames 51 and 52, respectively.

This form of mounting of the keyboard in the machine enables the keyboard to be placed in the machine simply by slipping the notches in the side plates 90 and 91 over the trunnions 143 and 144 and lowering the notches in the downwardly extending portions 147 and 148 over the studs 149 and 150.

In order to maintain the studs 149 and 150 in the notches in the downwardly extending portions 147 and 148 of the keyboard and thereby retain the keyboard in proper position in the machine, suitable retaining means are provided. A retaining member 151, secured to the front plate 80 of the keyboard, extends downwardly therefrom and carries a roller 152, which engages the under side of a cross bar 153 secured in the side frames 51 and 52, to thereby retain the keyboard in proper position with the studs 149 and 150 securely engaged in the notches in the downwardly extending portions of the side plates 90 and 91. While the retaining member 151 retains the studs 149 and 150 in the notches, it does not prevent shifting of the keyboard laterally of the machine.

The keyboard can be removed from the machine merely by loosening the retaining member 151 from the front plate 80 sufficiently to allow the roller 152 to be moved forwardly to clear the cross bar 153, then raising the front of the keyboard to remove the notches in the downwardly extending portions 147 and 148 from the studs 149 and 150 and slipping the keyboard forwardly until the notches in the plates 90 and 91 are removed from the trunnions 143 and 144.

The keyboard normally is located in its leftmost position, where it is urged, at the front of the keyboard, by a spring 155 (Fig. 7) connected between the member 151 and a pin 156 on a cross frame 157 secured between the side frames 51 and 52 and, at the rear of the keyboard, by a spring-urged plunger 158, which is journaled in the side frame 51 and engages a downward extension of a bracket 159 secured to the bottom plate 72 of the keyboard and extending from the left of the keyboard near the back thereof.

The means for shifting the keyboard from its normal position to the right in subtracting operations will be explained fully when the operation of the machine in a subtracting operation is considered.

*Differential mechanism*

The differential mechanism used in the novel machine is substantially like the one shown and described in my co-pending United States patent application, Serial No. 475,729, which was filed February 13, 1943, now Patent No. 2,445,225.

The differential mechanism includes a differentially operable means for operating an overflow totalizer wheel, and a differentially operable means for each of the denominational rows of amount keys 61 and for the row of control keys on the keyboard. Since all of the differentially operable means associated with the rows of amount keys are alike, and the other differentially operable means are similar thereto, it is believed that an understanding of the construction and operation of these means will be clear from a description of the differentially operable means associated with one of the denominational rows of amount keys.

A stop bar 165 (Figs. 2, 7, 10, and 16) is located immediately below the row of amount keys, when the keyboard is in its normal leftmost position. The stop bar 165 is pivotally connected at its rear end to an upwardly extending arm 166 of a diverging lever and is suitably guided at its forward end in a slot in a supporting plate 167 so as to be movable longitudinally immediately below the keys. A spring 168 (Fig. 2), which is connected to the stop bar 165 and to the supporting plate 167, normally urges the stop bar to the left, as seen in Fig. 2, and, when the machine operates, the stop bar will be moved to the left by the spring 168 until it engages the zero stop 83 if no key is depressed, or until one of the abutments on the upper edge of the bar engages the lower end of a depressed key. The abutments on the upper edge of the stop bar 165 are so spaced along the stop bar that, when one of them engages its respective key, it will limit the movement of the stop bar 165 to an extent which corresponds to the value of that key.

The diverging lever is pivotally mounted on a diverging lever shaft 169, which is journaled in the side frames 51 and 52. A totalizer actuating rack 170 (Figs. 2 and 3) is mounted on the upper end of the upwardly extending arm 166 of the diverging bar by means of a pair of shouldered studs 171 on the rack, which slide freely within the slots 172 in the upwardly extending arm 166 of the diverging lever and is urged rearwardly by a spring 173 connected to a bent-over ear 174 at the front of the rack 170 and to the arm 166 of the diverging lever, which spring tends to move the studs 171 to the rear end of the slots 172. Since the diverging lever is connected to the stop bar 165, it will move with the stop bar and will be controlled in its extent of movement by the engagement of the stop bar with the zero stop 83 or by the engagement of one of the abutments with a depressed key. As the stop bar moves to its zero position, where it would be engaged by the zero stop 83, the diverging lever moves a like extent, but the rack 170 remains in home position because at this time the spring 173 causes the rack to move relatively to the arm 166 of the diverging lever until the studs 171 move from their normal positions in the slots 172, as shown in Fig. 3, to the rear ends of the slots. If any key has been depressed, the stop bar will move past its zero position and will continue to move until one of the abutments on the stop bar engages the depressed key, and the actuating rack 170, which is carried by the diverging lever and is controlled by the stop bar, will be given a movement from its home position sufficient to cause an entry corresponding to the value of the depressed key to be made in the totalizer.

As the diverging lever is returned to its home position, a laterally extending lug 175, secured to the actuating rack 170, will engage a transfer lever latch 176, if no transfer is to be made, and will arrest further rearward movement of the actuating rack 170, causing the spring 173 to be tensioned as the studs 171 move from the rear ends of the slots 172 to the middle of the slots, as shown in Fig. 3.

The diverging lever is also operable to control the setting of the type wheel 180 in the printing mechanism to cause the amount set up on the keys to be printed. A rearward extension 179 of the diverging lever is connected by a link 181 to a double-rack member 182. The double-rack member 182 is effective to set the type wheel in a manner which will be explained fully hereinafter, the double-rack member 182 being provided with a stud 183, which is retained in a hole in the lower end of the link 181 by a spring clip 184.

The stop bar 165 and the diverging lever are normally held in their home positions, as shown in Fig. 2, by means of a cross bar 185, which engages the front edge of the upwardly extending arm 166 of the diverging lever and retains the diverging lever and the stop bar in this position against the action of the spring 168. The cross bar 185 extends across the machine and is supported near the top of arms 186 and 187 (see also Fig. 19), which are secured to the shaft 169 at points on either side of the group of diverging levers, but within the side frames 51 and 52.

The arm 187 (Fig. 19), which is secured to the shaft 169 at the right side of the machine, has a downward extension which carries a roller 189. The roller 189 extends into a cam slot 190 in a lever 191 secured to the main shaft 106 of the machine. The cam slot 190 is so shaped that, when the main shaft is rocked counter-clockwise during the first half of a machine cycle of operation, the cross bar 185 will be moved forward, at the proper time, a distance sufficient to accommodate the maximum displacement required of the stop bar and the diverging lever. As the cross bar 185 moves forward, the spring 168 will yieldingly move the stop bar and the diverging lever with the cross bar until the stop bar and the diverging lever are stopped in their proper displaced positions, as determined by the zero stop or by the depressed key, after which the cross bar will leave the front edge of the upwardly extending arm 166 of the diverging lever and continue its movement to the maximum extent as determined by the shape of the cam slot 190. When the main shaft returns to its normal position shown in Fig. 2, the cam slot will cause the cross bar 185 to move to the right into the position shown, and the cross bar in its return movement picks up the diverging lever and the stop bar in their set positions and carries them with it back to their normal positions.

In the operation of the machine for addition, the totalizer will be engaged with the differential mechanism during the return movement of the diverging lever by the cross bar 185, and the totalizer wheel related to this differentially operable means will be rotated clockwise, as seen in Fig. 2, to enter into the totalizer an amount corresponding to the value represented by the displacement of the diverging lever.

The differentially operable means associated with the overflow wheel of the totalizer operates in the same manner as the differentially operable means described above. However, since there are no amount keys in the keyboard to cooperate with the stop bar 165 to control its extent of movement, the zero stop for this differentially operable means will remain in blocking position in all adding operations, and the stop bar and the diverging lever will merely move to their zero positions, entries into the overflow wheel of the totalizer being made solely by a transfer actuation of the rack 170 in these operations.

Accordingly, the differential mechanism can be controlled by the keyboard in operation of the machine for addition to cause the entry into the totalizer of such amounts as are set up thereon by the depression of the keys.

The differentially operable means associated with the row of control keys is similar to the one associated with the amount keys. This differentially operable means, however, is merely used to set a symbol type wheel 188 to place symbols indicating the various types of operations in printing position and accordingly is not provided with a rack similar to the rack 170. In adding operations, none of the control keys is depressed, and the differentially operable means associated with this row of keys will be stopped by its zero stop 83.

Totalizer

The totalizer (Figs. 1, 2, 10, and 16) consists of seven totalizer wheels 195 including an overflow wheel, and a wheel for each denominational row of amount keys. The totalizer wheels are mounted in a totalizer supporting frame that is rockable to engage and disengage the totalizer with and from the differential mechanism.

The totalizer supporting frame is composed of a plurality of plates 196, which are secured in proper spaced relation on a shaft 197 and are connected in proper spaced relation near their rear ends to a suitable rod 198. The frame thus formed is rockable about the trunnions 143 and 144, which extend into recesses in the ends of the shaft 197.

Extending through and secured to the plates 196 near their rear ends is a rod 199 (Fig. 16), upon which the totalizer wheels 195 are individually rotatable. Each totalizer wheel 195 has a gear 200 connected to it on the right (Figs. 2 and 16) by a spacing sleeve, and has a tens transfer cam 201 (Fig. 10) suitably connected to it on the left. The totalizer wheel unit thus formed occupies the space between adjacent plates 196, which serve to retain the unit in its proper lateral position. The trunnions 143 and 144 are adjustable in the side frames 51 and 52 to enable the totalizer to be moved crosswise of the machine to aline the gears 200 with the actuating racks 170.

Alining means is associated with the totalizer to prevent the totalizer wheels 195 from being accidentally displaced when their associated gears 200 are disengaged from the actuating racks 170. The alining means consists of a series of alining plates 202 (Figs. 2 and 10), which are secured to a pair of rods 203 and 204 fastened to the side frames 51 and 52. These plates 202 are located opposite the gears 200, and each plate 202 is formed with a tooth 205, which can be engaged by its related gear 200 when the totalizer is disengaged from the differential mechanism, and can prevent undesired rotation of the totalizer wheel unit.

The mechanism by which the engagement and disengagement of the totalizer with and from the differential mechanism is effected will now be described.

Totalizer engaging mechanism

In an adding operation, the totalizer normally in engagement with the differential mechanism, is disengaged from the differential mechanism during the first half of the machine cycle of operation and is engaged with the differential mechanism during the second half of the machine cycle of operation; that is, the gears 200, connected to the totalizer wheels 195, will be moved out of engagement with the actuating racks 170 during the time the racks are being moved forward different extents, according to the values set up on the keyboard, and will be moved into engagement with the actuating racks to be driven counter-clockwise thereby when the racks are being positively restored from their displaced positions. The extent of counter-clockwise movement of the totalizer wheels 195 will correspond to the values which have been set up in their related denominational rows of keys on the keyboard.

The mechanism for shifting the totalizer into and out of engagement with the differential mechanism at proper times in an adding operation will now be described.

The plate 196 (Figs. 2, 19, and 20), forming the right side of the totalizer supporting frame, has a downward extension 210, which carries near its end a roller 211. The roller 211 extends into a cam slot 212 in a lever 213, which is pivotally mounted on a stud 214 extending inwardly from the right side frame 52. The upper portion of the cam slot 212 is farther from the stud 214 than is the lower portion, so that, when the lever 213 is in the position in which the roller 211 is in the upper portion of the cam slot 212, the totalizer supporting frame will have been rocked about the trunnions 143 and 144 to shift the totalizer into engagement with the differential mechanism.

When the lever 213 has been shifted from the position shown in Fig. 19 to the position shown in Fig. 20, the roller 211 will occupy the lower portion of the cam slot 212, and, since this portion is closer to the stud 214, the roller 211 will have moved to the right, and the totalizer supporting frame will have pivoted about the trunnions 143 and 144 to shift the totalizer out of engagement with the differential mechanism.

A detent latch 215 (Figs. 19 and 20), pivoted on a stud 216 on the lever 213 and urged counter-clockwise by a spring 217, cooperates with a stud 218 on the inside of the side frame 52 to position the lever 213 accurately in either the position shown in Fig. 19 or the position shown in Fig. 20 and to yieldingly retain the lever in either position.

The lever 213 is rocked about the stud 214 by an actuating means which includes link 226, a three-armed lever 220 pivoted on a stud 219 on the inside of the side frame 52, and a driving pawl 221 pivotally mounted on an arm 222 secured to a shaft 223, which is driven from the main shaft 106 by a link 224 (Fig. 11) connected to the plate 105 and to an arm 225 also secured to the shaft 223. The driving pawl 221 is normally urged into alinement with the arm 222 by a spring 227 connected to the end of the pawl 221 and to the arm 222.

At the end of an adding operation, the totalizer will be engaged with the differential mechanism, and the parts of the totalizer engaging mechanism will be in the positions shown in Fig. 19. As shown in this figure, an upwardly extending finger on the pawl 221 is urged into engagement with a stud 235 on an arm of the three-armed lever 220. In a subsequent adding operation, the shaft 223 will be rocked counter-clockwise by the main shaft 106 during the first half of the machine cycle of operation. Before the actuating racks 170 begin to move forwardly, a shoulder 236 on the pawl 221 will engage the stud 235 on the three-armed lever 220 and will rock the lever 220 counter-clockwise about the stud 219, from the position shown in Fig. 19 to the position shown in Fig. 20.

This movement of the lever 220 will be effective, through the link 226, to rock the lever 213 to place the lower part of the cam slot 212 in cooperation with the roller 211 and thereby shift the totalizer out of engagement with the differential mechanism, the totalizer remaining in this position during the first half of the machine cycle, while the actuating racks are being displaced different extents under control of the amount keys.

Fig. 20 shows the position of the totalizer and the parts of the engaging mechanism in the positions which they assume at the end of the first half of the machine cycle of the operation. It will be noted in this figure that the pawl 221 is now urged by the spring 227 into engagement with a stud 238 on three-armed lever 220, and a shoulder 237 on the pawl is in driving engagement with said stud 238. Early in the clockwise return movement of the arm 222 (Fig. 19), the shoulder 237 will, through its engagement with the stud 238, rock the three-armed lever 220 clockwise (Fig. 20). Clockwise movement of the three-armed lever 220 will, through the link 226, rock the lever 213 to place the upper end of the cam slot 212 in cooperation with the roller 211, which causes the totalizer supporting frame to rock about the trunnions 143 and 144 and engage the totalizer with the differential mechanism. The totalizer will be engaged with the differential mechanism before the actuating racks 170 begin their return movement, and this enables the totalizer wheels to be driven counterclockwise different extents as the actuator racks are returned from their displaced positions. In this manner, the engagement and disengagement of the totalizer and the differential mechanism are effected in adding operations to enable amounts set up on the keyboard to be entered into the totalizer. The manner in which the totalizer engaging mechanism is controlled and operates in subtracting and non-add operations and in total- and sub-total-taking operations will be explained fully when the operation of the machine to perform these operations is considered.

*Tens transfer mechanism*

The tens transfer mechanism disclosed herein is similar in many respects to the one shown and described in the above-mentioned United States Patent No. 1,386,021; however, it has been improved to enable the parts of the transfer mechanism to be completely restored from their operated positions before the actuating racks move forward in a subsequent operation of the machine.

As explained earlier herein, each actuating rack 170 (Fig. 3) is mounted at the top of the upwardly extending arm 166 of the diverging lever, for limited movement relative thereto, and is urged rearwardly by the spring 173, which tends to move the studs 171 to the rear ends of the slots 172, which movement is prevented, when no transfer is to take place, by the engagement of the lug 175 on the actuating rack 170 with the lower end of a transfer lever latch 176 shortly before the diverging lever reaches its home position.

Transfer levers 240 (Figs. 2 and 3) are provided between adjacent denominational orders of the totalizer. These transfer levers are formed with bent-over lugs 241 at their forward ends and are pivotally supported at their rear ends on a rod 242 carried by the rearward extensions of the alining plates 202. Substantially midway between the lug 241 and the rod 242, each transfer lever 240 is formed on its upper edge with a lower surface 243 and a higher surface 244, which can cooperate with a lateral lug 245 on the transfer lever latch 176.

The transfer lever latches 176 are pivoted on a rod 250 carried by the alining plates 202, and each transfer lever latch is urged counter-clockwise about the rod by a spring 251 connected between a forwardly extending arm 252 of the transfer lever latch 176 and its related transfer lever 240. The spring 251 is also effective to urge the transfer lever 240 upwardly to maintain the upper edge thereof in engagement with the bottom of the lug 245 on the transfer lever latch. The parts are shown in Fig. 3 in their normal unoperated positions, in which the lug 245 on the transfer lever latch 176 engages the lower surface 243 of the upper edge of the transfer lever 240 and also engages the shoulder formed by the lower surface 243 and the higher surface 244 on the transfer lever to retain the transfer lever latch 176 against counter-clockwise movement. In this position, the lower end of the transfer lever latch 176 can be engaged by the lug 175 on the actuating rack 170 and can move the studs 171 from the rear ends of the slots 172 as the diverging lever moves to its home position. The distance which the studs 171 are moved from the ends of the slots 172, as shown in Fig. 3, is equal to that necessary to cause an entry of a value of "one" to be made in the totalizer wheel.

When it is desired to effect a tens transfer from a lower denominational order to a higher denominational order, the transfer lever latch 176 is rendered ineffective to stop the actuating rack 170 in the position shown in Fig. 3, and the spring 173 will cause the studs 171 to remain in engagement with the rear ends of the slots 172 to effect the entry of the value of "one" in the totalizer wheel. The manner in which the transfer lever latch is controlled to enable a tens transfer to be effected is as follows:

As the totalizer wheel 195 in the lower denominational order passes from its "nine" position to its zero position, the transfer cam 201 secured to the wheel will engage the lug 241 on the transfer lever 240 and will rock the transfer lever counter-clockwise (Fig. 3) slightly about the rod 242 to remove the shoulder on the transfer lever from the blocking relation with the lug 245 on the transfer lever latch 176 and allow the latch to move counter-clockwise to the position shown in dot-and-dash lines in Fig. 3, where the lug 245 will be over the higher surface 244 on the transfer lever 240 and will latch the transfer lever in its moved position. This counter-clockwise movement of the transfer lever latch 176 will move its lower end rearwardly, thus allowing the actuating rack 170 of the next higher denominational order to move past its home position sufficiently in the return movement of the diverging lever to cause the value of "one" to be entered in the next higher denominational order totalizer wheel.

If the actuating rack 170 has been arrested in its home position before the transfer lever 240 is tripped, as when a tens transfer entry in one order causes a tens transfer entry to be made in a higher order, then the spring 173 will be effective to move the actuating rack 170 of the higher order rearwardly until the lug 245 of lever 176 engages the vertical surface back of the step 244 to thereby enter the value of "one" in the associated totalizer wheel 195.

In addition to the usual tens transfer mechanism between adjacent totalizer wheels, the totalizer is provided with means similar to the transfer mechanism whereby the overflow wheel can control the entry of a value of "one" in the lowest denominational order of the totalizer. As seen in Fig. 26, the transfer cam 201, connected to the overflow wheel 195 of the totalizer, can engage a lug 254 on a transfer lever 255 and rock the transfer lever 255 about the rod 242. The transfer lever 255 is connected by a yoke 256 to a similar transfer lever 257 adjacent the actuating rack 170 associated with the lowest denominational order totalizer wheel 195. When the transfer lever 255 associated with the overflow wheel 195 of the totalizer is rocked, it will be effective, through the yoke 256, to rock and transfer lever 257 associated with the lowest denominational order actuating rack 170 and allow the transfer lever latch 258 associated therewith to rock counter-clockwise to latch the transfer lever in its rocked position and also allow the lowest denominational order actuating rack 170 to move rearwardly until the lug 245 engages the vertical surface above the step 244, whereby the value of "one" is entered into the lowest denominational order totalizer wheel. A transfer lever latch 259, which cooperates with the transfer lever 255, is provided merely to latch the transfer lever 255 in its rocked position and exerts no control over an actuating rack.

The transfer lever latches 176, 258, and 259, which cooperate with the various transfer levers, are restored from their operated positions early in a subsequent operation of the machine. Each of the transfer lever latches 176, 258, and 259 is provided with an upwardly extending arm similar to the one shown at 260 in Fig. 2, which arms lie behind a bail 265, which extends across all the transfer latch levers and is secured to a shaft 266 journaled in the side frames 51 and 52. When the bail 265 is rocked counter-clockwise (Fig. 2) with the shaft 266, it will engage the upwardly extending arms of the transfer lever latches and will rock any displaced transfer lever latch clockwise until the lug 245 thereon moves from the higher surface 244 on any of the transfer levers 240, 255, and 257 (Figs. 3 and 26) and allows the springs 251 to rock the transfer lever clockwise until the lower surface 243 engages the lug. The spring 251 will also cause the lug 245 to engage the shoulder formed by the higher and lower surfaces, which determines the normal unoperated position of the transfer lever latch.

During the clockwise movement of the transfer lever latches (Fig. 3), the lower extensions thereof will be effective, through their engagement with the lugs 175 on the actuating racks 170, to move any displaced actuating racks to their normal positions, as shown in Fig. 3.

The means for rocking the shaft 266 counter-clockwise (Fig. 2) is shown in Figs. 10 and 11. A bell crank 267 (Fig. 11) is secured to the right end of shaft 266 on the outside of the side frame 52. A link 268 is pivoted at its upper end to a stud 269 on one arm of the bell crank and is guided at its lower end in a slot 270 (Fig. 10) in a plate 271 secured to the side frame 52. A spring 272 (Fig. 11), connected to the link 268 and to the side frame 52, urges the link downwardly and causes the shaft 266 to be urged clockwise until another arm of the bell crank engages a stud 273 on the side frame. The spring 272 also urges the link 268 clockwise about stud 269 and maintains the link in a forward part of the slot 270, which is somewhat longer than the width of the link 268. Early in the operation of the machine after the totalizer has been disengaged from the differential mechanism and before the actuating racks begin their forward movement with the diverging levers, a roller 274 on the link 224 will engage the end of the link 268, as the link 224 moves forwardly, and will cam the link 268 upwardly to rock the shaft 266 counter-clockwise to restore the tens transfer mechanism to its unoperated position after which the roll will move beyond the end of the link and allow the latter to be restored by spring 272. As the link 224 is returned to the rear of the machine near the end of the machine cycle of operation, the roller 274 will again engage the lower end of the link 268, but at this time the roller will merely cause the lower end of the link 268 to move to the rear end of the slot 270, the link 268 at this time merely pivoting about the stud 269 without rocking the shaft 266.

This early restoration of any operated tens transfer mechanism is particularly advantageous, since it enables all parts of the transfer mechanism to be restored to their normal, home positions near the beginning of a total- or sub-total-taking operation, thus eliminating the blank or idle operation of the machine which was usually required to enable these parts to be restored before a total- or sub-total-taking operation could be made after an amount-entering operation had taken place.

*Driving mechanism*

The novel machine is provided with a suitable electric motor, which is enclosed in a housing 280 (Figs. 10 and 13), located in a recess 281 in the left side frame 51, and is secured to the side frame by suitable fastenings as 282. The motor is connected in an operating circuit which includes a normally open switch 283, which is closed to initiate an operation of the motor to drive the machine in a machine cycle of operation. The motor operates, through a suitable speed reduction gearing contained in the housing 280, to drive a shaft 284 (Fig. 13), to which is secured a driving ratchet 285 of a one-revolution clutch mechanism. Free on the shaft 284 is a crank arm 286, upon which is pivoted a clutch dog 287, which is urged by a spring 288 into driving relation with the driving ratchet 285. The clutch dog 287 is normally held out of driving engagement with the driving ratchet 285 by a stud 289 on the end of one arm of a three-armed lever 290 secured to a short shaft 291, which is journaled in the housing 280.

The crank arm 286 is connected by a link 292 to a plate 293, loose on the main shaft 106, and causes the plate 293 to be rocked clockwise (Fig. 13) from its home position during the first half of the machine cycle of operation. The plate 293 is spring-pressed by a leaf spring 294 toward a plate 295 (Fig. 10) secured to the main shaft 106 to maintain a plurality of spherical members 296 in similar recesses 297 in the plates 293 and 295. The spring 294 exerts sufficient pressure on plate 293 to retain the spherical members 296 in the recesses 297 in the plates 293 and 295 to enable the reciprocating motion given to the plate 293 to be transmitted to the plate 295 and thereby to the main shaft 106 in normal operations of the machine. If for any reason the main shaft should be blocked against its normal operation, plate 295 will also be held against movement, and the continued movement of the plate 293 would cause the spherical members 296 to be cammed from the recesses 297 in one of the plates, thus disconnecting the plates so that the plate 293 can continue its movement even though the plate 295 is held against movement. Each time the plate 293 is moved to the position where the recesses 297 in both plates are opposite each other, the spherical members 296 will be engaged in the recesses but will immediately be cammed out of the recesses in one of the plates if the plate 295 is still blocked against operation. When the plate 295 is again free to be operated, it will be connected to plate 293 when the spherical members 296 move into the recesses 297 in both plates, and will move therewith to drive the main shaft 106 of the machine. It will be noted that, while the spring 294 exerts sufficient pressure on the plate 293 to retain the spherical members 296 in the recesses in the plates 293 and 295 to establish a driving connection therebetween when the plate 295 is free to drive the machine, the spring will yield when the plate 295 is blocked against movement and will allow the spherical members 296 to move out of the recesses 297 in one of the plates to interrupt the drive and thereby prevent damage to the machine.

The two plates 293 and 295, the spherical members 296, and the spring 294, therefore, form a simple, compact, and efficient yieldable driving connection between the motor and the main shaft 106.

An arm 298 (Fig. 2), connected to the main shaft 106, has a spring 299 connected to its end and to the cross bar 153. This spring assists in returning the main shaft 106 to its home position during the second half of the machine cycle of operation.

In order to render the driving mechanism operable to cause a machine cycle of operation to take place, the following means are provided to close the switch 283 to start the motor and also to release the clutch dog 287 to connect the motor to the crank arm 286, which causes the main shaft 106 to be oscillated in each machine cycle.

As shown in Fig. 13, the shaft 291 also has secured thereto an arm 301, which carries at its free end a roller 302 of insulating material, which cooperates with the switch 283 in the motor circuit. When the stud 289 on the three-armed lever 290 is in the position shown in Fig. 13, in which position it disconnects the clutch dog 287 from the driving ratchet 285, the arm 301 will be in a position in which the switch 283 is open. However, when the three-armed lever 290 has been moved counter-clockwise (Fig. 13) to move the stud 289 away from the end of the clutch dog 287 to allow the clutch dog 287 to engage the driving ratchet 285 and connect the motor to the main shaft 106, the arm 301 will also have moved counter-clockwise, causing the roller 302 to close the switch 283 to start the operation of the motor.

A spring 303 (Figs. 2 and 10), connected to the stud 156 and to a lever 304 pivoted intermediate its length on a stud 305 extending upwardly from a cross plate 306 secured between the side frames 51 and 52, urges the lever 304 counter-clockwise (Fig. 10) about the stud 305 and, through a link 307 pivotally connected to an upturned portion of the left end of the lever 304 (Fig. 10) and to a downwardly extending arm on the three-armed lever 290, urges the three-armed lever 290 and the arm 301 counter-clockwise (Fig. 13) with the shaft 291, to the position where they can cause the motor to be started and the clutch to be effective to connect the motor to the main shaft 106.

The right-hand end of the lever 304 (Figs. 10 and 11) extends through a suitable opening in the side frame 52 and through a guiding slot 308 in a bracket 309, which is secured to the side frame 52, the guiding slot 308 supporting the end of the lever 304 against up-and-down movement and also serving to limit the extent of movement of the lever about the stud 305. A V-shaped latch (Figs. 11 and 12), pivoted on the bracket 309, has a latching arm 310 formed with a hooked end which is urged into contact with the right-hand end of the lever 304 by a spring 311 and can engage behind the end of the lever 304 to retain the lever in the position shown in Figs. 10 and 11, against the action of the spring 303, in which position the lever 304 causes the three-armed lever 290 and the arm 301 to be maintained in the positions shown in Fig. 13 to render the clutch ineffective and to allow the switch 283 in the motor circuit to be opened.

When it is desired to cause the machine to be operated by the driving mechanism, the latch is rocked to remove the hooked end of the arm 310 from behind the end of the lever 304, allowing the spring 303 to rock the lever 304 counter-clockwise (Fig. 10), which, through the link 307, rocks the arm 301 and the three-armed lever 290 counter-clockwise, respectively, to close the switch 285 and start the motor operating, and to free the clutch dog 287 on the crank arm 286 for driving engagement with the driving ratchet 285 to render the crank arm 286 operable by the motor.

When the motor is thus rendered operable and the crank arm 286 is operated by the motor, the crank arm will rotate counter-clockwise (Fig. 13) with the shaft 284 and will cause an oscillation of the main shaft 106. As the crank arm 286 nears the end of one revolution of movement, a cam 315 on the crank arm will engage a stud 316 on an arm of the three-armed lever 290 and will rock the three-armed lever 290 clockwise to restore the stud 289 into the path of movement of the end of the clutch dog 287, causing the dog to be disengaged from the driving ratchet 285 at the end of the one revolution of movement of the crank arm 286. Clockwise movement of the three-armed lever 290 will also cause the arm 301 to be rocked clockwise (Fig. 13) to allow the switch 283 to open and interrupt the circuit to the motor. The movement of the three-armed lever 290 by the cam 315 will be transmitted through the link 307 to the lever 304 and will cause the lever 304 to rock clockwise about the stud 305 to place the spring 303 under tension. As the lever 304 rocks clockwise about the stud 305, the right-hand end of the lever (Fig. 11) will move forward in the slot 308 and allow the spring 311 to move the hooked end of the latching arm 310 behind the end of the lever 304. It should be noted that the hooked end portion of the latching arm 310 is sufficiently long that it can engage the under side of the end of the lever 304 in the released position of the lever and can immediately move up behind the end of the lever 304 when the lever is rocked clockwise near the end of the machine cycle of operation.

Accordingly, it is seen that the operation of the machine will be terminated and the parts of the driving mechanism will be restored to their normal positions automatically after the one-revolution clutch mechanism has driven the crank arm 286 through one revolution of movement to provide an oscillation of the main shaft 106.

If it is desired to operate the machine manually, as when no electricity is available or when the machine is being serviced, the main shaft 106 can be disconnected from the crank arm 286, as by releasing the driving connection between the plates 293 and 295, and an operating handle can be connected to the right end of the main shaft 106 in a well-known manner, as fully shown and described in the United States Patent No. 1,861,618, which issued to Nelson White on June 7, 1932.

The following means are provided to rock the latch to release the lever 304 and initiate an operation of the machine for addition.

An addition control bar 317 (Figs. 1, 7, and 11) is located to the right of the keyboard and extends through the outer casing 50 which encloses the machine. The bar 317 is secured to the top of a plate 318, which is mounted on the bracket 309 for movement in a path substantially perpendicular to the plane of the head of the bar, the mounting including slots 319 and 320 in the plate 318, which cooperate with headed studs 321 and 322 on the bracket 309, to guide the plate on the bracket and to control the extent of movement of the plate relative to the bracket. A spring 323, tensioned between the stud 321 and a pin 324 on the plate 318, urges the plate and the bar upwardly until the studs 321 and 322 engage the bottoms of the slots 319 and 320, thus locating the bar in its normal undepressed position.

A stud 325 on the lower part of the plate 318 extends over a rearwardly extending operating arm 326 of the latch, so that, when the addition control bar 317 is depressed, the stud 325 will rock the latch to release the lever 304 and the parts connected thereto to cause the motor to be started and the clutch to be effective to connect the machine to the motor for operation thereby to perform addition.

The manner in which the latch is operated and the driving mechanism is rendered operable to drive the machine in subtracting, non-add, total-taking, and sub-total-taking operations will be explained when these various operations are considered.

The addition control bar 317 can also be operated in a manner which will disable the automatic key releasing means and thereby retain the setting of the amount keys to enable repeated additions to be made in the totalizer.

As explained earlier herein, the key release lever 99 rocks clockwise early in the machine cycle of operation to place the by-pass pawl 107 over the roller 108 on the arm 109 of the key release bail 87. When the key release lever 99 is returned counter-clockwise (Fig. 11) near the end of the machine cycle of operation, the by-pass pawl 107 will rock the key release bail 87 clockwise to cause any depressed amount keys to be released.

When the addition control bar 317 is depressed, a pin 327 on the plate 318 will be positioned in the path of movement of a pin 328 on the key release lever 99 and will prevent the lever from rocking clockwise (Fig. 11) sufficiently to place the by-pass pawl 107 over the roller 108. If the bar 317 is released early enough in the machine cycle, the spring 101 will move the key release lever to position the by-pass pawl 107 over the roller 108 before the lever 99 is returned counter-clockwise by the stud 104 near the end of the operation, and the pawl 107 can rock the key release bail 87 and release any depressed amount keys. If the bar 317 is retained depressed through the entire machine cycle of operation, the pin 327 on the plate 318 will retain the key release lever 99 in its partially operated position and the pawl 107 will not move over the roller 108, so that, when the key release lever 99 is restored counter-clockwise to its home position by the stud 104, the key release bail 87 will not be rocked and the amount keys will not be released, but will remain in their depressed positions to control the operation of the machine in another adding operation. The plate 318, when retained in depressed position throughout the entire machine cycle, will also maintain the latch in its moved position and will prevent it from latching the lever 304 and thereby the arm 301 and the three-armed lever 290 in their normal positions when they are restored by the cam near the end of the machine cycle. Under these circumstances, as soon as the cam 315 clears the stud 316 on the three-armed lever 290, the spring 303 will move the three-armed lever 290 and the arm 301 counter-clockwise to cause the driving mechanism to be effective to cause another machine cycle of operation to take place.

Accordingly, it is seen that, if the addition control bar 317 is held depressed throughout the entire machine cycle of operation, it will be effective to control the key release mechanism to prevent the keys in the keyboard from being released and will also be effective to cause the machine driving mechanism to be operable to drive the machine in another adding operation.

*Subtraction mechanism*

Subtraction is performed in the novel machine by complementary addition. When subtraction is performed by complementary addition, the amount to be subtracted first is set up on the keyboard and upon operation of the subtraction key the nines complement of this amount is entered additively into the totalizer, to be added to the amount previously contained therein; consequently the totalizer wheels are rotated in the same direction in a subtracting operation as in an adding operation, and the operation of the tens transfer mechanism in carrying amounts between adjacent wheels of the totalizer is the same in both kinds of operations.

In order to obtain the nines complement of the amount to be subtracted, the following means, which are similar to those shown in my co-pending United States patent application Serial No. 475,729, are provided.

As shown in Figs. 2 and 10, each of the stop bars 165 associated with a denominational row of amount keys 61 carries an auxiliary stop bar 335, which is differentially movable therewith. The auxiliary stop bar 335 is disposed side by side with its related stop bar 165, slightly to the right thereof, and approximately at its mid-point is pivotally connected, by a pin 336, to its related stop bar 165. The upper edge of the auxiliary stop bar 335 is provided with a series of abutments similar to the ones on the stop bar 165, but which are so located thereon that the differentially operable means can be displaced an extent representing the nines complement of the value of any depressed amount key, before the abutment engages that key.

The auxiliary stop bar 335 is provided adjacent its forward end with a cam surface 337, which can engage in a cooperating notch 338, similar to the one shown in Fig. 10, in the supporting plate 167 to control the rocking of the auxiliary stop bar about the pin 336. In the normal, home position of the differentially operable means, as shown in Fig. 2, the cam surface 337 has rocked the auxiliary stop bar 335 so that its forward end is lowered sufficiently to place the first four abutments on the bar out of engagement with the second, third, fourth, and fifth amount keys from the left of the row, to prevent premature engagement between these abutments and the keys. After the auxiliary stop bar 335 has been carried forward a sufficient distance to insure that improper engagement of the abutments with the keys will not take place, the cam surface 337, operating in the notch 338 in the plate 167, will rock the auxiliary stop bar about the pin 336 to raise the front end of the auxiliary stop bar 335 and place all the abutments in proper cooperative relation with the amount keys.

In subtracting operations, therefore, the differentially operable means representing a denomination, which operates in a manner similar to adding operations, will be controlled in its differential movement by the associated auxiliary stop bar 335 to cause the entry of the nines complement of the amount of the depressed key instead of the amount corresponding to that of the depressed key.

It will be recalled that the keyboard is mounted in the machine for bodily movement laterally of the machine, and that normally it is in its leftmost position, where the rows of keys are in alinement with and can cooperate with the stop bars 165 to control the extent of movement of the differential mechanism in adding operations.

In order to enable the same keyboard to control the differential mechanism in subtracting operations, the keyboard is shifted to the right in the machine to aline the rows of keys with the auxiliary stop bars 335, so that any depressed key can cooperate with the abutments on the auxiliary stop bar 335 to control the extent of movement of the differentially operable means.

Furthermore, in moving the keys into alinement with the auxiliary stop bars, the shifting of the keyboard to the right is effective to carry the zero stops 83, which are mounted therein, out of blocking relation with the differentially operable means, to free the differentially operable means for operation. If the keyboard has been shifted to the right with any key in a row depressed, the differentially operable means associated with that row of keys will move an extent corresponding to the nines complement of the amount represented by that key; however, if the keyboard has been shifted to the right with no key in a row depressed, the associated zero stop will have been moved out of blocking relation and the associated differentially operable means will be free to move its full extent forwardly. When any differentially operable means has been moved forward its full extent, it will have been moved forward an extra extent more than is necessary to enter the value of "nine," which is the nines complement of "zero," into the totalizer.

This additional extent of movement is used in the proper setting of the printing mechanism, as will be explained hereinafter. By causing the totalizer to engage the differentially operable means after any differentially operable means which had been moved forward the full extent has been restored the distance corresponding to the extra extent of movement, the value of "nine" will be entered into the totalizer by these differentially operable means during their remaining movement to home position.

It will be recalled that the differentially operable means associated with the overflow wheel of the totalizer has no related row of amount keys on the keyboard and is stopped by the zero stop 83 in zero position in adding operations. Since there is no row of keys cooperating with this differentially operable means, no auxiliary stop bar is provided for this means, and, when the zero stop is moved out of blocking relation as the keyboard is shifted for subtraction, the differentially operable means can move forwardly the full extent, to cause the entry of a value of "nine," which is the nines complement of "zero," to be made in the overflow wheel in each subtracting operation.

This entry of the value of "nine" in the overflow wheel of the totalizer, together with the transfer operation from a lower order, will cause the overflow wheel to pass from its "nine" position to its "zero" position in all operations in which the amount subtracted is less than the amount on the totalizer, and the operation results in a positive total. The entry of the value of "nine" will also cause the overflow wheel to pass from its "nine" position through its "zero" position in each subtraction that is made from a negative total in the totalizer. The only subtracting operation in which the entry of the value of "nine" in the overflow wheel will not cause the wheel to pass from its "nine" position to or through its "zero" position will be one in which the total in the totalizer changes from positive to negative.

Each time the overflow wheel passes from its "nine" position to or through its "zero" position, its transfer cam 201 (Fig. 26) will rock the transfer lever 255, as explained earlier herein, and, through the yoke 256, will cause the transfer lever 257 to rock and release the transfer lever latch 258, which allows the actuating rack 170 in the lowest denominational order to move sufficiently to enter the value of "one" in the lowest denominational order totalizer wheel 195.

As seen above, when the keyboard is shifted to the right, it will control the differential mechanism to cause the entry of the nines complement of the amount set up in the keyboard to be made in the totalizer.

The differentially operable means associated with the row of control keys on the keyboard has no auxiliary stop bar associated with the stop bar 165 thereof, but the Subtract key 62, which is the only key to cooperate with this differentially operable means when the keyboard is shifted to the right, is sufficiently wide to cooperate with the stop bar 165, even though the keyboard has been shifted to the right of the machine. The Subtract key, cooperating with an abutment on the stop bar 165, allows the differentially operable means to be displaced an extent sufficient to place a "minus" symbol on the symbol type wheel 188 in printing position.

The keyboard is shifted to the right of the machine by the depression of the Subtract key 62, which is one of the keys in the row of control keys located in the keyboard. As shown in Fig. 4, the downward extension 84 of the Subtract key 62 cooperates with a roller 339 on a downwardly extending arm of a bracket 340 secured to the bottom plate 72 of the keyboard, which roller 339 guides and supports the downward extension of the key. The left side of the extension 84 is formed as a cam surface 341, which cooperates with a stud 342 on an arm 343 extending inwardly from the side frame 52, the cooperation between the cam surface 341 and the stud 342 being such that, upon depression of the subtract being such that, upon depression of the Subtract key 62, the keyboard will be cammed toward the right of the machine.

In the normal, undepressed position of the Subtract key 62, an upwardly extending finger 351 (Fig. 4) on the extension 84 of the key engages a laterally extending portion of a plate 352 (Figs. 4 and 10), secured to the side frame 52, and retains the keyboard in its leftmost position against accidental displacement therefrom. Initial downward movement of the Subtract key 62 moves the finger 351 on the extension below the lateral extension of the plate 352 and frees the keyboard so that it can be cammed to the right.

Figure 6:
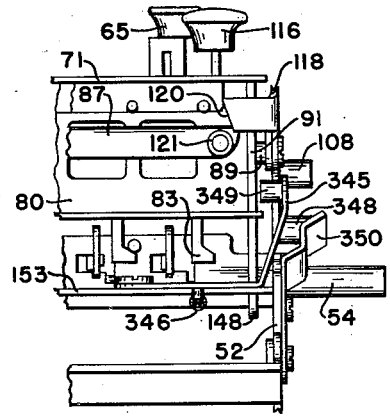
Fig. 6 is an elevation of a portion of the keyboard shown in Fig. 5, as seen from the front of the machine and in a direction parallel with the plane of the top of the keyboard.
Figure 7:
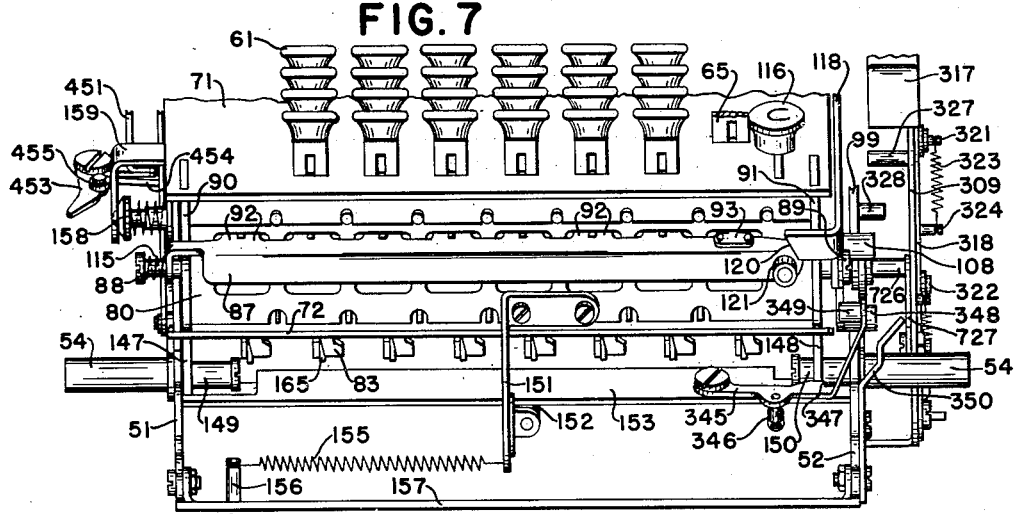
Fig. 7 is a front elevation of a portion of the keyboard, showing the keyboard in its normal or adding position.
Figure 8:
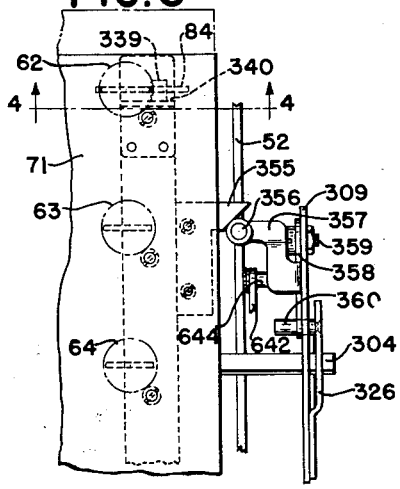
Fig. 8 is a plan view showing a portion of the keyboard and a portion of the means for rendering the machine driving mechanism operative, and showing in particular the manner in which the shifting of the keyboard to the right in a subtracting operation is effective to initiate an operation of the driving mechanism.

A latch 345 (Figs. 5, 6, and 7), pivoted on the cross bar 153, is urged rearwardly into engagement with the downwardly-extending portion 148 of the side plate 91 of the keyboard, by a spring 346, and is provided on its rear edge with a notch 347, which can cooperate with the downwardly-extending portion 148 when the keyboard has been shifted, as shown in Fig. 6, to retain the keyboard in its rightmost position.

The free end of the latch 345 extends upwardly in front of a stud 348 on the rearwardly-extending arm 109 of the key release bail 87, so that, when the bail is rocked automatically by the key release lever 99 to release the amount keys near the end of a machine cycle of operation, the stud 348 will move the free end of the latch 345 forwardly and move the notch 347 out of latching engagement with the downward extension 148 of the side plate 91 of the keyboard.

The latch 345 may also be moved to unlatching position by the engagement of the forward end of the lever 118 (Fig. 5) with a stud 349 on the upward extension of the latch, when the forward end of the lever 118 is depressed by the Correction key 116.

When the latch 345 is released, the keyboard will be returned to its normal leftmost position by the spring 155 and the spring-pressed plunger 158.

The shifting of the keyboard to the right will place the stud 348 on the rearwardly-extending arm 109 of the key release bail 87 in cooperative relation with a cam plate 350 secured to the side frame 52, and, when the key release bail is rocked by the lever 99 near the end of a machine cycle of operation, the stud 348 will cooperate with the cam plate 350 to cam the keyboard to the left after the stud 348 has moved the latch 345 out of latching engagement with the extension 148. Thus the stud 348, cooperating with the cam plate 350, will assist the spring 155 and the plunger 158 in returning the keyboard to its home position.

The driving mechanism is rendered operable in subtracting operations in the following manner:

When the keyboard is shifted to the right by the depression of the Subtract key 62, a cam 355 (Figs. 8 and 11), carried by the keyboard, engages a roller 356 mounted on a laterally extending portion 357 of a lever 358 (Figs. 8, 11, and 12), pivotally mounted on a stud 359 on the bracket 309, and rocks the lever 358 counter-clockwise (Fig. 11). A lower, forwardly-extending portion of the lever 358 lies over a stud 360 on the operating arm 326 of the latch, which normally retains the lever 304 in the position where it is effective to keep the arm 301 and the three-armed lever 290 in their positions in which they allow the switch 283 to be opened and the clutch to be ineffective to couple the motor to the machine. When the lever 358 is rocked counter-clockwise (Figs. 11 and 12), it will depress the stud 360 and rock the latch to remove the hooked end of the latching arm 310 from engagement with the lever 304, allowing the spring 303 to move the lever 304 and thereby the arm 301 and the three-armed lever 290, respectively, to close the motor switch 283 and to render the clutch effective to couple the motor to the machine for a machine cycle of operation.

The totalizer engaging mechanism operates in subtracting operations exactly as it does in adding operations to cause the totalizer to be disengaged from the differential mechanism during the setting of the differential mechanism under the control of the keyboard and to cause the totalizer to be engaged with the differential mechanism during the restoration of the differential mechanism from its set position to its home position; consequently the totalizer wheels are rotated in the same direction in subtracting operations as in adding operations of the machine. The timing of the engagement of the totalizer with the differential mechanism during the restoration of the differential mechanism from its set position to its home position is such that, at the time the totalizer engages the differential mechanism, the cross bar 185 will have restored any differentially operable means, which have moved forwardly their full extent of movement, to the position where further movement of those differentially operable means to their home positions will cause them to enter a value of "nine" in their related denominational orders of the totalizer.

The machine, therefore, is capable of performing subtracting operations in which the nines complement of the value to be subtracted is entered additively into the totalizer, and in which machine, after any operation, the totalizer will be set to the true value of the total if the total on the totalizer is positive and will be set to the nines complement of the negative total if the total on the totalizer is negative.

*Printing mechanism*

The machine embodying the invention is provided with a novel printing mechanism which is settable by the differential mechanism and which can be controlled in its setting operation to place the amount type wheels 180 in position to print either the amount represented by the displacement of the differential mechanism or the nines complement of the amount represented by the displacement of the differential mechanism.

This ability of the printing mechanism to bring to printing position type to print either the amount represented by the displacement of the differential mechanism or the nines complement of the amount represented by the displacement of the differential mechanism enables the true amount set up on the keyboard to be printed in both adding and subtracting operations, because in adding operations the differential mechanism is displaced extents which represent the amount on the keyboard and the printing mechanism is controlled to be set to print the amount represented by the displacement of the differential mechanism, or the amount set up on the keyboard; and in subtracting operations the differential mechanism is displaced extents which represent the nines complement of the amount set up on the keyboard and the printing mechanism is controlled to cause the type to be set to print the nines complement of the amount represented by the displacement of the differential mechanism, which is the true amount set up on the keyboard for subtraction.

The symbol type wheel 198 (Fig. 10) is located at the right of the amount type wheels 180 and is provided with distinctive symbols which can be printed to the right of an amount selectively to indicate that amount represents an amount which is subtracted in a subtracting operation, an amount which was not entered into the totalizer in a non-add operation, a positive total or sub-total, or a negative sub-total or total, as the case may be. No symbol is printed in adding operations, so that the absence of a symbol after a printed amount indicates that that amount was entered in the machine in an adding operation. The symbols are so located on the symbol type wheel that, when this wheel is set by the differentially operable means associated with the row of control keys, and is set in the same direction as the amount type wheels—that is, according to whether the amount type wheels are set to the value represented by the displacement of the differential mechanism or to the nines complement thereof—the proper symbol will be moved to printing position.

The printing mechanism is located at the rear of the machine, substantially equidistantly from the side frames 51 and 52 (Figs. 1 and 10), and is carried by a pair of supporting plates 365 and 366 (Figs. 2, 10, 16, 17, 33, and 34). The plates 365 and 366 are formed with notches 367 at the rear of their lower edges, which notches enable the plate to fit into slots in locating sleeves 368 (Figs. 33 and 34) carried by the shaft 223 to be supported thereby. The locating sleeves 368 are free on the shaft 223 but are retained against lateral movement thereon by being located between arms 369 and cams 370 (Fig. 33), which are secured to the shaft 223. The plates 365 and 366 are also formed with hook-like extensions 371 (Figs. 16 and 17) at the upper part of their front edges, which extensions 371 engage a rod 372, secured in the side frames 51 and 52, and provide a forward support for the plates 365 and 366. Latches 373 (Figs. 16, 17, and 33) are pivoted on the plates 365 and 366, adjacent the extensions 371, and also engage the rod 372 to retain the plates 365 and 366 in engagement with the rod 372.

The notches 367 in the plates 365 and 366 and the hook-like extensions 371 therefor enable the plates to be supported by the rod 372 and the shaft 223.

A tie rod 374 (Figs. 2, 16, 17, and 33) connects the plates 365 and 366 at a point substantially midway between the rod 372 and the shaft 223, and, together with the fixed position of the locating sleeve 368 on the shaft 223, maintains the plates 365 and 366 in proper lateral spaced relation.

The amount type wheels 180 and the symbol type wheel 188 are mounted in a shiftable type wheel supporting frame formed by side members 376 and 377, which are pivoted at their lower ends, respectively, on studs 378 on the plates 365 and 366 and carry between their upper ends an axle 379, upon which the type wheels are rotatable. This frame enables the type wheels to be shifted from their normal positions shown in Figs. 2, 16, and 17, into the printing position relative to a platen 380, as shown in dot-and-dash outline in Fig. 17. The platen 380 is rotatably mounted on a shaft 381 journaled in a pair of supporting brackets 382 and 383 (Figs. 10, 11, and 13) adjustably secured, respectively, to the side frames 51 and 52 by studs 384 and 385 and by locking bolts 386 and 387, which are embraced by slots 388 in the forward ends of the brackets. The slot 388 in the bracket 383 is clearly shown in Fig. 11.

The platen 380 can be rotated to feed record material to and away from printing position by means of a knurled disk-like member 389 secured to the right end of the platen and extending through the casing 50 of the machine, as shown in Fig. 1.

The type wheel supporting frame is shifted by a pair of toggle linkages, one of which is shown in Fig. 17 and is formed by links 390 and 391, which are pivotally connected to each other by a pin 392 and have their free ends, respectively, connected to the plate 366 and the member 377. A link 393, which is pivotally connected at its upper end to the toggle linkage at the pin 392 and is connected to the right-hand arm 369 on the shaft 223 (Fig. 33), will be lifted when the shaft rocks counterclockwise (Fig. 17) during the first half of the machine cycle and will cause the toggle linkage to be straightened to move the type wheels 180 into printing relation with the platen 380, where they will be effective to engage an ink ribbon and cause the amount set on the type wheels to be printed on record material carried by the platen. A similar toggle linkage between the supporting plate 365 and the member 376 is operated by a link 394 (Fig. 33) connected to the left-hand arm 369 on the shaft 223 and causes the member 376 to pivot about the stud 378 and move the left end of the axle 379 toward the platen. The two toggle linkages which are operated in the same manner and the same extent by the arms 369 on the shaft 223 cause both side members of the type wheel supporting frame to move in unison and carry the type wheels into printing relation with the platen. The printing pressure between the type wheels and the platen can be regulated by loosening the locking bolts 386 and 387 and swinging the brackets 382 and 383 about the studs 384 and 385 until the platen 380 is positioned where the type wheels will engage it with the desired pressure when they have been shifted to their extreme rearward position. The locking bolts 386 and 387 can then be tightened to retain the brackets and the platen in this adjusted position.

During the movement of the type wheels from their home positions to their printing positions, they are rotated about the axle 379 to set the proper type faces in printing position according to the amount and the symbol to be printed.

The manner in which the amount type wheels 180 are set to print the amount represented by the displacement of the differential mechanism or the nines complement of the amount represented by the displacement of the differential mechanism will now be explained.

The way of setting of the symbol type wheel 188 is similar to the way of setting of the amount type wheels 180 and such will be clear from the following description of the setting of the amount type wheel 180.

Each type wheel 180 has a gear 400 secured thereto (Figs. 2, 23, 28, 29, and 30), which gear is located between racks 401 and 402 formed on the upper end of the associated double-rack member 182. As explained earlier herein, the double-rack members 182 are connected to the rearward extensions 179 of the diverging levers of the differential mechanism and are displaced extents corresponding to the displacement of the diverging levers.

In the normal, home position of the type wheel 180, as shown in Fig. 23, the gear 400 is in mesh with rack 401, which drives the type wheel 180 clockwise (Fig. 23) to set the wheel so that a blank type face or the type face having thereon the digit which corresponds to the nines complement of the value represented by the displacement of the double-rack member 182 will be in printing position when the type wheel is moved into printing relation with the platen.

When the machine is operated in subtracting operations, the gear 400 remains in engagement with the rack 401 during the movement of the double-rack member 182 by the diverging lever, and the type wheel 180 will be set according to the nines complement of the amount represented by the displacement of the double-rack member 182 and the diverging lever, which are displaced according to the nines complement of the true value of the depressed key, and will print the value which corresponds to that of the depressed key.

In adding operations, the gear 400 will be shifted to mesh with the rack 402 before the double-rack member 182 is moved by the diverging lever. As the double-rack member 182 is operated by the diverging lever, the rack 402 will drive the type wheel 180 counter-clockwise (Fig. 23) to set the wheel so that the type face having thereon the value which corresponds to the value represented by the displacement of the double-rack member and the diverging lever will be in printing position when the type wheel is moved into printing relation with the platen. Since in adding operations the diverging lever is displaced an extent representing the value of the depressed key on the keyboard, the type wheel will be set to print this amount.

The means by which the gears 400 may be selectively engaged with the racks 401 in subtracting operations and with the racks 402 in adding operations will now be explained.

As shown in Figs. 2, 10, 16, 18, 28, 29, 30, and 33, and particularly in Fig. 18, a basket is provided to guide the double-rack members 182 in their setting movement and also to enable the double-rack members to be shifted relatively to the type wheels to engage either the rack 401 or the rack 402 with the gear 400. The basket is formed by side members 405 and 406, which are connected by plates 407 and 408.

Notched plates 409 and 410, secured to the plates 407 and 408, respectively, coact with the double rack members 182 to retain the members in proper side-spaced relation but allow the members to move in their setting direction.

The side members 405 and 406 of the basket are pivoted on the same studs 378 that pivotally support the side members 376 and 377 of the type wheel supporting frame, and are located, respectively, between the side member 376 and the supporting plate 365, and between the side member 377 and the supporting plate 366.

Springs 411 and 412, connected to the side members 376 and 377 of the type wheel supporting frame and to the plate 408 of the basket, are effective to urge the basket forward until the side members 405 and 406 of the basket engage studs 413 and 414 on the supporting plates 365 and 366, to locate the basket in its normal, home position when the type wheel supporting frame is in its normal forward position. In this normal position of the basket and type wheel supporting frame, as shown in Fig. 28, the type wheels will be so positioned relatively to the double-rack members 182 that the gears 400 will be engaged with the racks 401, which set the type wheels to print the value which represents the nines complement of the value represented by the displacement of the double-rack member 182.

The side members 405 and 406 of the basket, respectively, have studs 417 and 428 (Fig. 18) thereon, which extend through slots as 419 (Figs. 16, 17, and 28) in forwardly-extending arms 420 (Figs. 16, 17, 28, and 34) of the side members 376 and 377 of the type wheel supporting frame, and in the normal positions of these parts the studs 417 and 418 lie at the rear ends of the slots 419.

Pivoted on a stud 425 (Figs. 16, 28, 29, 30, and 33) on the forwardly-extending arm 420 of the side member 377 is a pair of control levers 426 and 427, which individually pivot about the stud 425 and are selectively cooperable with the stud 418 to control the relative positions between the basket and the type wheel supporting frame and thereby control with which racks the gears 400 will be in mesh when the double-rack members 182 are displaced by the diverging levers.

The lever 426 is urged clockwise (Fig. 28) about the stud 425 by a spring 428 connected to a downwardly-extending arm 429 of the lever and to the supporting plate 366. At its rear end, the lever 426 is formed as a hook, which hook, in the normal, home position of the side member 377, as shown in Fig. 28, is retained above the stud 418 on the basket by the engagement of the downwardly-extending arm 429 with a stud 430 on the supporting plate 366.

In an adding operation, when the type wheel supporting frame is operated by the toggle linkage and begins to move toward the rear of the machine, springs 411 and 412 will move the basket relatively to the type wheel supporting frame until studs 431 and 432 on the basket are engaged by the side members 376 and 377 and the studs 417 and 418 move to the front end of the slots 419, as shown by the position of stud 418 in Fig. 29.

This relative movement between the type wheel supporting frame and the basket will have caused the gears 400 to move out of engagement with the racks 401 and into engagement with the racks 402, as shown in Fig. 29.

When the type wheel supporting frame has moved sufficiently to allow the above relative movement between the frame and the basket, the lever 426 will have been moved toward the rear of the machine, and the downwardly-extending arm thereof, moving toward the rear of the machine, will tend to move away from the stud 430 and will allow the spring 428 to move the hook end of the lever 426 behind the stud 418 and lock the type wheel supporting frame and the basket against further relative movement, thus locking these parts to retain the gears 400 in mesh with the racks 402.

This relative movement between the type wheel supporting frame and the basket occurs before the displacement of the double-rack members begins. As the double-rack members 182 are displaced extents representing the amounts of the depressed keys, the type wheels will be set to print these amounts and will cooperate with the ribbon to cause the amount to be printed on the record material carried by the platen 380.

During the return of the type wheel supporting frame to its forward, normal position, the operation of the parts is just the reverse of those given above; namely, the type wheels will be restored by the double-rack members to their initial positions, the downwardly-extending arms 429 will engage the stud 430 to rock the hook from engagement with the stud 418, and thereafter the basket will move forward with the frame until the side members 405 and 406 of the basket engage the studs 413 and 414 on the supporting plates 365 and 366 to arrest further movement of the basket while the type wheel supporting frame continues its movement to its home position, during which movement the slots 419 move until the studs 417 and 418 are in the rear ends of the slots. The parts are now in the positions in which they were at the beginning of the operation.

The lever 427 is urged clockwise (Fig. 28) about the stud 425 by a spring 435 and is provided at its rear end with a shoulder 436, which is cooperable with the stud 418 on the basket. A downwardly-extending arm 437 of the lever 427 engages a stud 438 on a control arm 439, which, in the normal position of the parts as shown in Figs. 16 and 28, retains the shoulder 436 out of engaging relation with the stud 418.

When the machine is set for subtraction, the control arm 439 will be shifted from the position shown in Fig. 28 to the position shown in Fig. 30 and will allow the shoulder 436 to move in front of the stud 418 to lock the stud in the rear end of the slot 419 and lock the type wheel supporting frame and basket in the relative position in which the gears are in mesh with the racks 401. The gears 400 will remain in mesh with the racks 401 during the movement of the type wheels to printing position, and in subtracting operations the double-rack members 182 are displaced by the diverging levers according to the nines complement of the value of the depressed keys on the keyboard, and the racks 401 will set the type wheels to place the nines complement of this displacement, or the value of the depressed keys, in printing position to enable this value to be printed when the type wheels are moved into printing relation with the platen.

During the return of the type wheel supporting frame to its normal forward position, the type wheel supporting frame and the basket will remain locked against displacement until near the end of the movement, when the downwardly-extending arm 437 of the lever 427 will engage the stud 438 on the control arm 439 to rock the lever 427 to the position shown in Fig. 28.

It should be noted that the cooperation of the levers 426 and 427 and the stud 418 is such that, if the shoulder 436 of the lever 427 is not in blocking relation at the beginning of the operation of the member 377, the lever 427 will move over the stud 418 as the stud moves to the front of the slot 419 and allows the hook on the lever 426 to drop behind the stud 418. If the lever 427 has been moved to place the shoulder 436 in front of the stud 418, the hooked end of the lever 426 will merely rest on the stud 418 when the downwardly-extending arm 429 thereof moves away from the stud 430 on the supporting plate 366. Accordingly, when either lever is in control of the relative movement between the type wheel supporting frame and the basket, the other lever will be retained in ineffective position.

Figure 33:
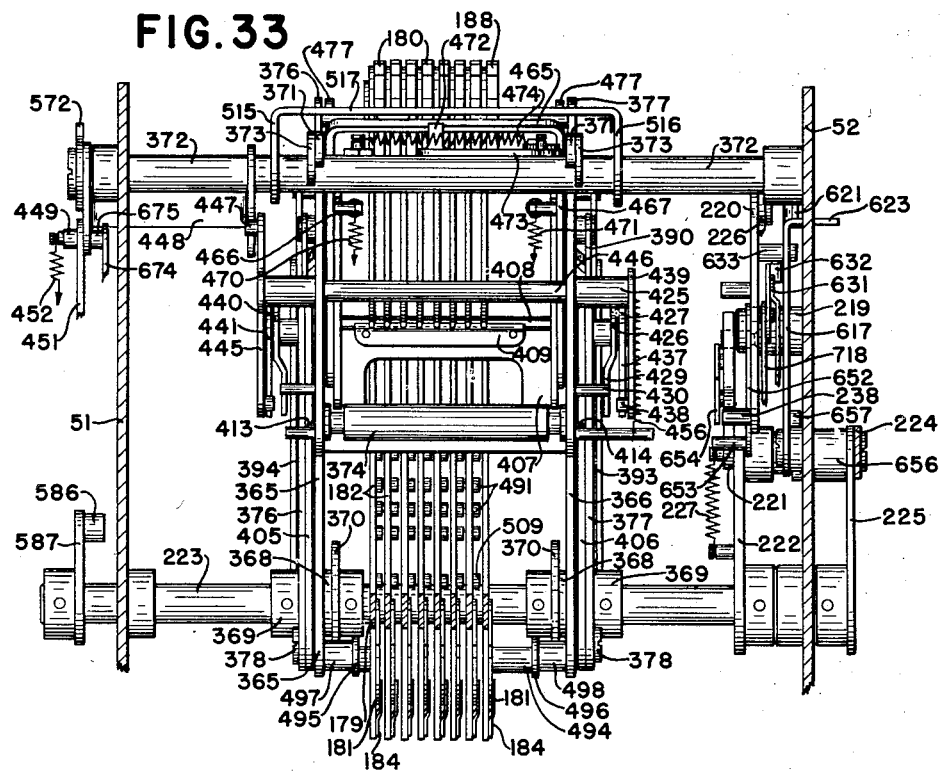
Fig. 33 is a front elevation of a portion of the printing mechanism and a portion of the totalizer-engaging mechanism.
Figure 34:
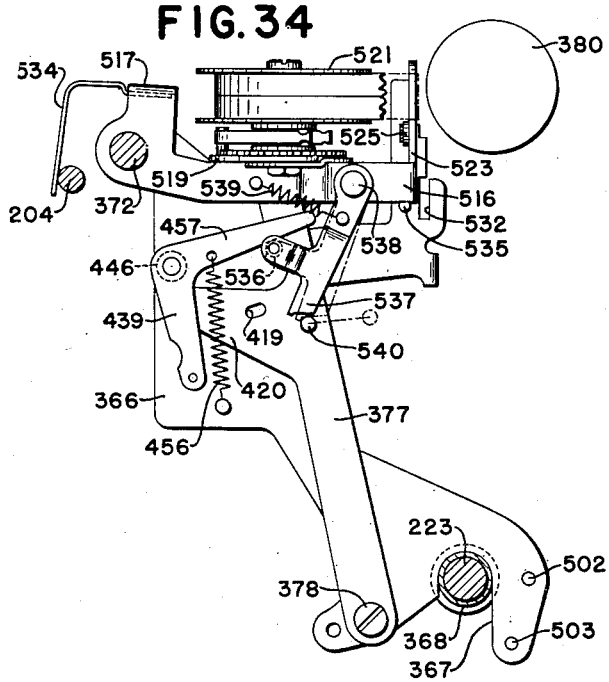
Fig. 34 is a detail view showing the ribbon shifting means.

As shown in Figs. 31 and 33, the other side member 376 of the type wheel supporting frame also has pivoted on a forwardly extending arm thereof a pair of levers 440 and 441, which are shaped exactly like the levers 426 and 427 and cooperate with the stud 417 on the basket in the same manner as the levers 426 and 427 cooperate with the stud 418, as described above.

The means for shifting the control arm 439 to allow the lever 427 to move into blocking position in subtracting operations is shown in Figs. 7, 10, 13, 28, 30, 31, 32, and 33.

The control arm 439 and a similar control arm 445 (Fig. 31) are secured to a shaft 446, which is journaled in the supporting plates 365 and 366. The control arm 445 extends upwardly and has thereon a stud 447, which is engaged by the right arm of a yoke 448 loose on the rod 372. The left arm of the yoke 448 (Figs. 13 and 31) has a stud 449, which is embraced by a slot 450 in the rear end of a link 451, and is urged to the front end of the slot by a spring 452 connected to the stud 449 and to the link. The forward end of the link 451 is bent over and is pivotally connected to one arm of a bell crank 453, which is pivotally mounted on a bracket 454 secured to the side frame 51, and which has a roller 455 on its other arm.

The roller 455 lies opposite the downwardly-extending portion of the bracket 159 secured to the keyboard, and, when the keyboard is in its left or adding position, the bracket 159 engaging the roller 455 will maintain the bell crank 453 in the position shown in Fig. 10 and will maintain the link 451 in its forward position. Through the spring 452, the link 451 maintains the yoke 448 in the position where its right arm engages the stud 447 and maintains the control arms 439 and 445 in the positions where they retain the levers 427 and 441 out of blocking relation with the studs 418 and 417 on the basket.

In a subtracting operation, as the keyboard is shifted to the right, a spring 456 (Fig. 34), acting on a rearward extension 457 of the control arm 439, will rock the control arms 439 and 445 clockwise (Figs. 28 and 31) and thereby rock the yoke 448 clockwise (Fig. 13) to pull the link 451 rearwardly and rock the bell crank 453 counterclockwise (Fig. 10). This shifting of the control linkage, which is made possible by the shifting of the keyboard to the right, will allow the levers 427 and 441 to move into blocking relation with the studs 418 and 417 on the basket to retain the gears 400 in engagement with the racks 401.

As the keyboard is restored to the left near the end of the subtracting operation, the downward extension of the bracket 159 will rock the bell crank 453 and draw the link 451 forward, rocking the yoke 448 to position the control arms 439 and 445 where they will be effective to shift the levers 427 and 441 out of blocking relation with the studs 418 and 417 on the basket, as the type wheel supporting frame is moved back to its forward, home position.

It is seen from the above that the gears 400 can be engaged with the racks 401 in subtracting operations and can be engaged with the racks 402 in adding operations to cause the type wheels to be set to print the values which have been set up on the keyboard.

In order to prevent the type wheels 180 and 188 from getting out of proper position, an alining bar 465 is provided. This alining bar 465 (Figs. 2, 10, and 16) extends across the type wheels and enters between adjacent type faces on the type wheels when the type wheels are in their home positions and in their printing positions, and also while the gears 400 on the type wheels are being shifted from one to the other of the racks 401 and 402 of the double-rack member 180.

Arms 466 and 467 (Figs. 2 and 33) extend downwardly from the end of the alining bar 465 and have rearwardly-extending projections 468 (Fig. 2), by which they are pivotally connected by studs 469 (Fig. 2) to the side members 376 and 377 of the type wheel supporting frame. Springs 470 and 471, connected to the arms 466 and 467 and to the supporting plates 365 and 366, normally urge the alining bar 465 out of engagement with the type wheels; however, in the home position of the type wheels, the alining bar 465 is retained in engagement with the type wheels by a finger 472 on a lever 473 pivoted on the rod 372 (Figs. 10 and 33) and urged by a spring 474 into engagement with the alining bar 465, the spring 474 being stronger than the springs 470 and 471, and retaining the alining bar 465 in engagement with the type wheels.

The lever 473 is provided with a slot 475, which cooperates with a pin 476 on the rod 372 to limit the extent of movement of the lever 473, but the slot is long enough to allow the lever 473 to follow the alining bar 465 as the type wheels begin to move rearwardly and to retain the alining bar 465 in engagement with the type wheels until the gears 400 can have shifted to engage the racks 402, if desired. After the type wheels have been moved rearwardly this distance, the lever 473 will no longer be able to retain the alining bar 465 in engagement with the type wheels, and the springs 470 and 471 will rock the alining bar out of engagement with the type wheels. The springs 470 and 471 will rock the alining bar 465 away from the type wheels until a pair of hooked arms 477 and 478, secured to the alining bar 465, engage the axle 379 upon which the type wheels rotate.

While the alining bar 465 is out of engagement with the type wheels 180 and 188, the double-rack members 182 will be displaced upwardly to set the type wheels, and the type wheel supporting frame will have moved the type wheels nearer the platen 380.

As the type wheels 180 and 188 near the platen 380, auxiliary levers 480 and 481, pivoted on the arms 466 and 467 and connected thereto at their upper ends by springs 482 and 483, will engage, with their lower ends (Fig. 2), studs 485 on supporting plates 365 and 366, so that, upon further movement of the type wheel supporting frame, the auxiliary levers 480 and 481 will rock clockwise (Fig. 2) on the arms 466 and 467, causing the springs 482 and 483 to pull the alining bar 465 toward the type wheels 180 and 188 to engage the type wheels and line them just before they are moved into printing relation with the platen. In this manner, the alinement of the figures which are printed is obtained.

During the return movement of the type wheels, the springs 470 and 471 will move the alining bar 465 out of engagement with the type wheels as soon as the lower ends 484 of the auxiliary levers 480 and 481 move out of engagement with the studs 485 on the supporting plates 365 and 366, and will retain the alining bar 465 out of engagement with the wheels during the restoration of the wheels by the double-rack members 182. As the type wheels approach their forward, home position, the alining bar 465 will engage the finger 472 on the lever 473 and be moved into engagement with the type wheels.

The alining bar 465, therefore, can retain the type wheels in proper position at all times except when they are being set by the double-rack members 182.

It is desired that the printing mechanism be controlled in both adding and subtracting operations so that zeros will be printed to the right of the highest denominational significant digit in an amount, but will not be printed to the left thereof.

As shown in Fig. 23, each amount type wheel 180 is provided with eleven type faces, one for each of the digits "one" through "nine" and "zero," to enable these digits to be printed, and a blank type face, which will prevent an impression from being made on the record material when the type wheel is moved into printing relation with the platen 380.

In adding operations, when no amount key is depressed in a row, the gear 400 will be in mesh with the rack 402, and the slight movement of the differentially operable means to move the stop bar 165 to engage the zero stop 83 will raise the double-rack member 182 and rotate the type wheel 180 counter-clockwise (Fig. 23) a slight extent to place the zero type face in printing position when the type wheel is moved into printing relation with the platen. Means are provided to return the type wheels to the left of the highest denominational significant digit one space in a clockwise direction to place the blank type face of the type wheels in printing position, thereby to eliminate the printing of zeros to the left of the highest denominational significant digit in an amount.

In subtracting operations, when no amount key is depressed in a row, the gear 400 will be in mesh with the rack 401, and the movement of the differentially operable means to its full extent will raise the double-rack member 182 an extent sufficient to cause the type wheel 180 to be rotated clockwise (Fig. 23) to place the blank type face in printing position. The means which returns the type wheels to the left of the highest denominational significant digit of an amount to their blank position in adding operations will be effective in subtracting operations to return the type wheels to the right of the highest denominational significant digit, which are set to their blank positions, one space in a counter-clockwise direction (Fig. 23) to move the zero type faces to printing position to cause zeros to be printed whenever they occur in denominational orders to the right of the highest denominational significant digit of an amount.

The means for readjusting the setting of the type wheels is shown in Figs. 2, 16, 24, 33, and 35.

Figure 35:
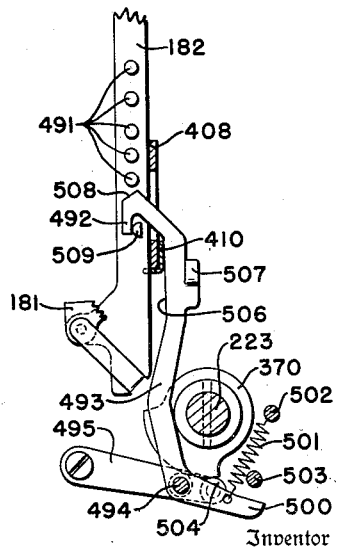
Fig. 35 is a detail view of a portion of the mechanism for controlling the printing of zeros.

Each double-rack member 182 associated with an amount type wheel 180 is provided with a row of studs 491, as shown in Figs. 2, 33, and 35, which can cooperate with a downwardly-extending finger 492 at the upper end of a readjusting lever 493, pivotally supported on a rod 494 connected to and carried by rearwardly-extending arms 495 and 496 pivoted on studs 497 and 498 (Fig. 33) on the supporting plates 365 and 366.

Each readjusting lever 493 is provided with a rearwardly-extending arm 500 (Figs. 2, 16, and 35), and a spring 501, connected to the arm 500 and to a rod 502 secured between supporting plates 365 and 366, urges the arms 500 upwardly until the free end of the arm 500 engages another rod 503 secured between the supporting plates 365 and 366. With the free end of the arm 500 in engagement with the rod 503, the spring 501 will urge the arm 500 clockwise (Fig. 35) about the rod 503 and will urge the rod 494 upwardly to cause rollers 504 and 505 (Figs. 10 and 35) on the ends of the arms 495 and 496 to engage the peripheries of the cams 370 on the shaft 223.

In the normal, unoperated condition of the machine, as shown in Fig. 16, the rollers 504 and 505 will engage the low portions of the cams 370, but, as the shaft 223 is rocked counter-clockwise (Fig. 16) during the first half of a machine cycle of operation, the rollers 504 and 505 will move up on the high portions of the cams 370 just before the cams reach the end of the counter-clockwise movement, and will rock the arms 495 and 496 clockwise (Fig. 2) about the studs 497 and 498. The arms 495 and 496 and the rod 494 therefor will form a shifting frame which is effective, when the frame is rocked about the studs 497 and 498, to shift the readjusting levers 493 downwardly before the type wheels move into printing relation with the platen 380.

In an adding operation, if the double-rack member 182 has been displaced to set the zero type face in printing position, the top stud 491 will be positioned immediately under the finger 492 when the rear surface of the basket engages a forward surface 506 on the readjusting lever 493, if the readjusting lever is in its normal position, and the rocking of the frame clockwise by the cam 370 at this time will draw the readjusting lever 493 downwardly, causing the finger 492 to engage the stud 491 and draw the double-rack member 182 downwardly sufficiently to move the blank type face on the type wheel 180 into printing position before the type wheel moves into printing relation with the platen 380.

If the double-rack member 182 has been displaced upwardly to set the type wheel to print a significant digit in an adding operation, one of the studs 491 will be in position to engage the front edge of the finger 492 and rock the readjusting lever 493 clockwise (Fig. 2) a slight distance about the rod 494 against the action of the spring 501. Under these conditions, when the frame is rocked by the cams 370, the fingers 492 will have no effect on the double-rack members 182.

Each of the readjusting levers 493 is formed on its rear edge with a bent-over ear 507 (Figs. 2, 24, and 35), which lies behind the readjusting lever 493 associated with the double-rack member 182 of the next higher denominational order (to the right in Fig. 24). When the double-rack member 182, which is set according to the highest denominational significant digit in an amount, rocks its related adjusting lever 493 clockwise, this lever, through the overlapping bent-over ears 507 on the levers, will cause a corresponding clockwise rocking of all the readjusting levers associated with the double-rack members in the lower denominational orders of the amount (to the left thereof in Fig. 24) and will move the fingers 492 on the levers out of cooperation with the studs 491 on their related double-rack members 182, even if the double-rack members are set to represent zeros, so that there will be no readjustment of the type wheels 180 associated with these rack members when the frame is rocked by the cams 370 and the type wheels will remain in their zero positions and will cause zeros to be printed wherever they are required to the right of the highest denominational significant digit of the amount.

The rocking of the readjusting lever 493 by the double-rack member 182, which is set according to the highest denominational significant digit in an amount, will merely move the ear 507 thereon away from the readjusting lever associated with the next higher denominational order (to the right in Fig. 24) and will not rock this readjusting lever and the ones in higher denominational orders (to the right thereof in Fig. 24), so that the fingers 492 on these levers will remain over the top studs 491 on their related double-rack members 182, and, when the frame is rocked by the cams 370, the fingers will readjust these rack members to move the blank type face on the type wheels associated therewith into printing position, thereby preventing zeros from being printed to the left of the highest denominational significant digit of the amount.

In a subtracting operation, if no key has been depressed in a row, the differentially operable means will be allowed to move its full extent, and the double-rack member 182 will be given a similar extent of movement upwardly, which causes the type wheel to be positioned with its blank type face in printing position. When the double-rack member has been thus displaced, the bottom stud 491 thereon will have been moved opposite the upper portion of the front edge of the finger 492, just below an inclined surface 508 at the top of the front edge of the finger 492. When the frame is rocked by the cams 370 near the end of the first half of the machine cycle of operation, the readjusting lever 493 will move downwardly and the cooperation of the inclined surface 508 with the stud 491 will also allow the lever to rock counter-clockwise (Figs. 2 and 35) to the position shown in Fig. 35, in which position the finger 492 has moved past a stud 509 on the double-rack member without the member.

If the double-rack member 182 has been displaced an extent corresponding to the nines complement of any of the significant digits one through eight, one of the studs 491 will be in a position to engage the front edge of the finger 492, as the type wheels move toward the platen, and will rock the readjusting lever 493 slightly clockwise (Figs. 2 and 35) about the rod 494. This rocking of the readjusting lever 493 will be effective, through the bent-over ears 507, to rock the readjusting levers 493 of lower denominational orders a similar extent, which places the fingers 492 over the studs 509 on any double-rack members which have been moved to their full extent. When the frame is rocked clockwise and the readjusting levers 493 are drawn downwardly, the fingers 492 will engage the studs 509 in those orders in which the double-rack members have been moved their full extent, and will move those double-rack members sufficiently to cause the type wheels to move the zero type faces in printing position.

If, in the subtracting operation, the double-rack member 182 has been displaced an extent corresponding to the nines complement of "nine," the double-rack member 182 will have been positioned the same extent as when a zero value was entered in an adding operation, and the top stud 491 will have been positioned immediately below the finger 492 on the readjusting lever 493. When the displacement of the double-rack member 182 is not that of the highest denominational significant digit, the double-rack member 182 of the higher denominational order, which is displaced according to the highest denominational significant digit, will cause the readjusting fingers to be rocked to move the finger 492 in the lower denominational orders out of cooperative relation with the top studs 491 on any double-rack members 182 which have been set to the nines complement of "nine" and will prevent the readjustment of these double-rack members.

When the displacement of the double-rack member 182 according to the nines complement of "nine" represents the highest denominational significant digit of an amount, the finger 492 on the related readjusting lever 493 will be held out of cooperative relation with the stud 491 by the readjusting lever 493 associated with the double-rack member of the next higher order, which next higher order double-rack member is set to its full extent of movement and has its lowest stud 491 engaging the top of the front face of the finger 492 to rock the associated readjusting lever clockwise (Figs. 16 and 35). It will be recalled that the inclined surfaces 508 on the fingers 492 will allow the fingers 492 in orders above the highest denominational significant digit to rock counter-clockwise about the rod 494 when the readjusting levers 493 are moved downwardly, but, when the double-rack member 182 to be displaced according to the highest denominational significant digit is displaced according to the nines complement of "nine," the finger 492 associated with that member will move down behind the top stud 491 on that member before the readjusting lever 493 of the next higher order is allowed to rock counter-clockwise (Fig. 16) about the rod 494 due to the cooperation of the inclined surface 508 on the lever and the lowest pin 491 on the member in the next higher order. Under these circumstances, the readjusting lever associated with the double-rack member which has been set to indicate the highest denominational significant digit will remain in its clockwise position (Figs. 16 and 35), where it will not cause any readjustment of the double-rack member 182 associated therewith and will cause readjustment of the double-rack members to be made in lower denominational orders of the amount where zeros should be printed.

Due to the manner in which the ears 507 on the readjusting levers overlap other readjusting levers, the rocking of the readjusting lever 493 associated with the double-rack member which has been set to represent the highest denominational significant digit of an amount will not be transmitted to the readjusting levers 493 associated with higher denominational orders, and these readjusting levers in the higher denominational orders will operate as described above, without causing the double-rack members to be readjusted, thus leaving the blank type face in printing position in those orders to the left of the highest denominational significant digit in an amount.

From the above it is seen that the printing mechanism will be adjusted automatically in adding and subtracting operations to prevent the printing of zeros to the left of the highest denominational significant digit of an amount and to cause zeros to be printed wherever they are required to the right of the highest significant digit of an amount.

The ribbon with which the type wheels cooperate to print data on record material carried by the platen is mounted on a rockable frame formed by rearwardly extending arms 515 and 516 (Figs. 10 and 34), which are pivoted on the rod 372 and are connected at their forward ends by a cross bar 517. The arms 515 and 516 are formed with spool-supporting plates 518 and 519, which support a pair of ribbon spools 520 and 521. At their rear ends, the arms 515 and 516 are bent inwardly to form guiding flanges 522 and 523, which guide the ribbon past the type wheels and in proper position relative to the platen 380 and the record material carried thereby. The flanges 522 and 523 carry rollers 524 and 525 (Figs. 10 and 34), which cooperate with upper rearward extensions of the supporting plates 365 and 366 to guide the rear ends of the arms in their movement.

Pawl and ratchet feeding means are provided to feed the ribbon step by step back and forth past the type wheels. This means is similar to that shown in the above-mentioned United States Patent No. 1,386,021, which issued to Peters, and includes a pawl and ratchet for each spool and a pair of pawl-operating slides 530 and 531 (Fig. 16), which are slidable in slots 532 (Fig. 17) in the supporting frames 365 and 366 and are operated by a link 533 connected to the link 393, which is connected to the arm 369 on the shaft 223 to be driven thereby during each operation of the machine. Reference may be had to this patent for further details of this ribbon feeding means, if they are desired.

It is desired that amounts and symbols printed in subtracting operations be printed in a distinctive color from those which are printed in adding operations, and to enable this to be accomplished, a two-color ink ribbon is provided.

The normal position of the arms 515 and 516 on the rod 372, which is the position which the arms occupy in adding operations, is determined by studs 535 (Figs. 16, 17, and 34) on the supporting plates 365 and 366, which studs support the rear ends of the arms with the upper zone of the ribbon in printing position to enable data to be printed in one color.

The weight of the ribbon spools and the other parts carried by the arms 515 and 517 normally maintains the arms in engagement with the studs 535 in the plates 365 and 366. A spring 534, connected to the cross bar 517 (Fig. 34), engages the rod 294 and assists in maintaining the arms 515 and 516 in engagement with the studs 535 and also assists in returning the arms from their shifted position.

In subtracting operations, the arms 515 and 516 are shifted to raise their rear ends upwardly to place the lower zone of the ribbon in printing position to enable data to be printed in a distinctive color. The manner in which the ribbon is shifted in subtracting operations will now be explained.

It will be recalled that in subtracting operations the control arm 439 is rocked clockwise (Fig. 16) with the shaft 446 to render the lever 427 operable to prevent the shifting of the gears 400 out of engagement with the racks 401.

The rearward extension 457 (Fig. 34) of the control arm 439 is engaged by a roller 536 on a lever 537, which is pivoted on a stud 538 on the arm 516 and is urged clockwise (Fig. 34) about the stud 538 by a spring 539. In the normal position of the lever 537, shown in full lines in Fig. 34, the lower end of the lever 537 is so positioned relatively to a stud 540 on the side member 377 of the type wheel supporting frame that the stud 540, in its rearward movement with the frame, will be ineffective to move the lever 537. When the control arm 439 is shifted clockwise (Fig. 34) in a subtracting operation, the rearward extension 457, acting on the roller 536, will rock the lever 537 counter-clockwise (Fig. 34) to the position shown in dot-and-dash lines in Fig. 34, to place the lower end of the lever 537 in driving relation with the stud 540. Under these circumstances, the lever 537 and that portion of the side member 377 between the studs 540 and 378 form a toggle linkage which will be straightened as the stud 540 moves the lower end of the lever 537 rearwardly when the type wheel supporting frame shifts the type wheels into printing relation with the platen and causes the stud 540 to move rearwardly to the position shown in dot-and-dash lines in Fig. 34. The straightening of this toggle linkage will raise the rear end of the arm 516 to rock the ribbon-supporting frame about the rod 372 and place the lower zone of the ribbon in printing position to enable the printing of amounts and symbols to be made in a distinctive color in subtracting operations.

Near the end of the subtracting operation, the control arm 439 will be rocked counter-clockwise by the return movement of the keyboard and will allow the spring 539 to move the lower end of the lever 537 out of driving relation with the stud 540 when the type wheel supporting frame is returned forwardly to its normal, home position.

The record material upon which amounts and symbols are printed is supplied from a roll 545, which is carried at the back of the machine (Fig. 16) on a rod 546, which extends between a pair of arms 547, which extend through a suitable opening 548 (Fig. 2) in the casing 50 at the rear of the machine and are loose on a shaft 549 journaled in the brackets 382 and 383.

The record material from the roll 545 enters a slot 550 (Fig. 2) in the casing 50 and is guided around the platen by a pair of guiding strips 551 (Fig. 16), which are provided with forward ears 552, by which they are secured to the supporting plates 365 and 366 and are provided with rearward ears 553, by which they are supported on the shaft 549. The rear ends of the strips 551 are located adjacent the slot 550 in the casing 50 and cooperate with the record material as it passes through the slot 550, to guide the record material around the platen 380. The forward upper ends of the guiding strips 551 extend laterally to about the outer ends of the platen 380 and are also connected to a transparent, serrated tear-off bar 554 located at the front of the platen, above the printing point.

A pair of pressure rollers 559 and 560 engage the record material and press it into engagement with the platen. The pressure rollers 559 and 560 are carried on levers 561, which are pivotally supported at their mid-point on a rod 562, which is connected between the forward ends of levers 563 (Figs. 14 and 15). The levers 563 are provided with square-cut notches which engage square-cut portions of the shaft 549 (Fig. 14) and connect the levers for movement with the shaft 549. Springs 564, connected between the lower end of each lever 563 and the adjacent supporting plate 365 or 366, urge the levers 563 and the shaft 549 counter-clockwise (Figs. 14 and 15) to press the rollers 559 and 560 into engagement with the platen.

The pressure rollers 559 and 560 are moved out of engagement with the platen by means of a knurled disk-like member 565 (Fig. 15) loose on the shaft 381 and having a pin 566 (Figs. 13 and 15) thereon, which extends into a slot 567 in the end of an arm 568 secured to the shaft 549. When the member 565 is rocked counter-clockwise (Fig. 15), it will be effective, through its pin-and-slot connection with the arm 568, to rock the shaft 549 and the levers 563 clockwise (Figs. 14 and 15) to move the pressure rollers 559 and 560 away from the platen. As soon as the member 565 is released, the springs 564 will restore the pressure rollers 559 and 560 into engagement with the platens.

If desired, record material can be readily front-fed into printing position merely by releasing the pressure rollers 559 and 560 and inserting the material downwardly between the tear-off bar 554 and the platen, the guiding strips being effective at this time to guide the record material downwardly and rearwardly in proper relation about the platen.

After each operation of the printing mechanism, the platen is rotated automatically clockwise (Fig. 2) and counter-clockwise (Fig. 13) a distance to feed the record material and move the printed data (if any) away from printing position. The automatic line-spacing means is shown in Fig. 13. The shaft 381, upon which the platen is mounted, is provided at its left end with a ratchet 569. Cooperating with the ratchet 569 is a line-space pawl 570, which is pivotally supported on a stud 571 on a lever 572 and is urged clockwise about the stud 571 by a spring 573 connected to the pawl 570 and to a pendant link 576, which is also pivotally connected to the lever 572 by the stud 571. In the home position of the lever 572, a tail 574 on the pawl 570 engages a stud 575 on the bracket 382 and rocks the pawl 570 out of engagement with the ratchet 569.

The lever 572 is pivoted on the end of the rod 372 and is provided with a forwardly-extending finger 580, which can cooperate with a flange 581 on the rear end of a lever 582 pivoted on a stud 583 on the side frame 51.

The lever 572 is urged counter-clockwise (Fig. 13) about the rod 372 by a spring 585 connected to the lever and to the side frame 51, but is normally retained in the position shown in Fig. 13 by the engagement of the pendant link 576 pivoted on the stud 571 on the lever 572 with a roller 586 carried by an arm 587 on the shaft 223. When the shaft 223 rocks counter-clockwise (Fig. 13) during the first half of a machine cycle of operation, the roller 586 will move away from the bottom of the pendant link 576 and allow the spring 585 to rock the lever 572 about the rod 372 until the finger 580 engages the flange 581 on the lever 582. The pendant link 576 is provided near its lower end with a slot 577, which cooperates with a stud 578 on the side frame 51, the slot and the stud guiding the free end of the link 576 and also controlling the maximum extent of movement of the lever.

This movement of the lever 572 will carry the line-space pawl 570 downwardly and allow the spring 573 to move the pawl into engagement with the ratchet 569. The extent of the downward movement of the pawl 570 is such that the pawl in its return movement will rotate the platen 380 a distance corresponding to a line space before the pawl is moved out of engagement with the ratchet by the engagement of the tail 574 on the pawl with the stud 575.

Accordingly, during any operation of the machine in which the finger 580 engages the flange 581 on the lever 582, the record material will be given a line-space movement.

A detent roller 588 (Fig. 13), carried by a lever 589 loose on the shaft 549, and urged by a spring 590 into engagement with the teeth of the ratchet 569, is effective to retain the platen in any of its line-spaced positions.

*Sub-total-taking control mechanism*

In a sub-total-taking operation, the value of the total in the totalizer is printed, and the total is retained in the totalizer at the end of the operation, so that further amounts can be added to or subtracted from the total if desired.

The mechanism for controlling the operation of the various parts of the machine in sub-total-taking operations is shown in Figs. 10, 11, 13, 19, 21, 22, and 25 and is as follows:

When the Sub-Total key 65 (Figs. 1, 19, and 21) in the row of control keys on the keyboard is depressed, a downward extension 595 of the key will engage a horizontally disposed portion 596 of a lever 597 loosely pivoted on a shaft 598 (Figs. 2, 10, 13, 19, and 21), which is journaled in the side frames 51 and 52, and will rock the lever 597 counter-clockwise (Figs. 19 and 21) about the shaft 598.

An arm 601 of the lever 597 extends down in front of a stud 602 on a horizontally disposed link 603, which link is pivotally connected at its rear end by a stud 604 to the lower end of a lever 605 pivoted on a stud 606 extending inwardly from the side frame 52. The forward end of the link 603 has therein a slot 607, which embraces a stud 608 in the lower end of a cam lever 609 pivoted on a stud 610 extending inwardly from the side frame 52. A spring 615, connected to the lever 605 and to a stud on the side frame 52, urges the link 603 forwardly until the rear end of the slot 607 engages the stud 608 and rocks the cam lever 609 into engagement with a stud 616, which extends inwardly from the side frame 52, as shown in Fig. 21.

When the lever 597 is rocked counter-clockwise (Fig. 21) by depression of the Sub-Total key 65, the arm 601 will engage the stud 602 on the link 603 and will shift the link rearwardly against the action of the spring 615, the rearward movement of the link causing the lever 605 to pivot counter-clockwise about the stud 606. The link 603 will be retained in its rearward position until the Sub-Total key 65 is released near the end of the sub-total-taking operation.

The link 603, when it is moved rearwardly, is effective, through the counter-clockwise rocking of the lever 605, to enable the totalizer engaging mechanism to be controlled to cause the totalizer to be engaged with the differential mechanism during the forward and return movements of the differential mechanism.

As explained earlier herein in connection with adding and subtracting operations, if the totalizer is in engagement with the differential mechanism at the beginning of an operation of the machine, the shoulder 236 (Fig. 19) on the pawl 221 will engage the stud 235 on the three-armed lever 220 upon operation of the arm 222 and will rock the three-armed lever 220 counter-clockwise to cause the totalizer to be disengaged from the differential mechanism before the differential mechanism moves forward during the first half of the machine cycle of operation. In the sub-total-taking operation, the totalizer will be disengaged from the differential mechanism by the operation of the pawl 221 on the three-armed lever 220 just as in adding and subtracting operations, but will be reengaged with the differential mechanism by the following means before the differential mechanism begins its forward movement.

A lever 617 (Figs. 10, 11, 19, 21, 22, and 33) is pivoted on a stud 618 on the side frame 52. The lever 617 is urged clockwise (Fig. 19) about the stud 618 by a spring 619 (Fig. 11) connected to a pin 620 on the lever and to the side frame 52, but is normally prevented from making this clockwise movement by a controlling latch 621 and a timing latch 622 (Fig. 11), which have thereon shoulders that cooperate with a lateral extension 623 of the lever 617.

The timing latch 622 (Figs. 10 and 11) is pivoted on the side frame 52 and is urged into engagement with the extension 623 by a spring 624. The free end of the timing latch 622 extends over a stud 625 on the link 268, so that, when the link 268 is raised to cause the transfer mechanism to be restored early in the operation of the machine, it will be effective to raise the free end of the timing latch 622 and remove the shoulder thereon from engagement with the lateral extension 623 of the lever 617, thus freeing the lever 617 to the action of the spring 619, if the controlling latch 621 has been moved to withdraw the shoulder thereon from engagement with the lateral extension 623 on the lever.

The timing of the operation of the latch 622 is such that the totalizer will have been disengaged from the differential mechanism, and any operated transfer mechanism will have been restored, before the latch 622 is moved sufficiently to withdraw the shoulder thereon from blocking relation with the extension 623 on the lever 617.

The controlling latch 621 is pivoted on a stud 630 extending inwardly from the side frames 52 and is normally in the position shown in Fig. 19, where its shoulder will be in blocking relation with the extension 623 on the lever 617 to prevent the complete movement of the lever 617 by the spring 619 when the timing lever 622 is moved out of engagement with the lever 617. It will be noted that the timing latch 622 locates the lever 617 in a normal position, in which there is a slight clearance between the extension 623 and the shoulder on the controlling latch 621, so that the controlling latch can be rocked freely about the stud 630 at this time. When the lever 605 is rocked counter-clockwise (Fig. 19) about the stud 606, by the rearward movement of the link 603 upon the depression of the Sub-Total key 65 to initiate a sub-total-taking operation, a link 631, pivotally connected to the upper end of the lever 605 and to the mid-point of a floating lever 632 pivotally connected to the controlling latch 621, will cause the controlling latch 621 to rock clockwise (Fig. 19) about the stud 630 and will move the shoulder on the latch out of blocking relation with the extension 623 on the lever 617.

If, therefore, the controlling latch 621 has been moved out of blocking relation with the extension 623 when the timing latch 622 is operated by the stud 625 on the link 268, the lever 617 will be free to be operated by the spring 619 and will engage a stud 633 on the three-armed lever 220 to rock the three-armed lever clockwise (Fig. 19) and cause the totalizer to be reengaged with the differential mechanism before the differential mechanism begins its forward movement.

The link 603 will also be effective, when it is moved rearwardly, to cause any depressed amount keys to be released and to cause the zero stops to be removed from blocking relation with the stop bars 165 to allow the differential mechanism to move forwardly even though no amount keys are depressed on the keyboard.

A coupling lever 635, pivoted on a stud 636 on the link 603, is urged counter-clockwise (Fig. 19) about the stud 636 by a spring 637 to maintain the front end of the coupling lever in engagement with the stud 608. In the normal position of the link 603, when the stud 608 is in the rear end of the slot 607, a notch 638 near the front end of the coupling lever 635 will engage the stud 608 and retain it in the rear end of the slot 607, thus coupling the cam lever 609 to the link 603 for operation thereby. When the link 603 is shifted rearwardly by the depression of the Sub-Total key 65, the cam lever 609 will be rocked counter-clockwise (Figs. 11, 19, and 21) about the stud 610, and the upper end of the cam lever 609 will engage the roller 348 on the rearwardly-extending arm 109 of the key release bail 87 to rock the bail clockwise (Fig. 11) and thereby release any depressed amount key 61 and move the zero stops 83 out of blocking relation with the stop bars 165 so that the differential mechanism will be free to move forwardly during the first half of a machine cycle of operation.

The counter-clockwise movement of the cam lever 609 is also effective to initiate operation of the driving mechanism during the sub-total-taking operation. Pivotally connected at its front end on a stud 641 on the cam lever 609 is a link 642 (Figs. 10, 11, and 12), which is provided at its rear end with a slot 643, into which extends a stud 644 on the lever 358. When the cam lever 609 is rocked by the link 603, it will draw the link 642 forwardly and rock the lever 358 counter-clockwise (Fig. 12) to depress the stud 360 and rock the latch to remove the hooked end of the arm 310 from engagement with the lever 304 to free the lever 304 and thereby initiate operation of the driving mechanism. The slot 643 in the link 642 enables the lever 358 to be rocked independently of the cam lever 609 to render the driving mechanism operable in subtracting operations.

With the differential mechanism free to operate and with the totalizer engaged therewith before the differential mechanism starts its forward movement, the differential mechanism will drive the totalizer wheels clockwise (Fig. 2) during the first half of the machine cycle until they are stopped in their "zero" positions by the engagement of the straight side of the transfer cams 201 with the rear side of the lugs 241 on the transfer levers 240.

When the totalizer wheels 195 have been stopped in their "zero" positions, their related differentially operable means will have been displaced extents corresponding to the value on the totalizer wheels at the beginning of a sub-total-taking operation; that is, the displacement will correspond to the true value of the total if the total is positive, and the nines complement of the total if the total is negative.

The rearward shifting of the link 603 will have moved the rear end of the coupling lever 635 into the path of a stud 648 (Figs. 19 and 25) on the arm 191 on the main shaft 106, and, near the end of the first half of the machine cycle of operation, the stud 648 will rock the coupling lever 635, as shown in Fig. 25, to raise the notch 638 therein out of engagement with the stud 608 on the cam lever 609 to free the cam lever 609 from the link 603 and allow the cam lever 609 and the parts operated thereby to be restored to their normal positions.

The totalizer remains in engagement with the differential mechanism during the second half of the machine cycle, when the differential mechanism is returned rearwardly to its home position, and enables the amount which was thereon at the beginning of the operation to be restored thereto by the differential mechanism. The parts of the totalizer engaging mechanism are shown in Fig. 22 in the positions which they occupy at the beginning of the second half of the machine cycle of operation.

As the controlling latch 621 is moved by the depression of the Sub-Total key 65, a slot 650 in the forward end of the floating lever 632, cooperating with a stud 651 on a lever 652 loose on the stud 219, will cause the lever 652 to rock counter-clockwise from the position shown in Fig. 21 to the position shown in Fig. 22. This movement of the lever 652 will move a stud 653 in its lower end rearwardly so that it can cooperate with a plate 654 on the pawl 221 and maintain the shoulder 237 out of engaging relation with stud 238. It will be recalled that, in the rearward movement of the arm 222 and the pawl 221, the shoulder 237 engaging the stud 238 normally causes the three-armed lever 220 to rock clockwise (Figs. 19, 21, and 22) to cause the totalizer to be engaged with the differential mechanism; however, since the totalizer has already been engaged with the differential mechanism by the lever 617, the three-armed lever 220 will have been shifted, and the shoulder 237 will not be effective to shift the three-armed lever 220. In order to prevent improper cooperation of the shoulder 237 with the stud 238 at this time, the stud 653 blocks the movement of the pawl 221 to its normal position, thereby retaining the shoulder 237 out of cooperative relation with the stud 238 during return movement of the arm 222.

The arms 222 and 225 (Figs. 10, 11, 19, and 33) are connected at their upper ends by a cylindrical member 656. During the return movement of the arms in the second half of the machine cycle, the cylindrical member 656 will engage a roller 657 on a rearwardly-extending arm 658 (Fig. 19) on the lever 617 and will restore the lever counter-clockwise (Fig. 19) against the action of the spring 619 until the lateral extension 623 on the lever moves beyond the shoulder on the timing latch 622 and allows the spring 624 to move the shoulder behind the extension 623 and retain the lever 617 in the position shown in Figs. 11 and 19.

In each sub-total-taking operation, therefore, the totalizer will be engaged with the differential mechanism and will control the displacement of the differential mechanism extents corresponding to the amounts on the various totalizer wheels, and this operation will be the same, regardless of whether the total in the totalizer is a positive total or a negative total. When the total is positive, the displacement of the differential mechanism will correspond to the value of the total, but, when the total is negative, the displacement will correspond to the nines complement of a negative total. The true value of positive and negative totals can be printed merely by controlling the engagement of the gears 400, secured to the type wheels, with the racks 401 or 402 on the double-rack members 182. If the total is positive, the gears 400 will be caused to mesh with the racks 402, as in adding operations, and the type wheels 180 will be set to print the amount represented by the displacement of the differential mechanism, or the true value of the positive total. If the total is negative, the gears 400 will remain in mesh with the racks 401, as in subtracting operations, and the type wheels 180 will be set to print the nines complement of the amount represented by the displacement of the differential mechanism, or the true value of the negative total.

The following means, which are controlled by the totalizer according to whether the total is positive or negative, can be operated by the shifting of the link 603 and can operate the means which controls the engagement of the gears 400 with the racks 401 or 402.

Connected to the link 603 (Figs. 10, 19, and 21) by a stud 660 is the rear end of a link 661, which is pivotally connected at its forward end to an arm 662 secured to the shaft 598. An arm 663 (Figs. 10 and 13), secured to the left end of the shaft 598, has the forward end of a link 664 pivotally connected thereto, the rear end of the link 664 being connected to a forward portion of the lever 582, which is pivotally supported on the stud 583. As the link 603 is moved rearwardly by the depression of the Sub-Total key 65, the link 661 will cause the shaft 598 to rock clockwise in Figs. 19 and 21 and counter-clockwise in Fig. 13, to move the link 664 rearwardly and rock the lever 582 counter-clockwise (Fig. 13). A spring 665, connected between the arm 663 and the side frame 51, assists in restoring the shaft 598 and the linkage connected thereto to their normal positions.

When the machine is operated within its normal, intended capacity, the overflow wheel 195 of the totalizer will always be standing at its "nine" position when the total is negative, and will be standing in any of its other positions when the total is positive. Advantage is taken of this condition to enable the totalizer to control the operation of the printing mechanism automatically, according to whether the total is positive or negative.

A lever 670 (Figs. 13, 31 and 32), pivoted on a stud 671 on the side frame 51, extends through an opening in the side frame and has a bent-over ear 672 on its free end, which is located adjacent the transfer cam 201 connected to the overflow wheel. A spring 673, connected to the lever 670 and to the side frame 51, urges the lever 670 into engagement with a stop stud 669 on the side frame 51 to position the ear 672 in cooperative relation with the transfer cam 201. The ear 672 on the lever 670 is so located relatively to the overflow wheel that, when the overflow wheel moves to "nine" position, the tooth-like portion of the transfer cam 201 will engage the ear and rock the lever 670 counter-clockwise in Fig. 32 and clockwise in Fig. 13, against the action of the spring 673.

The lever 670 controls the position of a link 674, which is pivoted on a stud 675 on the left arm of the yoke 448 and extends forwardly in the machine. A stud 676 on the lever 670 engages the link 674 and controls the position of the forward end of the link 674, which link is formed near its forward end with a shoulder 677.

When the total is positive, the forward end of the link 674 will be in the position shown in Figs. 13 and 32, and the shoulder 677 thereon will be out of engaging relation with a stud 678 on the link 664. When the link 664 is moved rearwardly by depression of the Sub-Total key 65, the link 674 will not be moved thereby, and the yoke 448 and the control arms 439 and 445 will remain in the positions in which they render the levers 427 and 441 ineffective, allowing the gears 400 to shift into mesh with the racks 402, just as in adding operations.

If the total is negative, the lever 670 will be rocked clockwise in Fig. 13 and counter-clockwise in Fig. 32, and will allow the shoulder 677 on the link 674 to be positioned in operative engagement with the stud 678 on the link 664. When the link 664 is moved rearwardly by the depression of the Sub-Total key 65, the stud 678 will cause the link 674 to be moved rearwardly to rock the yoke 448 and the control arms 439 and 445, and will allow the levers 427 and 441 to move into blocking relation with the studs 417 and 418 on the basket, as in subtracting operations, to retain the gears 400 in mesh with the racks 402. The slot 450 in the link 451 will allow the stud 449 on the yoke 448 to move rearwardly at this time without causing an operation of the link 451.

Accordingly, the printing mechanism is controlled automatically in sub-total-taking operations, according to whether the total is positive or negative, and will enable the true value of the total to be printed.

In a sub-total-taking operation, the differentially operable means which is associated with the row of control keys will be free to move an extent controlled by the depressed Sub-Total key. This movement is transmitted to the symbol type wheel 188, which has a "positive sub-total" symbol and a "negative sub-total" symbol so located thereon that, if the gears 400 are in mesh with the racks 402, due to the sub-total being positive, the displacement of the symbol type wheel 188 by the differentially operable means will cause the symbol indicating a positive sub-total to be moved to printing position, and, if the gears 400 are in mesh with the racks 401, due to the sub-total being negative, the displacement of the type wheel by the differentially operable means will cause the symbol indicating a negative sub-total to be moved to printing position.

The extension 457 of the control arm 439 will be effective to control the ribbon shifting mechanism to cause the lower zone of the ribbon to be shifted to printing position in negative sub-total-taking operations, as in subtracting operations, so that negative sub-totals and the "negative sub-total" symbol will be printed in a distinctive color from positive sub-totals and the "positive sub-total" symbol.

When the link 664 is moved rearwardly in the sub-total-taking operation and rocks the lever 582 counter-clockwise (Fig. 13), it will move the flange 581 from in front of the forwardly-extending finger 580 on the lever 572. This will allow the lever 572 to be rocked by the spring 585 counter-clockwise (Fig. 13) about the rod 372, the maximum extent of movement as determined by the slot 577 and the stud 578, thus allowing the line-space pawl 570 to be displaced downwardly sufficiently that, when it is returned to its home position near the end of the sub-total-taking operation, it will cooperate with the ratchet 569 and move the platen 380 through five line-space positions before it is withdrawn from engagement with the ratchet by the engagement of the tail 574 with the stud 575. In this manner, the record material is given a long feeding movement after each sub-total is printed thereon to bring this sub-total print above the serrated tear-off strip 554.

From the above it is seen that, except for the engagement of the gears 400 and the racks 401 and 402, the operation of the machine in sub-total-taking operations is the same when taking positive sub-totals as when taking negative sub-totals; and that positive and negative sub-totals can be printed in suitable distinctive colors in a very simple manner.

*Total-taking control mechanism*

In a total-taking operation, the value of the total in the totalizer is printed and the total is cleared from the totalizer.

With the exception that the totalizer is disengaged from the differential mechanism during the return movement of the differential mechanism, and the symbol type wheel is set to print a total symbol, the operation of the machine in a total-taking operation is the same as that of a machine in a sub-total-taking operation, explained above.

The mechanism for controlling the operation of the various parts of the machine in the total-taking operation is shown in Figs. 10, 11, 13, 19, 21, 22 and 25 and is as follows:

When the Total key 64 (Figs. 1, 19, 21, and 25) in the row of control keys on the keyboard is depressed, a downward extension 685 of the key will engage a horizontally-disposed portion 686 of a lever 687 pivoted on a stud 688, which extends inwardly from the side frame 52, and will rock the lever counter-clockwise about the stud. A downwardly-extending arm 689 on the lever 687 lies in front of a stud 690 in an ear 691 on the link 603 and is effective to shift the link 603 rearwardly when the lever is rocked by the key.

The rearward movement of the link 603 (Figs. 19 and 21), through the lever 605, moves the controlling latch 621 to ineffective position, just as in the sub-total-taking operation, and allows the lever 617 to cause the totalizer to be reengaged with the differential mechanism after the resetting operation of the transfer mechanism and before the differential mechanism begins its forward movement.

In the total-taking operation, the rearward movement of the link 603 will rock the cam lever 609 to cause the driving mechanism to be operable to drive the machine and also will cause the key release bail 87 to rock and release any depressed amount keys 61 and move the zero stops 83 out of blocking relation with the stop bars 165 to free the differential mechanism for forward movement even though no amount keys are depressed.

The link 603 will also be effective, through the link 661, to rock the shaft 598 and render the totalizer control means operable to control the printing mechanism and the ribbon shifting mechanism according to whether the total in the totalizer is positive or negative, just as in sub-total-taking operations, described above.

In addition to shifting the link 603 rearwardly, the lever 687 operates the following mechanism, which is not operated in sub-total-taking operations and which, when operated, causes the disengagement of the totalizer from the differential mechanism before the differential mechanism begins its rearward movement to its home position.

The downwardly-extending arm 689 of the lever 687 (Figs. 19 and 25) has a stud 692 thereon, which lies in front of a lever 693 pivoted on a stud 694 on the side frame 52, and is urged counter-clockwise by a spring 695 until a shoulder 696 on the lever 693 engages a hub on the lever 687. A rearwardly-extending arm 697 of the lever 693 extends under a stud 698 in the front end of a link 699 pivoted to the lever 213. A spring 700, connected to the link 699 and to a stud on the side frame 52, urges the front end of the link 699 downwardly to maintain the stud 698 in engagement with the arm 697.

The spring 695 is stronger than the spring 700, and consequently the lever 693 will normally occupy the position shown in Fig. 19, where its shoulder 696 engages the hub of the lever 687 and its arm 697 retains the free end of the link 699 in an elevated position where a notch 701 therein is out of the path of movement of a stud 702 on the plate 191.

When the Total key 64 rocks the lever 687, the stud 692 will rock the lever 693 clockwise (Fig. 19) to the position shown in Fig. 25, causing the arm 697 to move downwardly and allowing the forward end of the link 699 to move downward to place the notch 701 in the path of movement of the stud 702. During the first half of a machine cycle of operation, the plate 191 rocks counter-clockwise from the position shown in Fig. 19 to the position shown in Fig. 25, and, as the plate nears the end of its clockwise movement, the stud 702 will move into the notch 701. At the beginning of the return movement of the plate 191, the stud 702 will engage the rear face of the notch 701 and will drive the link 699 rearwardly to shift the lever 213 and cause the totalizer to be disengaged from the differential mechanism before the differential mechanism begins its rearward movement.

In the total-taking operation, therefore, the differential mechanism will be freed for forward movement and the totalizer will be reengaged with the differential mechanism after the transfer mechanism has been restored and before the differential mechanism begins its forward movement. When the differential mechanism moves forward, it will drive the totalizer wheels 195 clockwise (Fig. 2) until the straight side of the transfer cam 201 engages behind the lugs 241 on the transfer levers 240 and prevents further movement, at which time the differential mechanism will have been displaced extents which represent the amount which was on the totalizer at the beginning of the total-taking operation, and the totalizer will have been set to its "zero" or cleared position. Before the differential mechanism begins its rearward movement, the link 699 will be operated by the stud 702 and will cause the totalizer to be moved out of engagement with the differential mechanism to prevent any entry from being made into the totalizer when the differential mechanism moves rearwardly to its home position.

Near the end of the first half of the machine cycle of operation, the cam lever 609 will be uncoupled from the link 603 and will allow the zero stops 83 to move into engagement with the teeth of ratchet plates 649 (Figs. 2 and 10) to operate as "anti-slam" means and prevent undesired forward movement of the differential mechanism. The "anti-slam" means is necessary in total-taking operations because in these operations the forward movement of the differential mechanism is stopped by the totalizer wheels when they reach their "zero" position, and, if the "anti-slam" means were not provided, the differential mechanism would move forward from its displaced position to its maximum extent of movement when the totalizer was disengaged therefrom by the operation of the link 699, and would cause an undesirable slamming of the differential mechanism against the cross bar 185. While the "anti-slam" means prevents the further forward movement of the differential mechanism when the totalizer is disengaged therefrom in total-taking operations, the teeth of the ratchet plate 649 are so shaped that the differential mechanism can be moved rearwardly from their set positions by the cross bar 185.

In the total-taking operations, as in the sub-total-taking operations, the gears 400 on the type wheels will be shifted to engage the racks 402 if the total is positive and will remain in engagement with the racks 401 if the total is negative, so that the true value of positive and negative totals can be printed on the record material.

The differentially operable means associated with the row of control keys will be free to move an extent controlled by the depressed total key in total-taking operations. This movement is transmitted to the symbol type wheel 188, which has a "positive total" symbol and a "negative total" symbol so located thereon that, if the gears 400 are in mesh with the racks 402, due to the total's being positive, the displacement of the symbol type wheel 188 by the differentially operable means will move the symbol indicating a positive total to printing position, and, if the gears 400 are in mesh with the racks 401, due to the total's being negative, the displacement of the symbol type wheel 188 by the differentially operable means will cause the symbol indicating the negative total to be moved to printing position.

The ribbon shifting mechanism will be operated in the total-taking operations, as in sub-total-taking operations, to cause positive totals and the positive total symbol to be printed in the same color as a positive sub-total and to cause the negative total and the negative sub-total symbol to be printed in the same distinctive color as the negative sub-total.

The line-spacing means is controlled in total-taking operations, just as in sub-total-taking operations, to cause a long feeding movement to be given to the record material as each total is printed on it.

It is seen from the above that positive and negative totals can be printed and in suitable distinctive colors, in a very simple manner in the novel machine.

Non-add control mechanism

A non-add operation is similar to an adding operation but different therefrom in that the totalizer is retained disengaged from the differential mechanism during the entire machine cycle of operation. To perform a non-add operation, an amount is set up on the keyboard and the Non-Add key 63 is depressed. The Non-Add key causes the driving mechanism to be operable to drive the machine and also controls the totalizer engaging mechanism to prevent the engagement of the totalizer with the differential mechanism during the operation, the amount keys controlling the operation of the differential mechanism, which sets the printing mechanism to print the amount set up on the keyboard without entering this amount into the totalizer.

When the Non-Add key 63 (Figs. 1, 19, and 20) is depressed, a downward extension 710 thereof will engage a horizontally-disposed portion 711 of a lever 712 (Figs. 10, 19, and 20) pivoted on the stud 688 on the side frame 52.

The means by which the Non-Add key can exert its control over the engaging mechanism is as follows:

A downwardly-extending arm 713 of the lever 712 has pivoted thereto the forward end of a link 714, which is pivotally connected at its rear end by a stud 715 to an arm 716, free on the stud 606, which extends inwardly from the side frame 52. A spring 717, connected between the link 714 and the lever 605, urges the link 714 rearwardly and the lever 712 counter-clockwise (Figs. 19 and 20) to maintain the horizontally-disposed portion 711 of the lever 712 in engagement with the downward extension 710 of the Non-Add key.

A link 718 has, near its lower end, a slot 719, which embraces the stud 715, and at its upper end is pivotally connected by the stud 651 to the lever 652, which is pivoted on the stud 219 and has, in its lower end, stud 653 engaging the plate 654 on the pawl 221 to control the engagement of the shoulder 237 on the pawl with the stud 238 on the three-armed lever 220, which operates the lever 213 to engage and disengage the totalizer with and from the differential mechanism.

The slot 719 allows the lever 652 to be rocked in total- and sub-total-taking operations without causing the link 714 and the lever 712 to be operated.

When the Non-Add key 53 is depressed, it will rock the lever 712 clockwise (Figs. 19 and 20), causing the link 714 to shift forwardly and rock the arm 716 about the stud 606. As the arm 716 rocks about the stud 606, the stud 715 in the end of the arm will engage the lower end of the slot 719 and pull the link 718 downwardly to rock the lever 652 counter-clockwise (Fig. 19).

At the beginning of a non-add operation, just as at the beginning of an adding operation, previously described, the shoulder 236 on the pawl 221 will engage the stud 235 on the three-armed lever 220 to rock the lever counter-clockwise (Fig. 19) early in the machine cycle of operation and thereby cause the totalizer to be disengaged from the differential mechanism before the differential mechanism begins its forward movement. As explained earlier herein, in an adding operation the shoulder 237 on the pawl 221 will be moved into engaging relation with the stud 238 on the three-armed lever 220 near the end of the first half of the machine cycle of operation, so that, near the beginning of the second half of the machine cycle, the shoulder 237 can engage the stud 238 and rock the three-armed lever 220 clockwise to cause the totalizer to be engaged with the differential mechanism before the differential mechanism begins its return movement; however, since the lever 652 has been rocked counter-clockwise, the stud 653 will be in its rearward position and will hold the shoulder 237 out of engaging relation with the stud 238, as shown in Fig. 27. Consequently, when the pawl 221 is driven by the arm 222 in the return movement of the arm, the shoulder 237 will move idly past the stud 238 and the three-armed lever 220 will remain in its shifted position, causing the totalizer to remain out of engagement with the differential mechanism so that no entry is made in the totalizer during the restoration of the differential mechanism to its home position.

Depression of the Non-Add key 63 is also effective to render the driving mechanism operable to drive the machine. The lever 712 (Fig. 19) has a link 725 pivotally connected thereto, which link 725 extends forwardly of the machine and is pivotally connected by a stud 726 to an arm 727 of a lever 728 (Figs. 7, 10, and 12), which is rockable about a stud 729 on the bracket 309. The rear end of the lever 728 overlies the stud 360 in the operating arm 326 of the latch which controls the operation of the driving mechanism.

When the Non-Add key 63 is depressed, the downward extension 710 will rock the lever 712 clockwise (Figs. 19 and 20) and, through the link 725, will also rock the lever 728 (Fig. 12) clockwise to cause the lever 728 to engage the stud 360 and rock the latch to release the lever 304, which, as explained before, is effective to cause the motor to operate and the machine to to be connected to the motor for operation thereby.

In non-add operations, as in adding operations, the gears 400 secured to the type wheel are moved into mesh with the racks 402 and enable the amount set up on the keyboard to be printed.

The differentially operable means associated with the row of control keys will be free to move an extent controlled by the depressed Non-Add key. This movement is transmitted to the symbol type wheel 188, which has a "non-add" symbol so located thereon that, when the gear on the symbol type wheel is moved into mesh with the rack 402 and is displaced an extent determined by the Non-Add key, the "non-add" symbol will be moved to printing position to be printed beside the amount and indicate that that amount was not entered into the totalizer.

The novel machine, therefore, is provided with a simple form of non-add controlling mechanism which is rendered operable by the Non-Add key and enables the machine to operate to print amounts without entering these amounts into the totalizer.

While the form of mechanism herein illustrated and described is admirably adapted to fulfill the objects primarily stated, it is to be understood that it is not intended to confine the invention to the one form or embodiment disclosed herein, for it is susceptible of embodiment in various forms all coming within the scope of the claims which follow.

What is claimed is:

1. In a machine of the class described, the combination of a totalizer settable to represent the true value of a total when it is positive and the nines complement of a total when it is negative; a differential mechanism; means to control the operation of the totalizer and the differential mechanism to enable the differential mechanism to be displaced under control of the totalizer according to the amount of a positive total or according to the nines complement of the amount of a negative total; printing mechanism selectively operable to print the amount represented by the displacement of the differential mechanism or the complement of the amount represented by the displacement of the differential mechanism; and means controlled by the totalizer according to whether the total is positive or negative, and rendered operable when the totalizer controls the setting of the differential mechanism, for controlling the operation of the printing mechanism to print the amount corresponding to the displacement of the differential mechanism if the total on the totalizer is positive and to print the nines complement of the amount represented by the displacement of the differential mechanism if the total on the totalizer is negative, whereby the true amount of positive and negative totals will be printed.

2. In a machine of the class described, the combination of a totalizer settable to represent the true value of a total when it is positive and the nines complement of a total when it is negative; a differential mechanism; means to control the operation of the totalizer and the differential mechanism in a single machine cycle sub-total-taking operation, in the same manner whether the total is positive or negative, to enable the differential mechanism to clear the setting from the totalizer and be displaced according to the amount of a positive total or according to the nines complement of the amount of a negative total and thereafter restore the totalizer to its previous setting; printing mechanism selectively operable to print the amount represented by the displacement of the differential mechanism or the complement of the amount represented by the displacement of the differential mechanism; and means controlled by the totalizer according to whether the total is positive or negative, and operable in a sub-total-taking operation, for controlling the operation of the printing mechanism to print the amount corresponding to the displacement of the differential mechanism if the total on the totalizer is positive and to print the nines complement of the amount represented by the displacement of the differential mechanism if the total on the totalizer is negative, whereby the true amount of positive and negative sub-totals will be printed.

3. In a machine of the class described, the combination of a totalizer settable to represent the true value of a total when it is positive and the nines complement of a total when it is negative; a differential mechanism; means to control the operation of the totalizer and the differential mechanism in a single machine cycle total-taking operation, in the same manner whether the total is positive or negative, to enable the differential mechanism to clear the setting from the totalizer and be displaced according to the amount of a positive total or according to the nines complement of the amount of a negative total; printing mechanism selectively operable to print the amount represented by the displacement of the differential mechanism or the complement of the amount represented by the displacement of the differential mechanism; and means controlled by the totalizer according to whether the total is positive or negative, and operable in a total-taking operation, for controlling the operation of the printing mechanism to print the amount corresponding to the displacement of the differential mechanism if the total on the totalizer is positive and to print the nines complement of the amount represented by the displacement of the differential mechanism if the total on the totalizer is negative, whereby the true amount of positive and negative totals will be printed.

4. In a machine of the class described, the combination of a totalizer settable to represent the true value of a total when it is positive and the nines complement of a total when it is negative; a differential mechanism; a single total key for causing the machine to perform positive and negative total-taking operations; means operated by the total key to control the operation of the totalizer and the differential mechanism in a total-taking operation, in the same manner whether the total be positive or negative, to enable the differential mechanism to clear the setting from the totalizer and be displaced according to the amount of a positive total or according to the nines complement of the amount of a negative total; printing mechanism selectively operable to print the amount represented by the displacement of the differential mechanism or the complement of the amount represented by the displacement of the differential mechanism; and means controlled by the totalizer according to whether the total is positive or negative, and operable in a total-taking operation, for controlling the operation of the printing mechanism to print the amount corresponding to the displacement of the differential mechanism if the total on the totalizer is positive and to print the nines complement of the amount represented by the displacement of the differential mechanism if the total on the totalizer is negative, whereby merely by controlling the operation of the printing mechanism the true amount of positive and negative totals will be printed.

5. In a machine of the class described, the combination of a totalizer settable to represent the true value of a total when it is positive and the nines complement of a total when it is negative; a differential mechanism; a single sub-total key for causing the machine to perform positive and negative sub-total-taking operations; means operated by the sub-total key to control the operation of the totalizer and the diffential mechanism in a sub-total-taking operation, in the same manner whether the total is positive or negative, to enable the differential mechanism to clear the setting from the totalizer and be displaced according to the amount of a positive total or according to the nines complement of the amount of a negative total and thereafter restore the totalizer to its previous setting; printing mechanism selectively operable to print the amount represented by the displacement of the differential mechanism or the complement of the amount represented by the displacement of the differential mechanism; and means controlled by the totalizer according to whether the total is positive or negative, and operable in a sub-total-taking operation, for controlling the operation of the printing mechanism to print the amount corresponding to the displacement of the differential mechanism if the total on the totalizer is positive and to print the nines complement of the amount represented by the displacement of the differential mechanism if the total on the totalizer is negative, whereby, merely by controlling the operation of the printing mechanism, the true amount of positive and negative sub-totals will be printed.

6. In a machine of the class described, the combination of a totalizer settable to represent the true value of a total when it is positive and the nines complement of a total when it is negative; a differential mechanism; means to control the operation of the totalizer and the differential mechanism to enable the differential mechanism to be displaced under control of the totalizer according to the amount of a positive total or according to the nines complement of the amount of a negative total; printing mechanism including a plurality of type wheels and a related plurality of double-rack members operated by the differential mechanism the same extent as the differential mechanism and operable to set the type wheels to printing position, one rack on each double-rack member driving the type wheel related to that member in one direction to set the type wheel is position to print the amount represented by the displacement of the double-rack member and the other rack on each double-rack member driving the related type wheel in the reverse direction to set the type wheel in position to print the nines complement of the amount represented by the displacement of the double-rack member; and means controlled by the totalizer, according to whether the total is positive or negative, and rendered operable when the totalizer controls the displacement of the differential mechanism, for causing the type wheels to be driven by the first-mentioned racks on the double-rack members, when the total is positive, to cause the amount corresponding to the displacement of the double-rack member or the true value of the positive total to be set in printing position when the total is positive and for causing the type wheels to be driven by said other racks on the double-rack members, when the total is negative, to cause the type representing the nines complement of the amount represented by the displacement of the double-rack member to be set in printing position when the total is negative, whereby, by properly controlling the printing mechanism according to whether the total is positive or negative, the true value of positive and negative totals and sub-totals can be printed.

7. In a machine of the class described, the combination of a totalizer settable to represent the true value of a total when it is positive and the nines complement of a total when it is negative; a differential mechanism; a total key; means operated by the total key to control the operation of the totalizer and the differential mechanism in a total-taking operation to enable the differential mechanism to clear the totalizer of the amount thereon and be displaced according to the amount of a positive total or according to the nines complement of the amount of a negative total; printing mechanism including a plurality of type wheels and a related plurality of double-rack members operated by the differential mechanism the same extent as the differential mechanism and operable to set the type wheels to printing position, one rack on each double-rack member driving the type wheel related to that member in one direction to set the type wheel in position to print the amount represented by the displacement of the double-rack member and the other rack on each double-rack member driving the related type wheel in the reverse direction to set the type wheel in position to print the nines complement of the amount represented by the displacement of the double-rack member; and means controlled by the totalizer, according to whether the total is positive or negative, and operable in a total-taking operation, for causing the type wheels to be driven by the first-mentioned racks on the double-rack members, when the total is positive, to cause the amount corresponding to the displacement of the double-rack member or the true value of the positive total to be set in printing position when the total is positive and for causing the type wheels to be driven by said other racks on the double-rack members, when the total is negative, to cause the type representing the nines complement of the amount represented by the displacement of the double-rack member to be set in printing position when the total is negative, whereby, in a total-taking operation which is substantially the same for positive totals and negative totals, by properly controlling the printing mechanism according to whether the total is positive or negative, the true value of positive and negative totals can be printed.

8. In a machine of the class described, the combination of a totalizer settable to represent the true value of a total when it is positive and the nines complement of a total when it is negative; a differential mechanism; a sub-total key; means operated by the sub-total key to control the operation of the totalizer and the differential mechanism in a sub-total-taking operation to enable the differential mechanism to clear the totalizer of the amount thereon and be displaced according to the amount of a positive total or according to the nines complement of the amount of a negative total and thereafter restore this amount to the totalizer; printing mechanism including a plurality of type wheels and a related plurality of double-rack members operated by the differential mechanism the same extent as the differential mechanism and operable to set the type wheels to printing position, one rack on each double-rack member driving the type wheel related to that member in one direction to set the type wheel in position to print the amount represented by the displacement of the double-rack member and the other rack on each double-rack member driving the related type wheel in the reverse direction to set the type wheel in position to print the nines complement of the amount represented by the displacement of the double-rack member; and means controlled by the totalizer, according to whether the total is positive or negative, and operable in a sub-total-taking operation, for causing the type wheels to be driven by the first-mentioned racks on the double-rack members, when the total is positive, to cause the amount corresponding to the displacement of the double-rack member or the true value of the positive total to be set in printing position when the total is positive and for causing the type wheels to be driven by said other racks on the double-rack members, when the total is negative, to cause the type representing the nines complement of the amount represented by the displacement of the double-rack member to be set in printing position when the total is negative, whereby, in a sub-total-taking operation, which is substantially the same when the total is positive or negative, by properly controlling the printing mechanism according to whether the total is positive or negative, the true value of positive and negative sub-totals can be printed.

9. In a machine of the class described, the combination of a keyboard including a plurality of rows of keys; a totalizer; differentially operable means displaceable extents corresponding to the various digits of amounts on the keyboard in adding operations and extents corresponding to the complements of the various digits of amounts on the keyboard in subtracting operations and operable to enter these amounts or complements of amounts into the totalizer; printing mechanism including type wheels and, for each type wheel, a double-rack member which is operated by the differentially operable means the same extent as the differentially operable means, and is operable to set the type wheel to printing position, one rack on the double-rack member driving the type wheel in one direction to set the type wheel in position to print the digit represented by the displacement of the double-rack member, and the other rack on the double-rack member driving the type wheel in the reverse direction to set the type wheel in position to print the complement of the digit represented by the displacement of the double-rack member; and means to control the driving of the type wheels by the racks to cause said one racks to drive the type wheels in adding operations and to cause said other racks to drive the type wheels in subtracting operations.

10. In a machine of the class described, the combination of a differentially operable means; a row of amount keys; means for mounting the row of amount keys for shifting movement relative to the differentially operable means, said row of keys in one position cooperating with the differentially operable means to control the displacement of the differentially operable means extents representing the value of any depressed key in the row and in another position cooperating with the differentially operable means to control the displacement of the differentially operable means extents representing the complement of the value of any depressed key in the row; printing mechanism operated by the differentially operable means and settable selectively to print the value which the displacement of the differentially operable means represents or to print the complement of the value which the displacement of the differentially operable means represents; and means to coordinate the operation of the printing mechanism with the position of the row of keys to cause the printing mechanism to be set to print the value which the displacement of the differentially operable means represents, when the row of keys causes the differentially operable means to be displaced according to the value of any depressed key, which printed value corresponds to the value of the depressed key, and to cause the printing mechanism to be set to print the complement of the value which the displacement of the differentially operable means represents when the row of keys is in the position to control the displacement of the differentially operable means extents representing the complement of the value of any depressed key, which printed value also corresponds to the value of the depressed key.

11. In a machine of the class described, the combination of a differentially operable means; a row of amount keys; means for mounting the row of amount keys for shifting movement relative to the differentially operable means, said row of keys in one position cooperating with the differentially operable means to control the displacement of the differentially operable means extents representing the value of any depressed key in the row and in another position cooperating with the differentially operable means to control the displacement of the differentially operable means extents representing the complement of the value of any depressed key in the row; a type wheel; means operated by the differentially operable means for selectively setting the type wheel to print the value which the displacement of the differentially operable means represents, or setting the type wheel to print the complement of the value which the displacement of the differentially operable means represents; and means to coordinate the operation of the type wheel setting means with the position of the row of keys to cause the type wheel to be set to print the value which the displacement of the differentially operable means represents, when the row of keys causes the differentially operable means to be displaced according to the value of any depressed key, which printed value corresponds to the value of the depressed key, and to cause the type wheel to be set to print the complement of the value which the displacement of the differentially operable means represents when the row of keys is in the position to control the displacement of the differentially operable means extents representing the complement of the value of any depressed key, which printed value also corresponds to the value of the depressed key.

12. In a machine of the class described, the combination of a differentially operable means; a row of amount keys; means for mounting the row of amount keys for shifting movement relative to the differentially operable means, said row of keys in one position cooperating with the differentially operable means to control the displacement of the differentially operable means extents representing the value of any depressed key in the row and in another position cooperating with the differentially operable means to control the displacement of the differentially operable means extents representing the complement of the value of any depressed key in the row; a type wheel; a double-rack member operated by the differentially operable means and having one rack for setting the type wheel in one direction into position to print the value which the displacement of the differentially operable means represents, and having another rack for setting the type wheel in the reverse direction into position to print the complement of the value which the displacement of the differentially operable means represents; and means to coordinate the setting of the type wheel by one or the other rack with the position of the row of keys to cause the type wheel to be set by said one rack into position to print the value which the displacement of the differentially operable means represents, when the row of keys causes the differentially operable means to be displaced according to the value of any depressed key, which printed value corresponds to the value of the depressed key, and to cause the type wheel to be set by the other rack into position to print the complement of the value which the displacement of the differentially operable means represents when the row of keys is in the position to control the displacement of the differentially operable means extents representing the complement of the value of any depressed key, which printed value also corresponds to the value of the depressed key.

13. In a machine of the class described, the combination of a plurality of amount type wheels, each wheel having a blank type face and type faces thereon for printing the digits "one" through "nine" and "zero"; members displaceable different extents to positions representing digit values "one" through "nine" and "zero" in adding operations and displaceable different extents in subtracting operations to a "blank" position or to positions representing digit values "one" through "eight" and "zero"; means cooperable with the type wheels in adding operations and operated by the members to enable the type wheels to be set with those type faces in printing position which correspond to the digits represented by the displacement of the members; means cooperable with the type wheels in subtracting operations and operated by the members to enable the type wheels to be set with the blank type faces in printing position when the members are set to their "blank" positions and to be set with those type faces in printing position which correspond to the nines complement of the digits represented by the displacement of the members when the members are displaced to represent the digit values "one" through "eight" and "zero"; and means to readjust the type wheels in adding and subtracting operations so that zeros will not be printed to the left of the highest denominational significant digit of an amount but will be printed wherever necessary to the right of the highest denominational significant digit of an amount.

14. In a machine of the class described, the combination of a plurality of denominational order type wheels, each wheel having a blank type face and type faces thereon for printing the digits "one" through "nine" and "zero"; denominational order members displaceable different extents to a "blank" position and to positions to represent digit values; means cooperable with the type wheels in adding operations and operated by the members when the members are set to represent digits "one" through "nine" and "zero" to enable the type wheels to be set with those type faces in printing position which correspond to the digits represented by the displacement of the members; means cooperable with the type wheels in subtracting operations and operated by the members when the members are set to their blank position and to the positions to represent the digits "one" through "eight" and "zero" to enable the type wheels to be set with their "blank" type faces in printing position when the members are set to their "blank" positions and to be set with those type faces in printing position which correspond to the nines complement of the digits represented by the displacement of the members when the members are displaced to represent the digits "one" through "eight" and "zero"; and readjusting means operable in adding operations to readjust the members in denominations above that of the member which has been displaced according to the highest denominational significant digit of an amount, to move the type wheels in these denominations to shift the zero type faces out of printing position and place the blank type faces in printing position, said readjusting means being operable in said subtracting operations to readjust members which have been displaced to their "blank" position in denominations lower than that of the member which has been displaced according to the highest denominational significant digit of an amount, to move the type wheels in these denominations to shift the blank type faces out of printing position and place the zero type faces in printing position.

15. In a machine of the class described, the combination of a plurality of denominational order type wheels, each wheel having a blank type face and type faces thereon for printing the digits "one" through "nine" and "zero"; denominational order members displaceable different extents in one direction from a home position to a "blank" position and to positions to represent digit values; means cooperable with the type wheels in adding operations and operated by the members when the members are displaced to represent digits "one" through "nine" and "zero" to enable the type wheels to be operated in one direction to set those type faces in printing position which correspond to the digits represented by the displacement of the members; means cooperable with the type wheels in subtracting operations and operated by the members when the members are set to their blank position and to the positions to represent the digits "one" through "eight" and "zero" to enable the type wheels to be operated in the reverse direction to set their "blank" type faces in printing position when the members are set to their "blank" positions and to set those type faces in printing position which correspond to the nines complement of the digits represented by the displacement of the members when the members are displaced to represent the digits "one" through "eight" and "zero"; and readjusting means operable in adding operations to readjust the members in denominations above that of the member which has been displaced according to the highest denominational significant digit of an amount in a direction toward their home positions, to move the type wheels in these denominations in a direction opposite to their setting movement to shift the zero type faces out of printing position and place the blank type faces in printing position, said readjusting means being operable in said subtracting operations to readjust members, which have been displaced to their "blank" position in denominations lower than that of the member which has been displaced according to the highest denominational significant digit of an amount, in the same direction as in adding operations to move the type wheels in these denominations in a direction opposite to their setting movement to shift the blank type faces out of printing position and place the zero type faces in printing position.

16. In a machine of the class described, the combination of a plurality of denominational type wheels, each type wheel having a blank type face and type faces for printing the digits "one" through "nine" and "zero"; a corresponding plurality of denominational members displaceable different extents into a "blank" position and into positions to represent the digit values "one" through "nine" and "zero"; means cooperable with the type wheels in adding operations and operated different extents by the members when the members are displaced to represent the digits "one" through "nine" and "zero" to set the type wheels with those type faces in printing position which correspond to the digits represented by the displacement of the members; means cooperable with the type wheels in subtracting operations and operated different extents by the members when the members are displaced to their "blank" positions or to the positions representing the digits "one" through "eight" and "zero" to set the type wheels with the blank type faces in printing position when the members are displaced to their "blank" positions and to set the type wheels with those type faces in printing position which correspond to the nines complement of digits represented by the displacement of the members when the members are displaced to represent the digits "one" through "eight" and "zero"; a readjusting lever for each denominational member; means on the members, which means are moved into position to rock the levers from a normal position when the members are displaced to represent significant digits in said adding and subtracting operations; means on each lever engaging the lever related to the next higher denominational order member to enable the rocking of any lever from normal position to cause all levers related to members in lower denominational orders to be rocked from their normal position; means to provide readjusting movement to said levers; said means on the members moving into operative relation with the levers in their normal position in said adding operations when the members are displaced to represent "zero," so that, when the levers are given their readjusting movement, those levers in normal position will readjust their related members and thereby cause the type wheels related to these members to operate and move the zero type face out of printing position and place the blank type face in printing position while those levers which have been rocked from normal position will be ineffective to readjust their related members; and additional means on the members, which additional means are moved into operative relation with the levers in their rocked position when the members are displaced to their "blank" position in said subtracting operations, whereby, when the levers are given their readjusting movement, those levers which are in their rocked position and which cooperate with the additional means on the members will be effective to readjust their related members and cause them to shift their type wheels to move the blank type faces out of printing position and place the zero type faces in printing position while those levers which are in normal position will be ineffective to adjust their related members and will leave the blank type faces in printing position.

17. In a machine of the class described, the combination of a plurality of type wheels, each type wheel having a plurality of digit type faces thereon and having a driving gear secured thereto; a type wheel supporting frame; means for operating the frame to move the type wheels from a normal position into printing relation with a platen and back to normal position; double-rack members, one for each type wheel, displaceable different extents to represent amounts, one set of racks on the double-rack members, when engaging the gears on the type wheels, causing the type wheels to be operated in one direction by the double-rack members to place the digit type faces corresponding to the amount represented by the displacement of the double-rack members, in printing position, and the other set of racks on the double-rack members, when engaging the gears on the type wheels, causing the type wheels to be operated in the opposite direction by the double-rack members to place the digit type faces corresponding to the complement of the amount represented by the displacement of the double-rack members, in printing position; a basket for guiding the double-rack members in their displacement to represent amounts and shiftable relatively to the type wheel supporting frame to cause one or the other of the sets of racks on the double-rack members to engage the gears on the type wheels; and means to control the relative movement between the basket and the frame, as the frame moves the type wheels into printing relation with the platen but before the double-rack members are displaced to represent an amount, whereby, during their movement into printing relation with the platen, the type wheels can be operated selectively to place the digit type faces corresponding to the amount represented by the displacement of the double-rack members or the complement of this amount in printing position.

18. In a machine of the class described, the combination of a multi-denominational order totalizer; means for entering amounts into the totalizer in adding operations and entering the nines complements of amounts therein in subtracting operations; means for entering a value of "one" into the lowest denominational order of the totalizer; and means operated by the highest order of the totalizer each time that order passes from its "nine" position to or through its "zero" position to cause an operation of the means for entering a value of "one" in the lowest denominational order of the totalizer, whereby an entry of "one" will be made in the lowest order of the totalizer in each subtracting operation except the one in which the total on the totalizer changes from positive to negative and in each adding operation in which the total on the totalizer changes from negative to positive, to enable the totalizer always to be set to the true value of a positive total or to the nines complement of a negative total.

19. In a machine of the class described, the combination of normally inoperative driving mechanism for the machine settable into operation by movement of a control member; a keyboard; means for mounting the keyboard for bodily shifting movement in the machine; means normally positioning the keyboard in one position; means for shifting the keyboard from its normal position to another position; and cam means carried by the keyboard, operable when the keyboard is shifted to said other position, for moving the control member and rendering the driving mechanism operative to drive the machine.

20. In a machine operable to perform addition and subtraction, the combination of a differential mechanism; a keyboard; means for mounting the keyboard for bodily movement relative to the differential mechanism; means normally positioning the keyboard where the keyboard can control the differential operation of the differential mechanism extents corresponding to the values of the keys which are operated on the keyboard; a subtract key for controlling the machine in a subtracting operation; means on the subtract key for causing the keyboard to shift relatively to the differential mechanism, when the subtract key is operated, to another position where the keyboard can control the differential operation of the differential mechanism extents corresponding to the complements of the values of the keys which are operated on the keyboard; normally inoperative driving mechanism, which, when operative, is effective to cause the differential mechanism to operate; and means operated by the keyboard, when it is shifted to said other position by the subtract key, to render the driving mechanism operative to cause the differential mechanism to operate in a subtracting operation.

21. In a machine operable to perform a plurality of kinds of operations, the combination of a differential mechanism; a shiftable keyboard normally in position relative to the differential mechanism to control the differential operation of the differential mechanism in one kind of said operations and shiftable to another position relative to the differential mechanism to control the differential operation of the differential mechanism in another kind of said operations; driving mechanism set into operation by movement of a lever to cause the differential mechanism to operate; means to shift the keyboard from its normal position to its other position; and cam means carried by the keyboard, which cam means is effective as the keyboard is shifted to its other position, to move the lever, rendering the driving mechanism operable to cause the differential mechanism to operate in said other kind of operation.

22. In a calculating machine including totalizer wheels and corresponding printing wheels, the combination of a differentially settable means for coupling each totalizer wheel to its corresponding printing wheel so that when coupled the angular movement of a totalizer wheel results in the same angular movement of the associated printing wheel, the coupling of each differentially settable means to its associated printing wheel being operable selectively so that such a printing wheel may be made to rotate in the same sense or in the opposite sense to its associated totalizer wheel.

23. The structure of claim 22 in which means is provided for causing the selective coupling of the differential means and printing wheels to be such that all printing wheels rotated in a particular operation rotate in the same direction.

24. In a calculating machine having a totalizer including a plurality of denominational order representing wheels into which data is entered either additively or subtractively by rotating the wheels in the same sense, the combination of a value representing control member representing each wheel; a printing wheel for each of the totalizer wheels; means for coupling each totalizer wheel to its associated printing wheel so that a printing wheel is given the same angular movement as the associated totalizer wheel, said coupling means being movable a distance determined selectively by the value representing control members or by the totalizer wheel; and means to adjust the coupling of all of the coupling means to the printing wheels so the printing wheels are caused to rotate in the same sense or in the opposite sense to the totalizer wheels.

25. The structure of claim 24 in which the adjustment of the coupling means to the printing wheels is controlled by the angular position of the highest order totalizer wheel.

HARRY L. LAMBERT.

REFERENCES CITED

The following references are of record in the file of this patent:

UNITED STATES PATENTS

| Number | Name | Date |
|---|---|---|
| 1,195,567 | Draughon | Aug. 22, 1916 |
| 1,205,481 | Rechnitzer | Nov. 21, 1916 |
| 1,294,507 | Martin | Feb. 18, 1919 |
| 1,359,173 | Horton | Nov. 16, 1920 |
| 1,386,021 | Peters | Aug. 2, 1921 |
| 1,555,534 | Von Pein | Sept. 29, 1925 |
| 1,655,425 | Kurowski | Jan. 10, 1928 |
| 1,808,432 | Peirce | June 2, 1931 |
| 1,813,037 | Ens | July 7, 1931 |
| 1,854,875 | White | Apr. 19, 1932 |
| 1,856,056 | Sundstrand | Apr. 26, 1932 |
| 1,874,823 | Smith | Aug. 30, 1932 |
| 1,876,056 | Johantgen | Sept. 6, 1932 |
| 1,957,960 | Hosack | May 8, 1934 |
| 2,062,731 | Schroder | Dec. 1, 1936 |
| 2,099,059 | Gardner | Nov. 16, 1937 |
| 2,181,975 | Lee | Dec. 5, 1939 |
| 2,199,253 | Barrett | Apr. 30, 1940 |
| 2,209,155 | Fagg | July 23, 1940 |
| 2,214,015 | Drecher | Sept. 10, 1940 |
| 2,240,797 | Pasinski | May 6, 1941 |
| 2,261,242 | Fettig | Nov. 4, 1941 |
| 2,282,120 | Demeulenaere | May 5, 1942 |
| 2,309,282 | Sundstrand | Jan. 26, 1943 |
| 2,322,608 | Webster | June 22, 1943 |
| 2,340,261 | Eichler | Jan. 25, 1944 |
| 2,353,597 | Sim | July 11, 1944 |
| 2,360,005 | Mehan | Oct. 10, 1944 |
| 2,396,188 | Mehan | Mar. 5, 1946 |